United States Patent [19]

Shiono et al.

[11] Patent Number: 6,072,620

[45] Date of Patent: *Jun. 6, 2000

[54] OUTPUT EFFICIENCY CONTROL DEVICE, PROJECTION-TYPE DISPLAY APPARATUS, INFRARED SENSOR, AND NON-CONTACT THERMOMETER

[75] Inventors: Teruhiro Shiono, Osaka; Michihito Ueda, Neyagawa; Tatsuo Ito, Osaka; Kazuo Yokoyama, Hirakata, all of Japan

[73] Assignee: Matsushita Electric Industrial Co., Ltd., Kadoma, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/860,253

[22] PCT Filed: Oct. 31, 1996

[86] PCT No.: PCT/JP96/03202

§ 371 Date: Sep. 2, 1997

§ 102(e) Date: Sep. 2, 1997

[87] PCT Pub. No.: WO97/16756

PCT Pub. Date: May 9, 1997

[30] Foreign Application Priority Data

Nov. 1, 1995 [JP] Japan .................................. 7-284759
Dec. 26, 1995 [JP] Japan .................................. 7-338592

[51] Int. Cl.[7] ........................... G02B 26/00; G02B 26/06; G01J 1/02; G01J 1/04
[52] U.S. Cl. ........................ 359/290; 359/291; 359/295; 359/572; 359/573; 359/619; 250/338.3; 345/108
[58] Field of Search ........................... 359/237, 245–247, 359/254, 276, 277, 288, 289, 355, 356, 357, 572, 573, 290, 291, 295, 558, 619; 250/338.3; 345/566, 108; 349/95

[56] References Cited

U.S. PATENT DOCUMENTS

| | | | |
|---|---|---|---|
| 2,951,419 | 9/1960 | Lemelson | 359/619 |
| 3,995,937 | 12/1976 | Baues et al. | 350/96 |
| 4,856,863 | 8/1989 | Sampsell et al. | 350/96.16 |
| 5,311,360 | 5/1994 | Bloom et al. | 359/572 |
| 5,459,610 | 10/1995 | Bloom et al. | 359/244 |
| 5,729,386 | 3/1998 | Hwang | 359/618 |
| 5,737,113 | 4/1998 | Kuramochi et al. | 359/259 |

FOREIGN PATENT DOCUMENTS

| | | |
|---|---|---|
| 0490171 | 6/1992 | European Pat. Off. . |
| 0547493 | 6/1993 | European Pat. Off. . |
| 61-241629 | 10/1986 | Japan . |
| 7-56096 | 3/1995 | Japan . |
| 08129138 | 5/1996 | Japan . |
| 8-5939 | 12/1996 | Japan . |
| 9322694 | 11/1993 | WIPO . |

OTHER PUBLICATIONS

International Search Report for Application PCT/JP96/03202; Dated Feb. 18, 1997.

O. Solgaard et al., Optics Letters, vol. 17, No. 9, pp. 688–690, 1992, "Deformable Grating Optical Modulator".

Search Report for EP 96935518.9–2205/JP9603202; Dated; Dec. 23, 1997.

Search Report for Application No. 96935518.9; Dated Mar. 12, 1998 (EPO).

*Primary Examiner*—Margaret Burke
*Attorney, Agent, or Firm*—Renner, Otto, Boisselle & Sklar

[57] ABSTRACT

Microlenses 3*a* and 3*b* are formed on a first surface of a transparent substrate, and an output efficiency control device 2 which modulates a light amount of incident light is provided on a second surface opposing the first surface. Incident light 4 is made to be incident obliquely to an optical axis of the microlens 3*a*, to be focused on the output efficiency control device 2. The output efficiency control device 2 modulates a light amount of incident light and outputs the light as outgoing light 5 through the microlens 3*b*. Because of such a structure, the output efficiency control device 2 can be decreased in size, compared with a diameter of a beam and an aperture of a microlens.

85 Claims, 35 Drawing Sheets

FIG.2
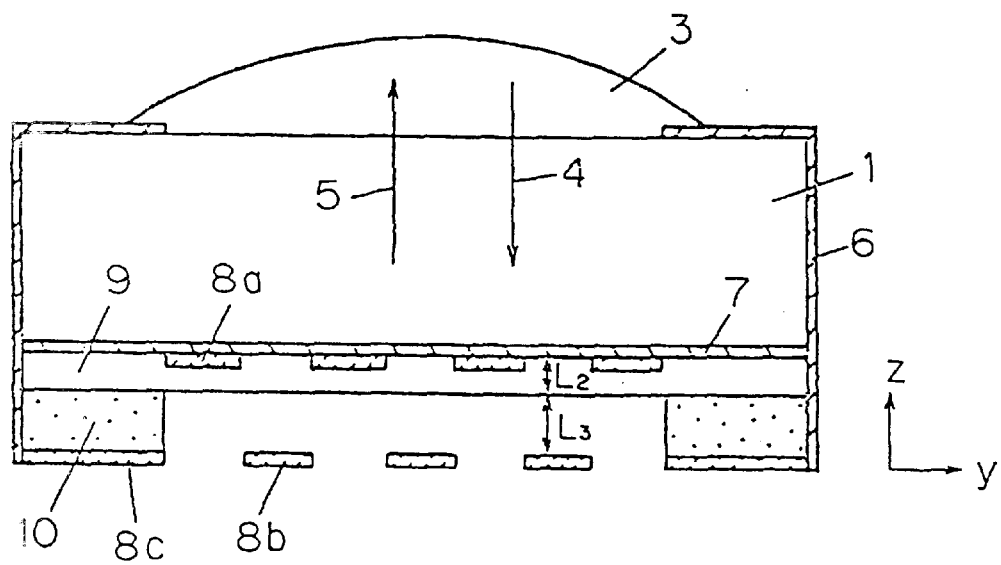
(a) Under no application of a voltage
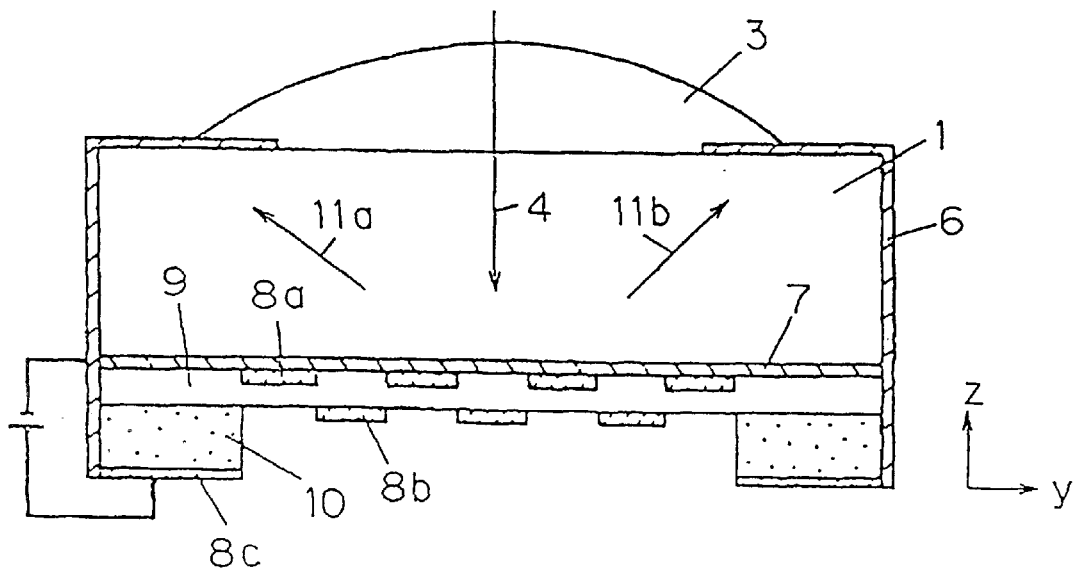
(b) Under the application of a voltage

FIG. 3
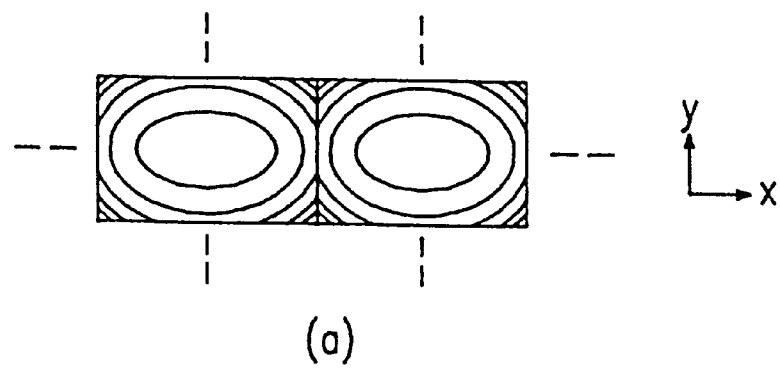
(a)
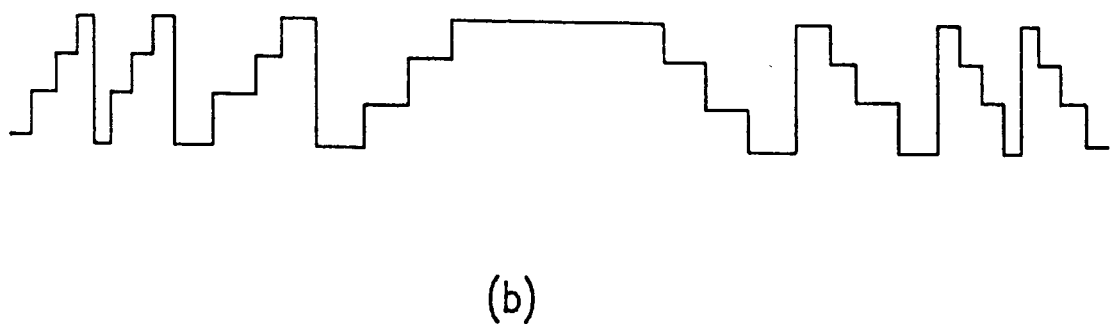
(b)

FIG. 4
(a) 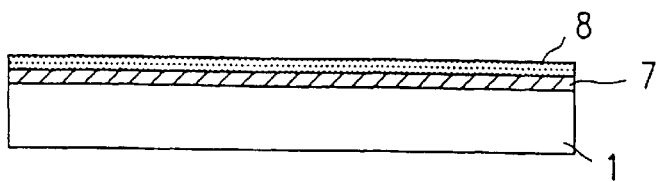
(b) 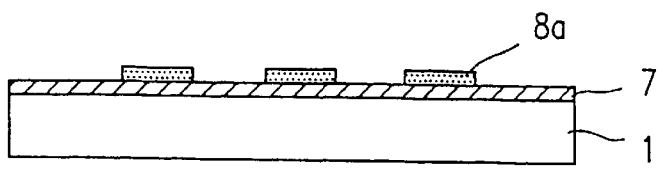
(c) 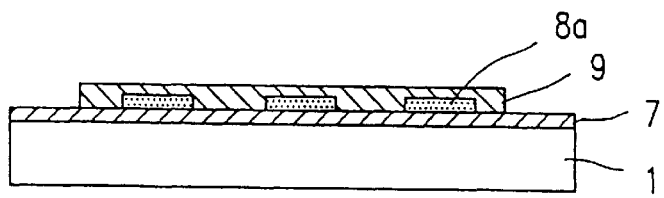
(d) 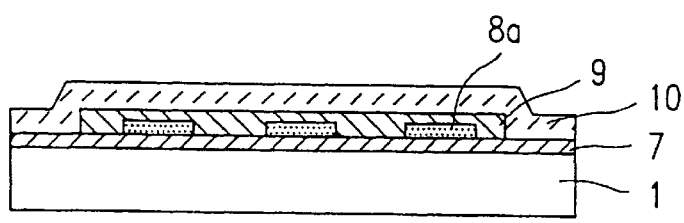
(e) 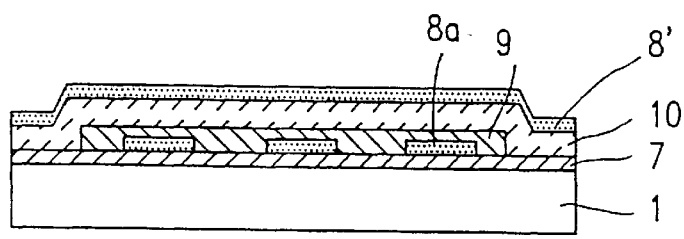
(f) 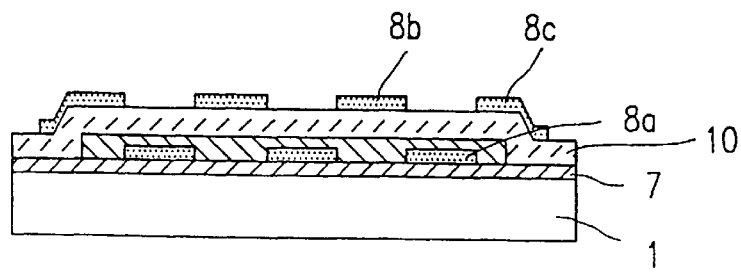
(g) 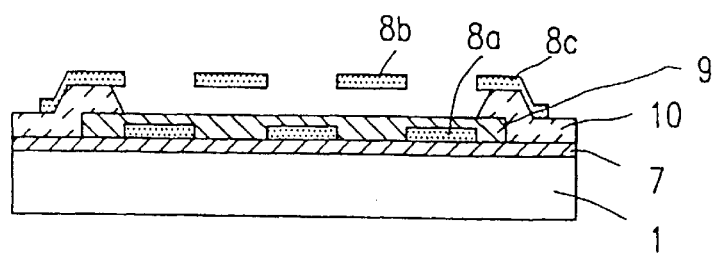

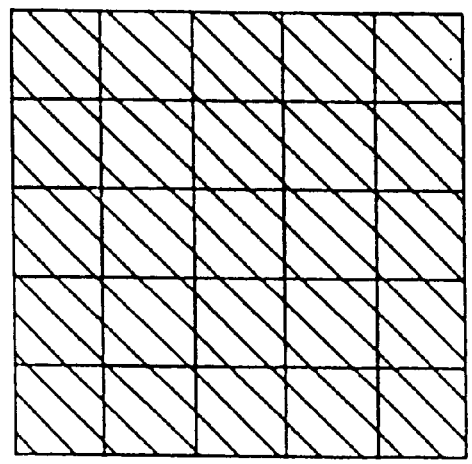
(c) Aperture ratio 100%
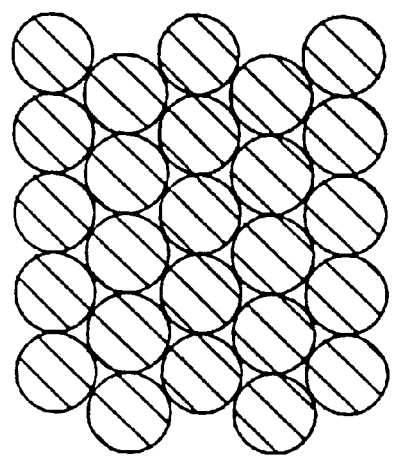
(b) Aperture ratio 91%
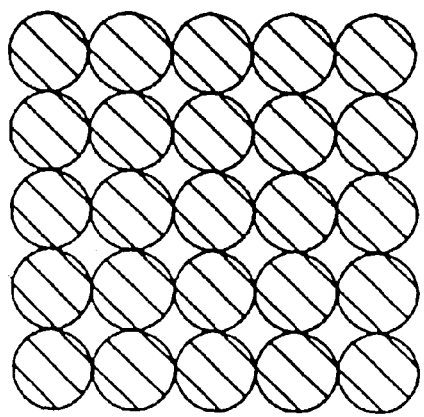
(a) Aperture ratio 79%
FIG. 11

FIG. 15
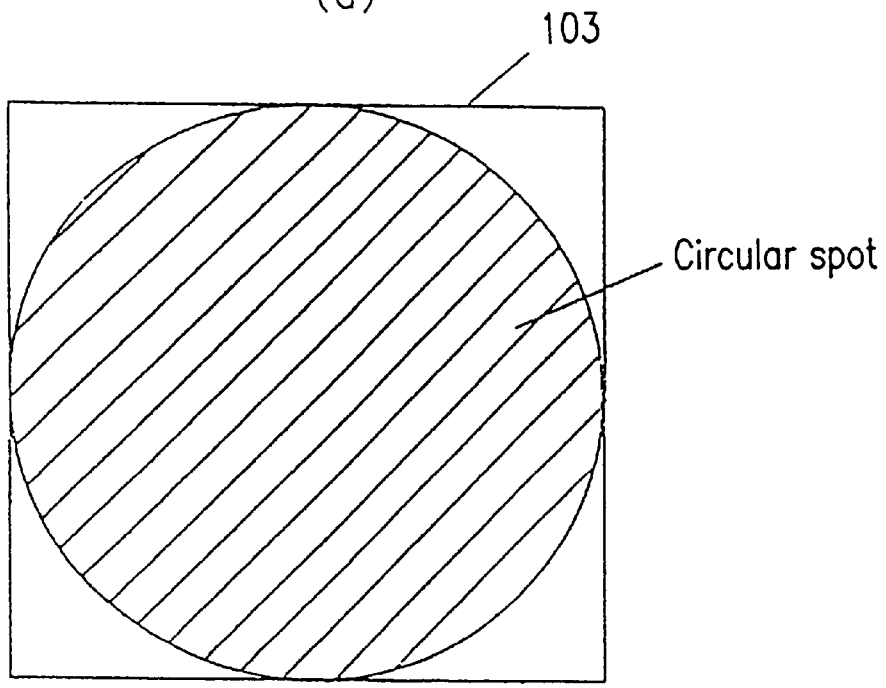
(a) Circular spot
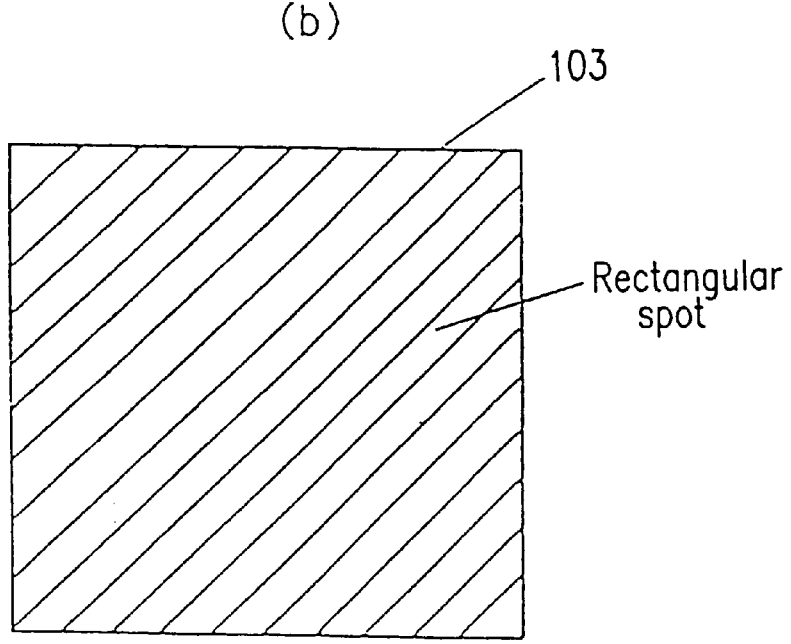
(b) Rectangular spot

FIG.16
(a)
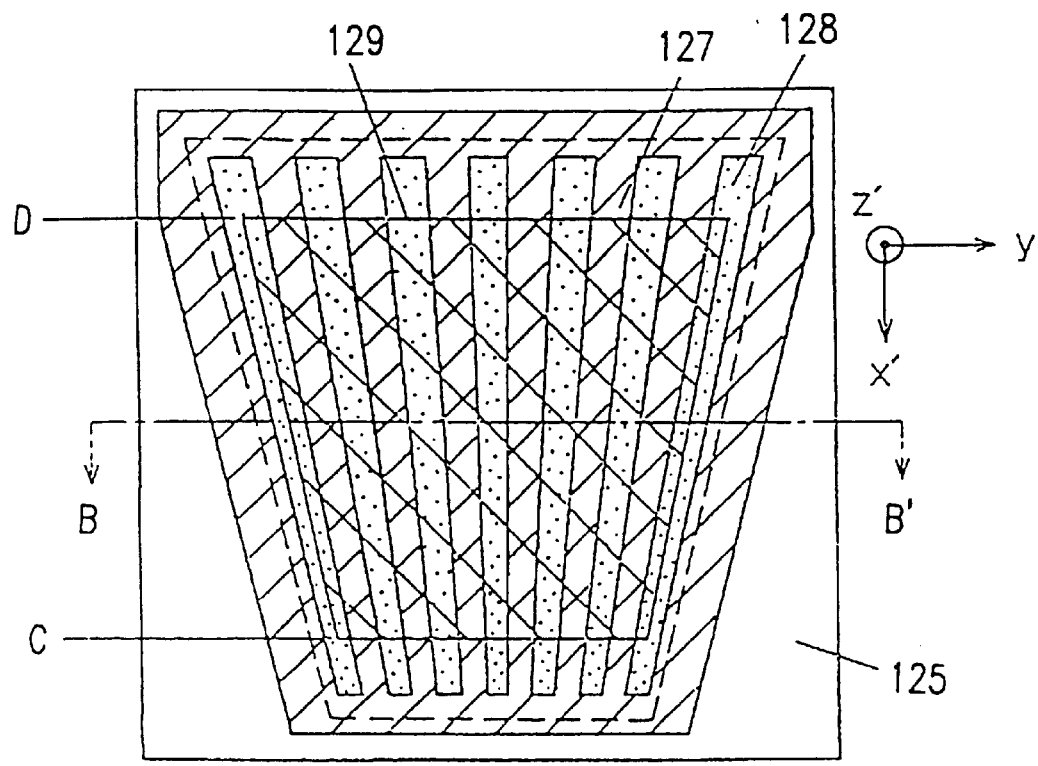
(b)
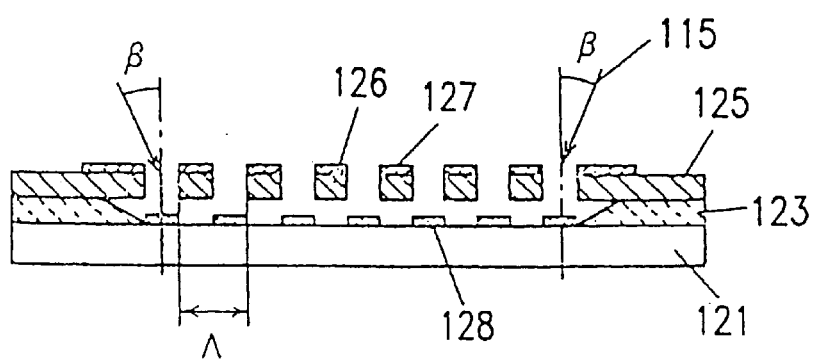

FIG. 18
(a)
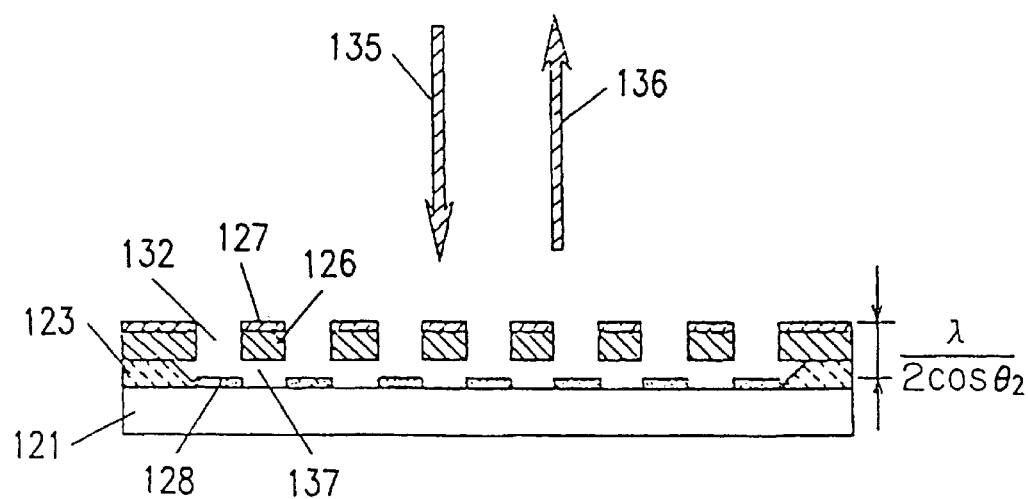
(b)
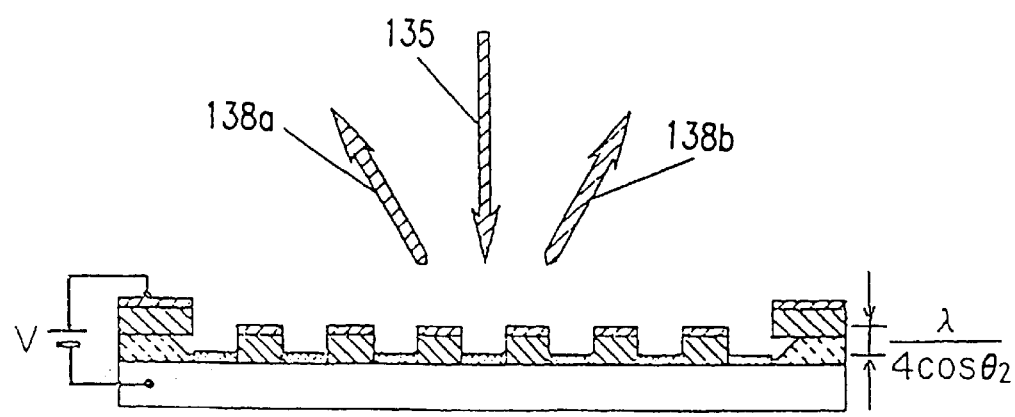

FIG. 19
(a)
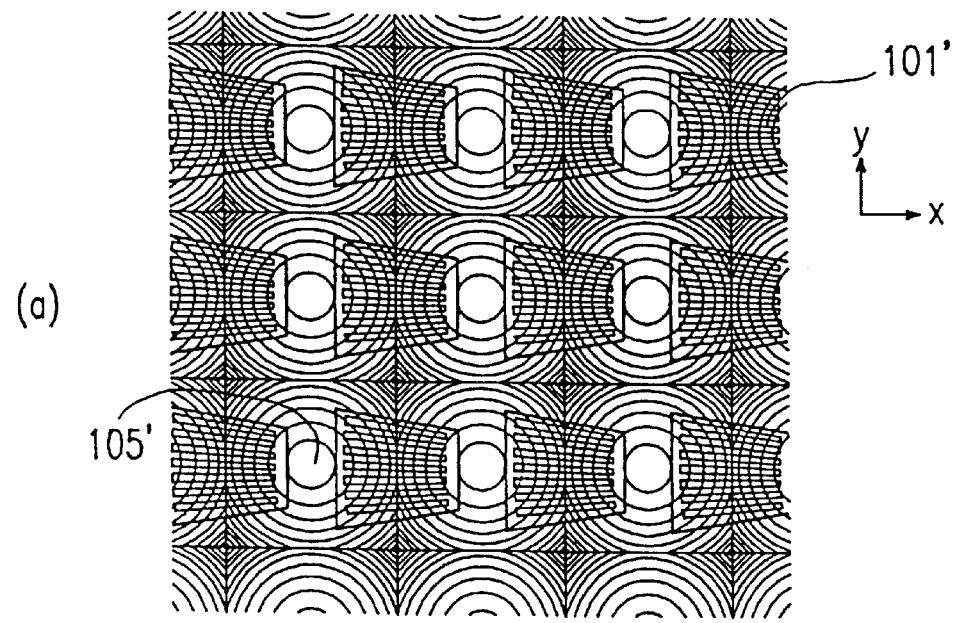
(b)
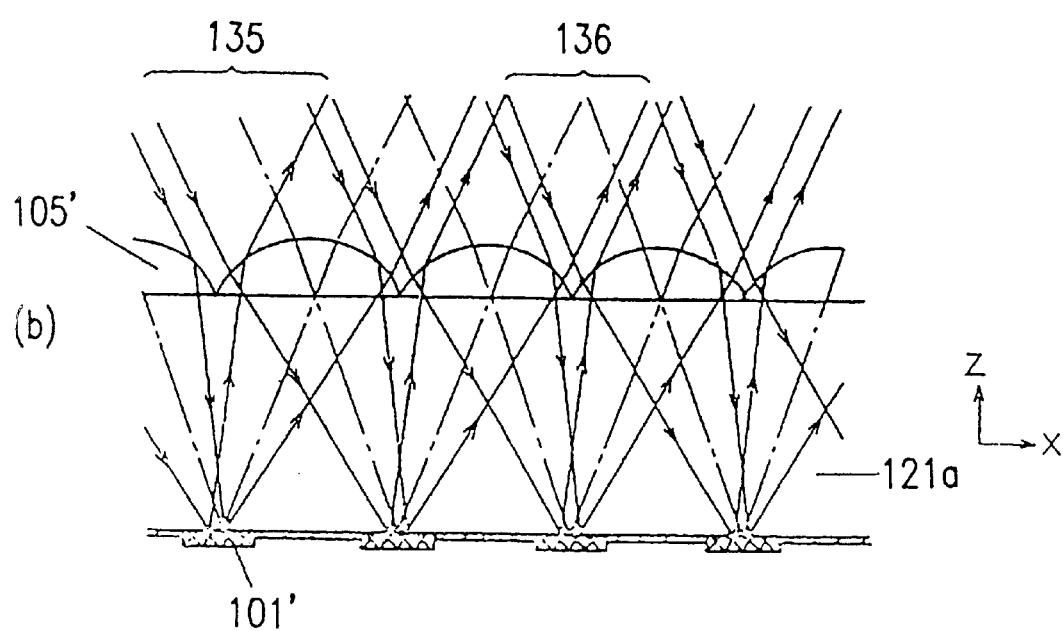

FIG.21
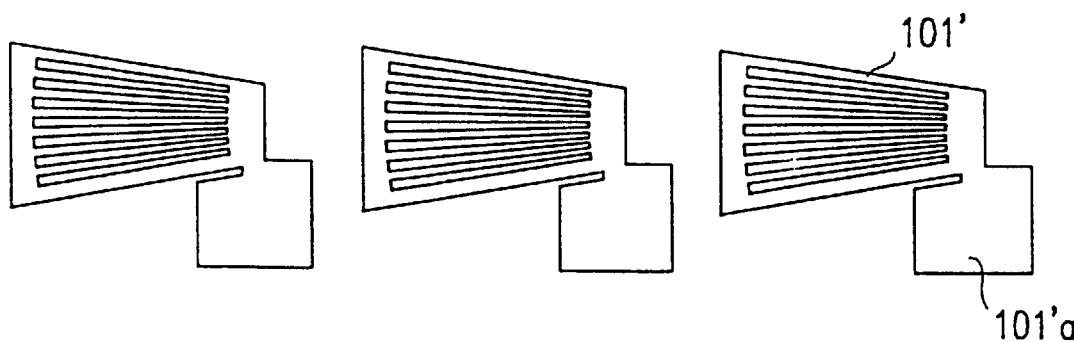
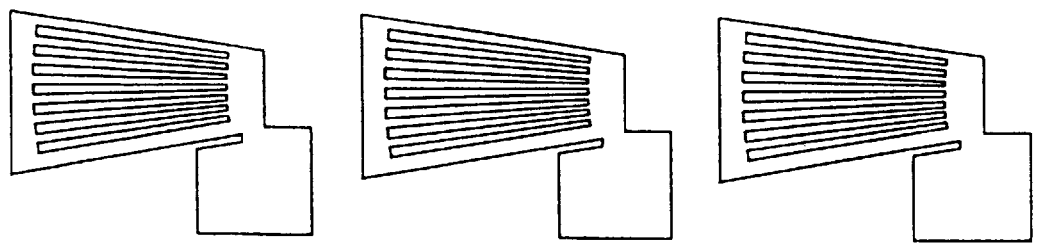
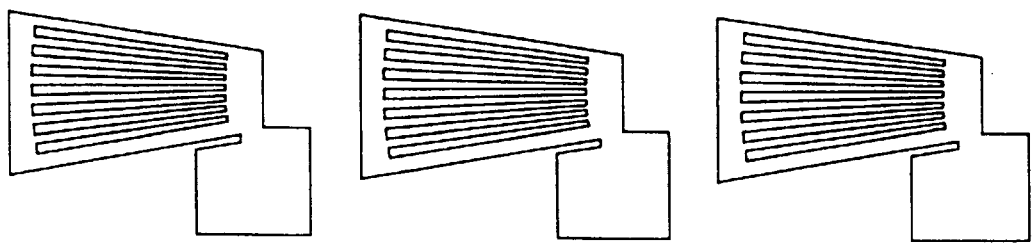
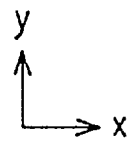

FIG. 22
(a)
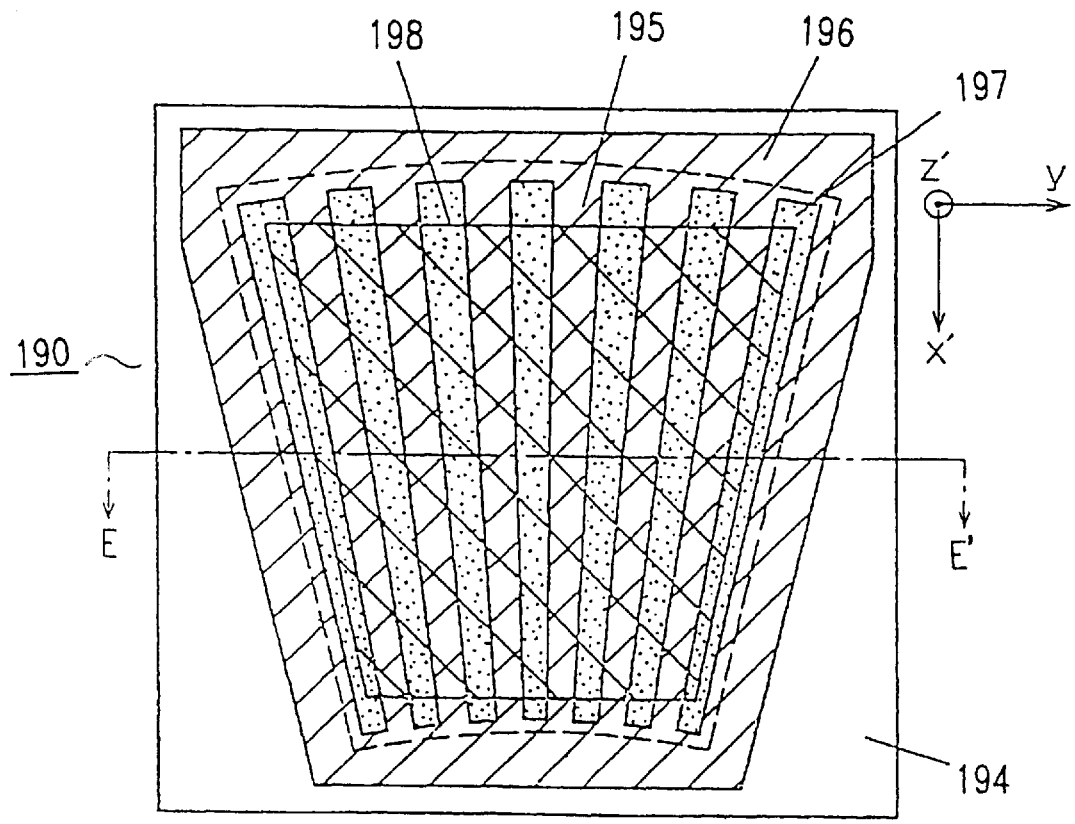
(b)
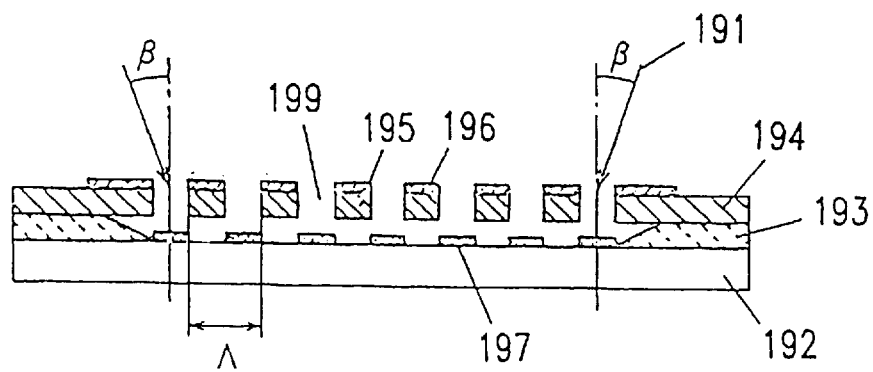
Λ period

FIG.23
(a)
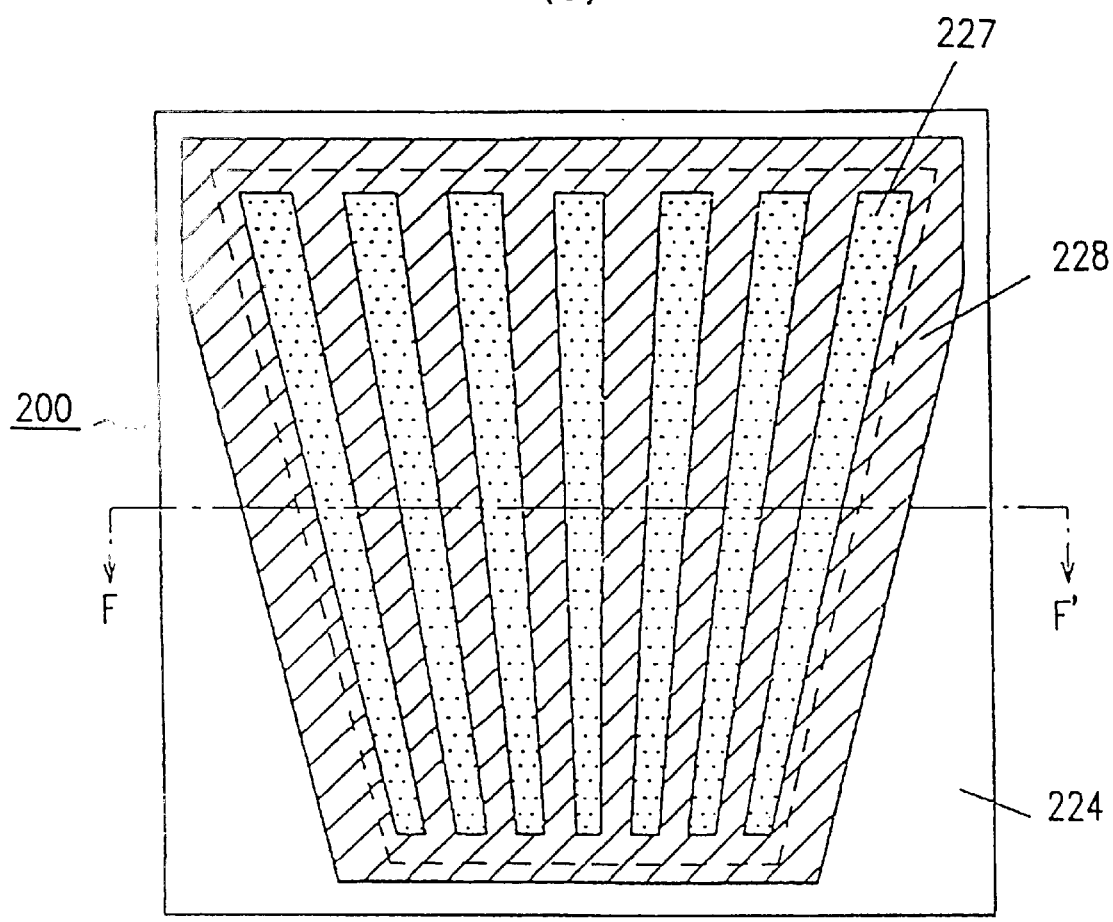
(b)
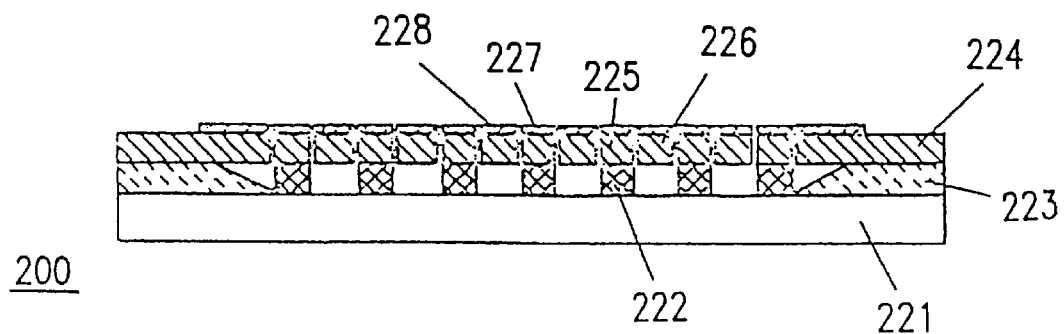

FIG. 24
(a)
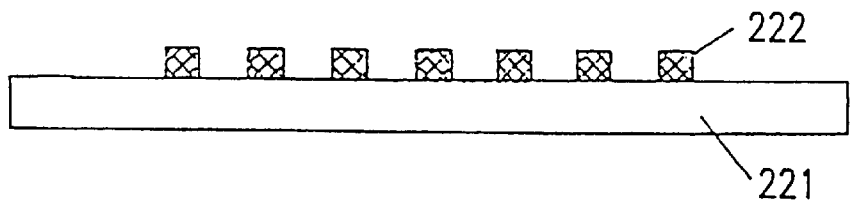
(b)
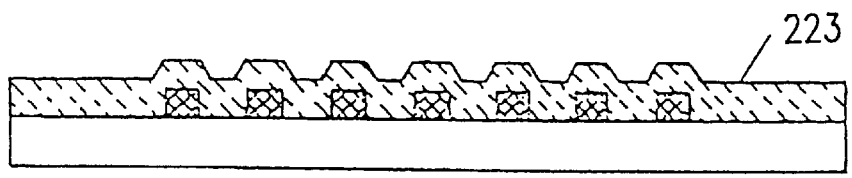
(c)
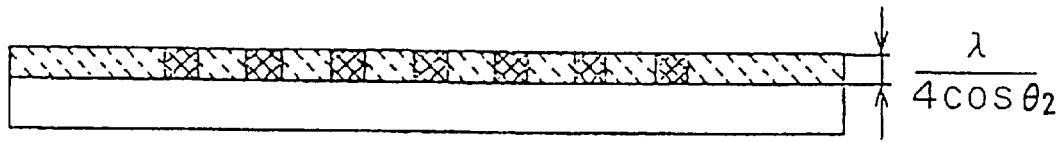
$$\frac{\lambda}{4\cos\theta_2}$$
(d)
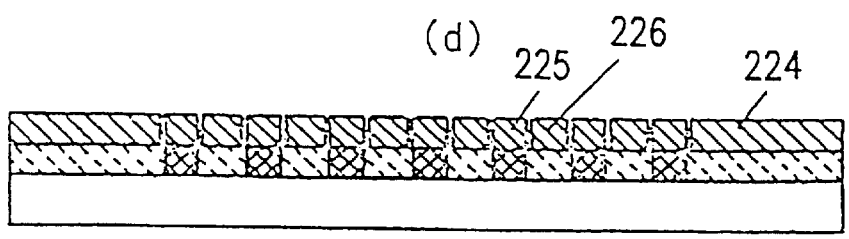
(e)
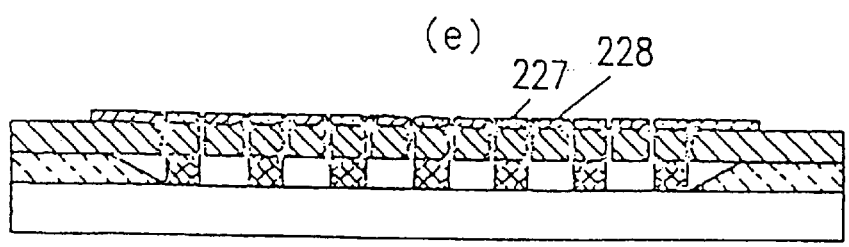

FIG.25
(a)
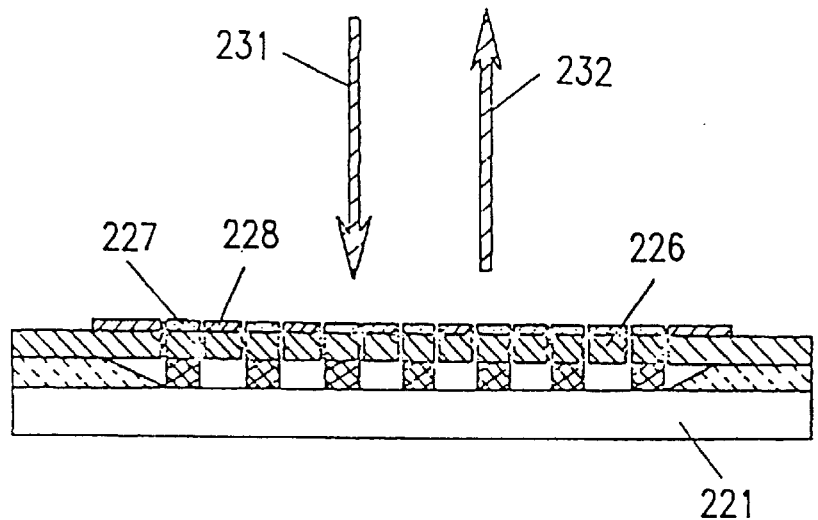
(b)
λ Wavelength of incident light
θ Incident angle
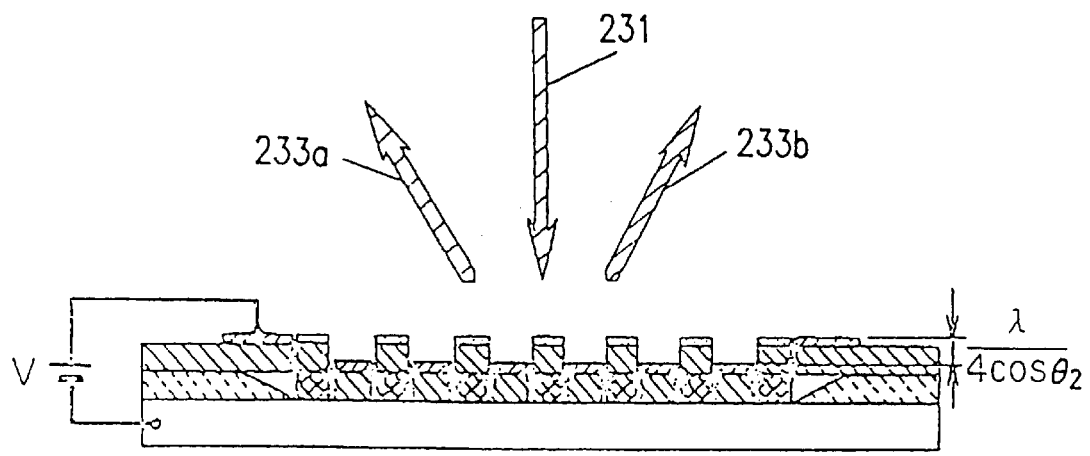

FIG. 26
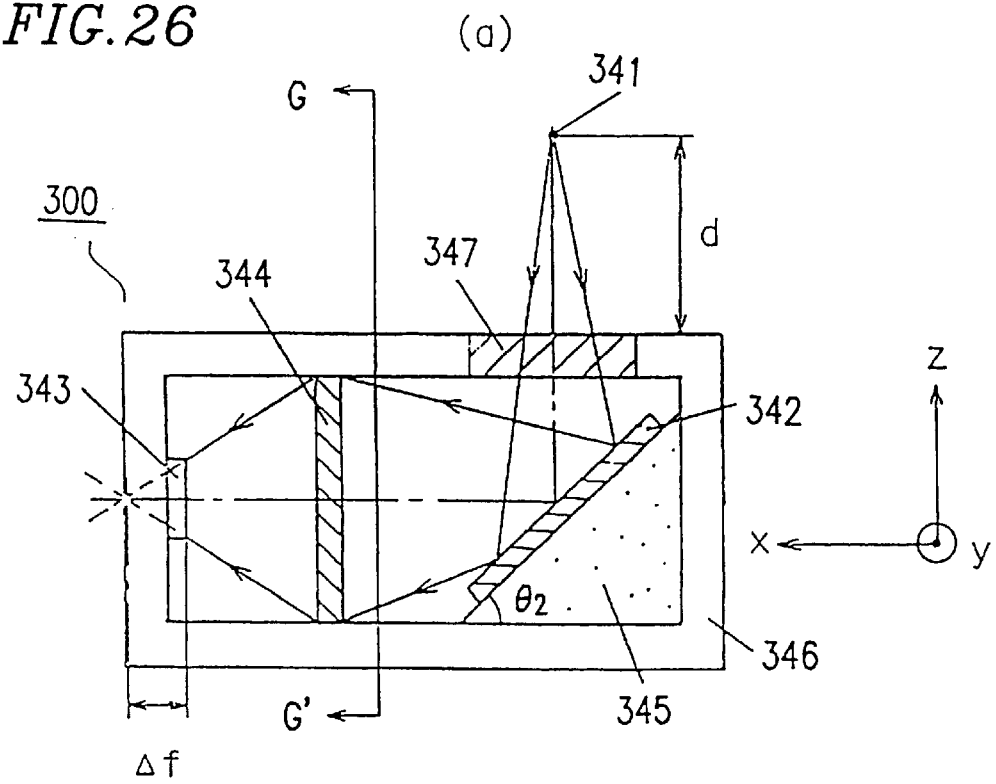
(a)
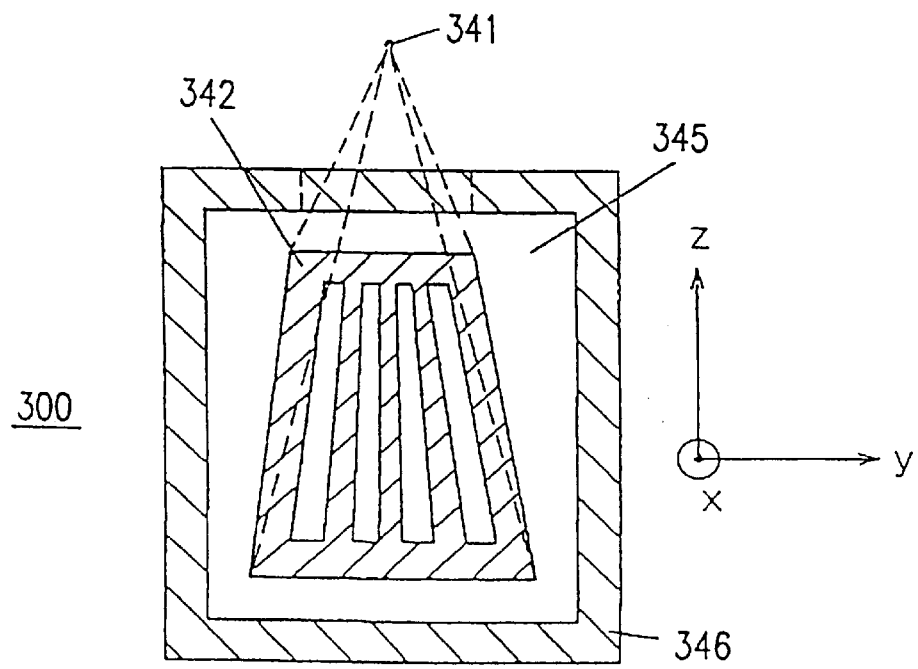
(b)

FIG.28
(a)
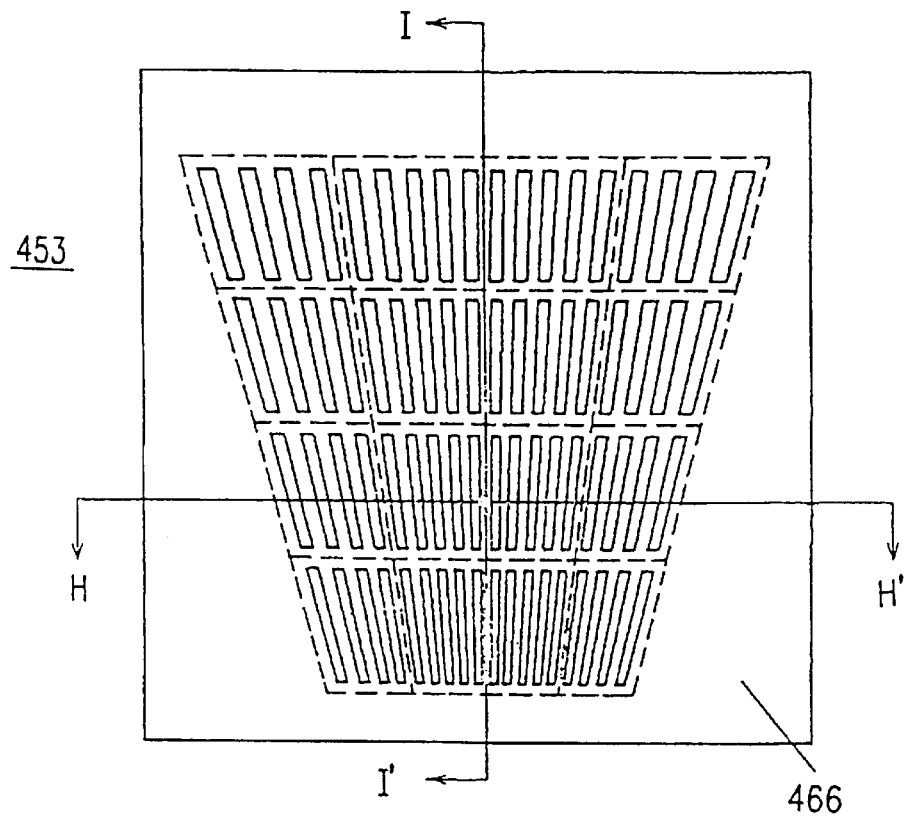
(b)
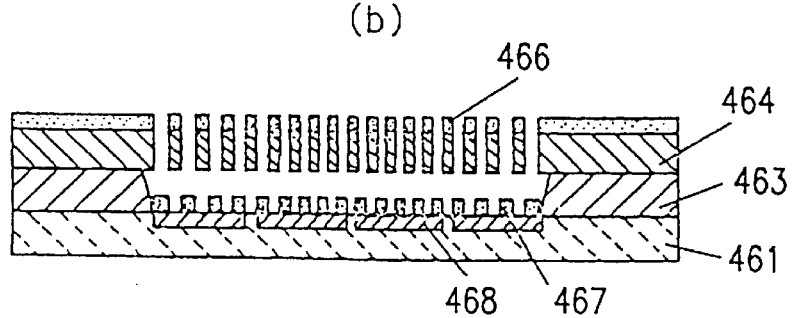
(c)
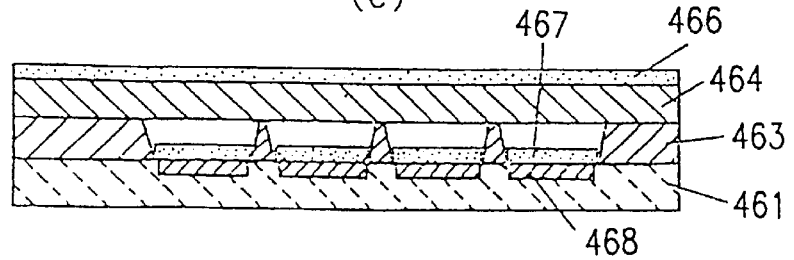

FIG. 30
(a)
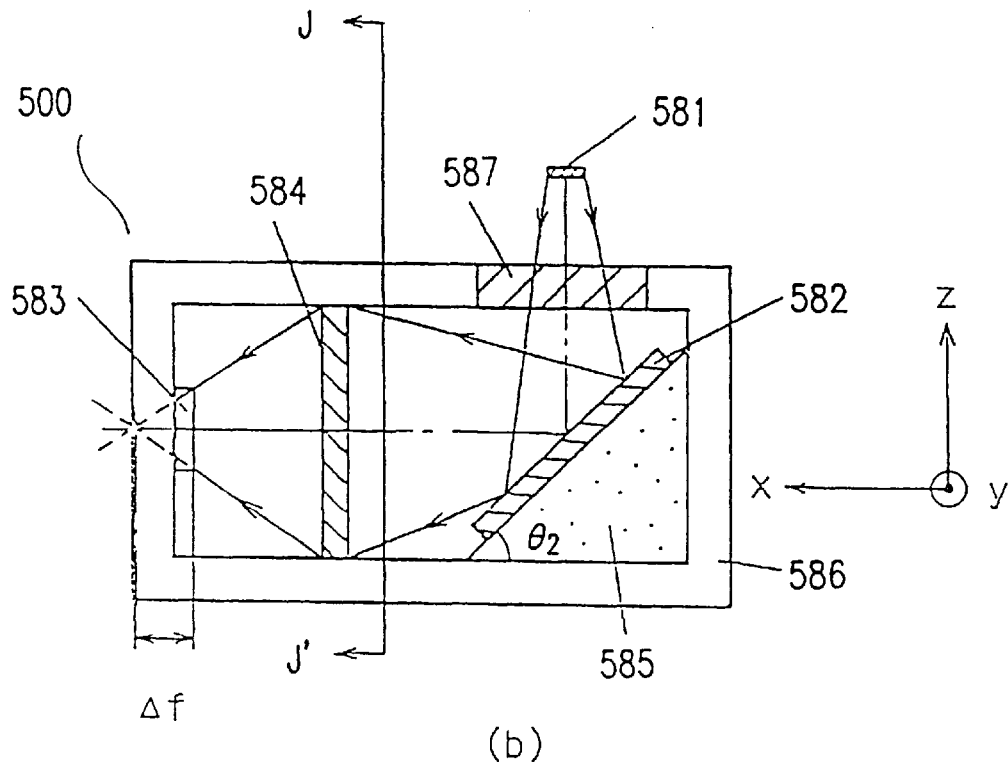
(b)
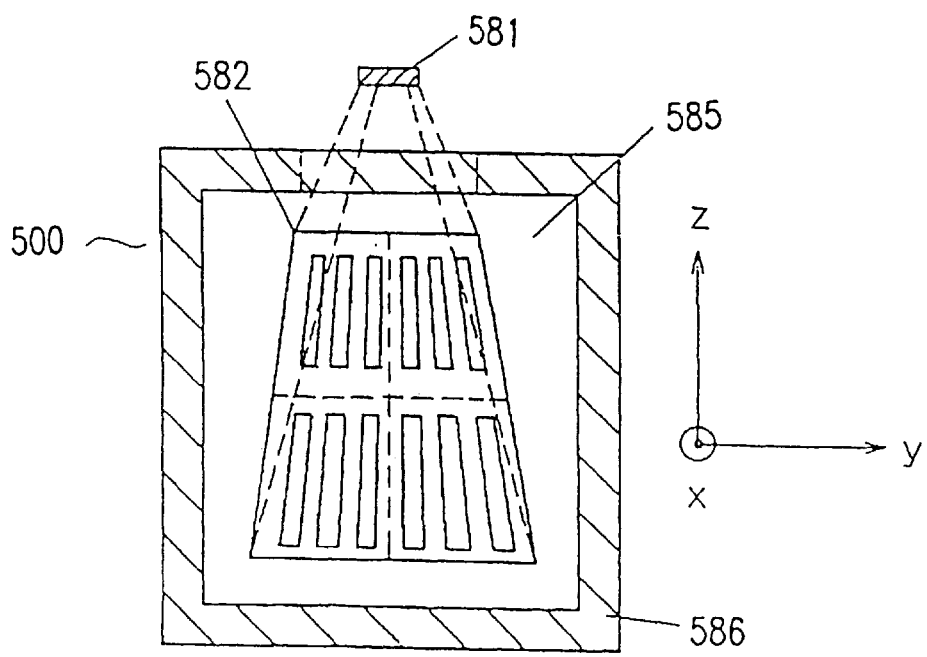

FIG. 31
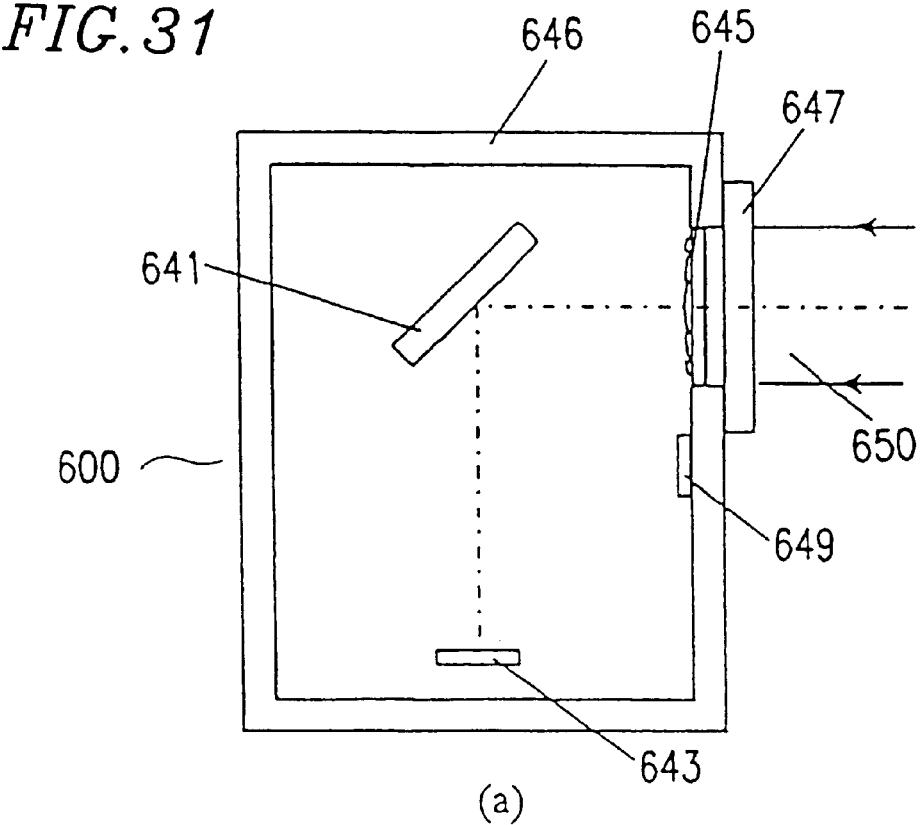
(a)
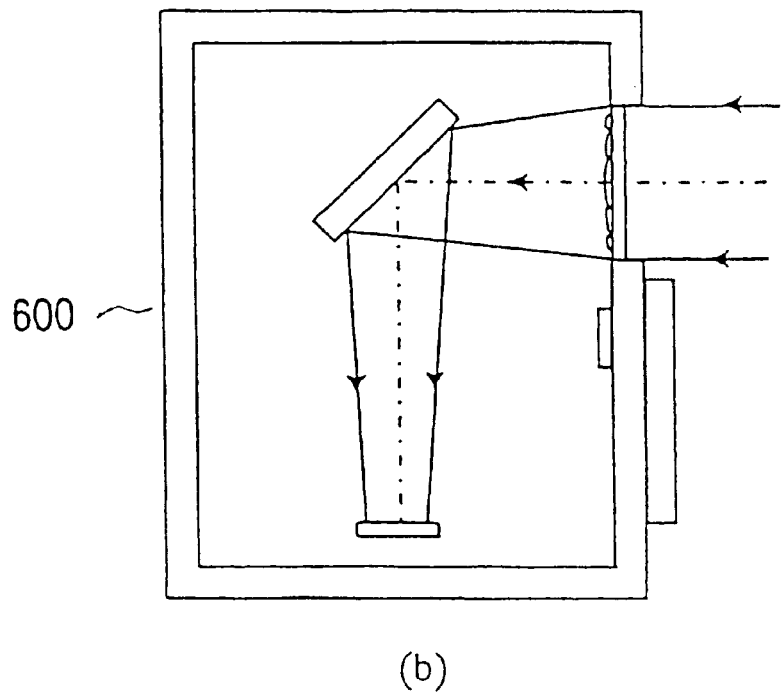
(b)

FIG.32
(a)
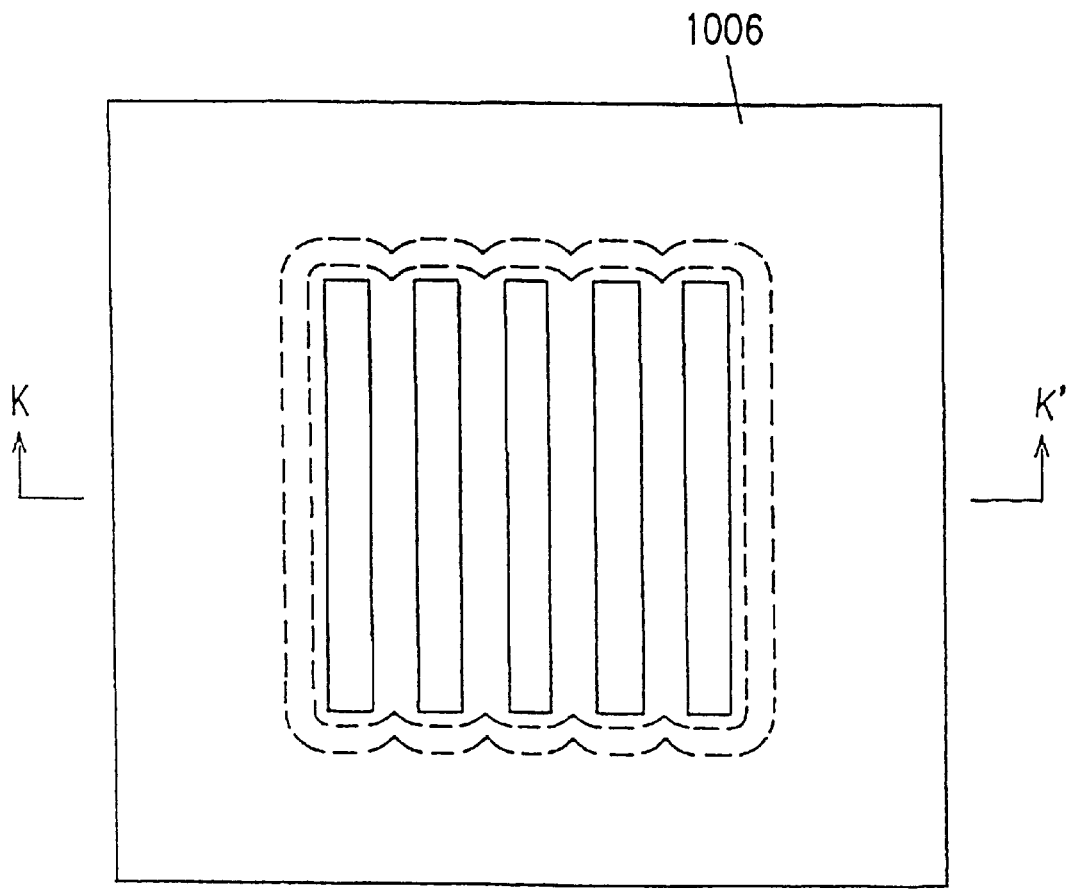
(b)
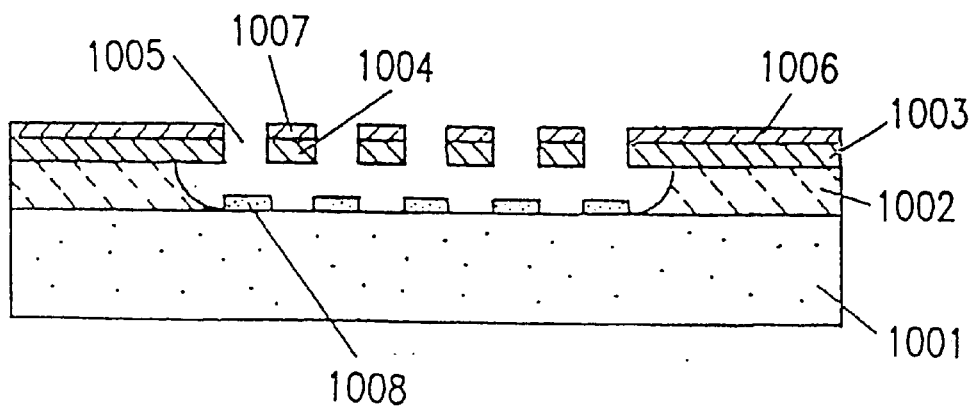

FIG. 33
(a)
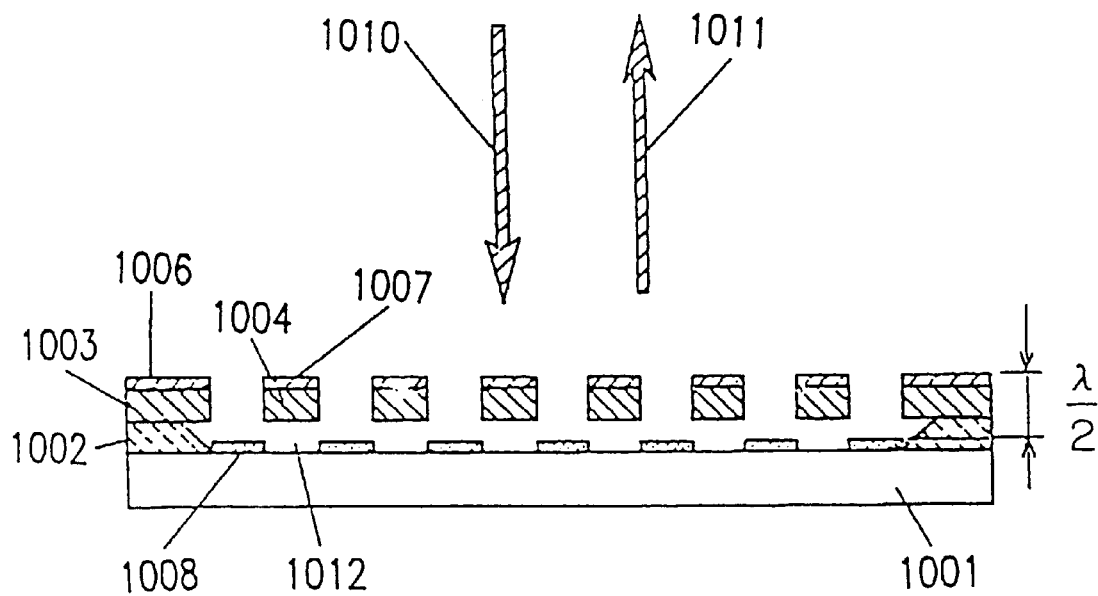
(b)
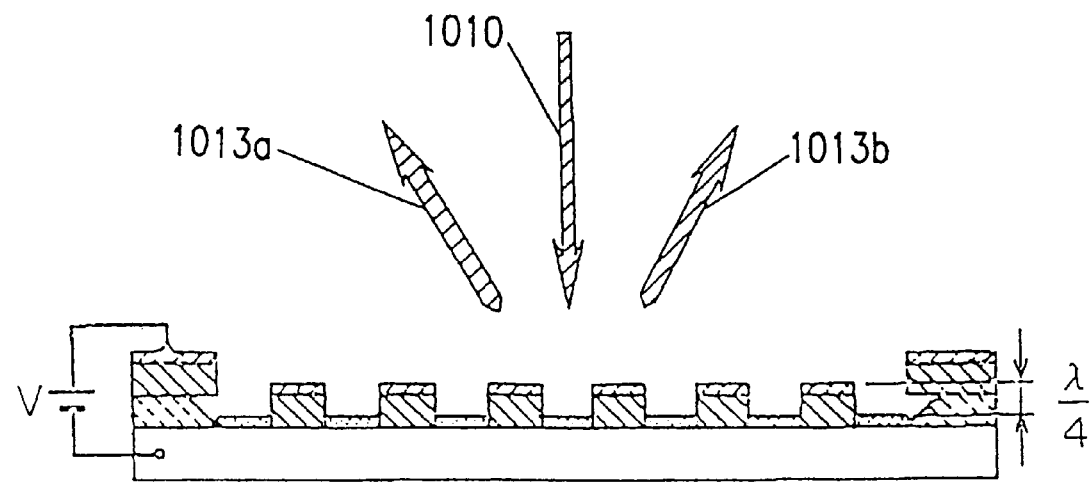

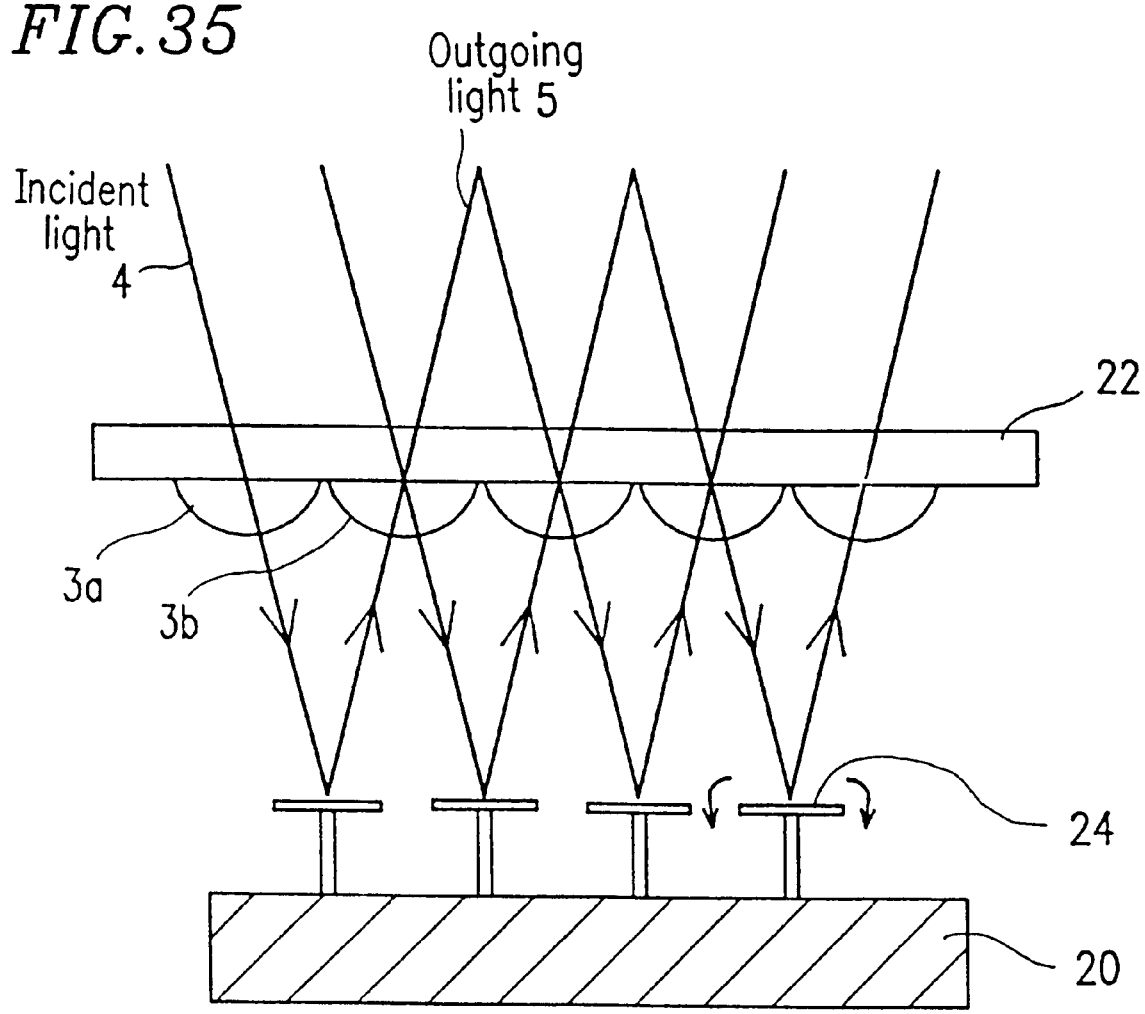

OUTPUT EFFICIENCY CONTROL DEVICE, PROJECTION-TYPE DISPLAY APPARATUS, INFRARED SENSOR, AND NON-CONTACT THERMOMETER

TECHNICAL FIELD

The present invention relates to an output efficiency control device, and a projection-type display apparatus, an infrared sensor and a non-contact thermometer which use the output efficiency control device.

BACKGROUND ART

An optical modulator modulates the intensity of incident light and outputs it. As a conventional example, there has been an optical modulator described in U.S. Pat. No. 5,311,360 and an article "Deformable Grating Optical Modulator" (Optics Letters, Vol. 17, No. 9, May 1, 1992) by O. Solgaard et al. This optical modulator modulates the intensity of light by utilizing the diffraction effect of light and has the advantage of being miniaturized and mass-produced in an IC process.

FIG. 32(a) is a plan view of an optical modulator described in the above-mentioned U.S. patent and article, and FIG. 32(b) is a cross-sectional view taken along a line K–K' in FIG. 32(a).

The optical modulator includes a silicon substrate 1001, a spacer layer 1002 made of a silicon oxide film formed in a peripheral region of the silicon substrate 1001, and a dielectric layer 1003. The dielectric layer 1003 is patterned to a plurality of minute dielectric beams 1004, and the dielectric beams 1004 float in a hollow space with both ends supported by the spacer layer 1002. The dielectric layer 1003 is made of a silicon nitride film rich in silicon, and its residual stress is reduced to about 200 MPa. The thickness of the spacer layer 1002 and the dielectric layer 1003 is set to be equal to ¼ of a wavelength of light whose efficiency is to be controlled, i.e., light which is incident upon the optical modulator.

Openings 1005 each having a width equal to that of each dielectric beam 1004 are formed between the dielectric beams 1004. Furthermore, an Al reflective film 1006 which also functions as an electrode is provided above the substrate 1001. The reflective film 1006 is composed of upper reflective films 1007 formed on the surfaces of the dielectric beams 1004 and lower reflective films 1008 formed on the surface of the substrate 1001 through the openings 1005. The upper reflective films 1007 and the lower reflective films 1008 form a reflection-type grating.

The optical modulation principle of a conventional optical modulator having the above-mentioned structure will be described with reference to FIGS. 33(a) and (b). In these figures, components identical with those in FIG. 32 are denoted by the reference numerals identical with those in FIG. 32, and their description will be omitted.

FIG. 33(a) shows a state where a voltage is not applied between the reflective film 1006 and the substrate 1001. At this time, the difference in step between the upper reflective films 1007 and the lower reflective films 1008 is ½ of a wavelength of the incident light, and the difference in optical path between light reflected from the upper reflective films 1007 and light reflected from the lower reflective films 1008 is one wavelength. Therefore, the phases of these light beams are matched. Thus, the reflection-type grating functions as an ordinary mirror with respect to incident light 1010 which is incident upon the grating,, and the incident light 1010 becomes zero-th order diffracted light 1011 to be reflected to an incident side.

On the other hand, under the condition that a voltage is applied between the reflective film 1006 and the substrate 1001, the reflective film 1006 and the substrate 1001 forms a capacitor interposing the dielectric layer 1003 and an air layer 1012, and the reflective film 1006 is positively charged and the substrate 1001 is negatively charged. Since an electrostatic attracting force is affected between the charges, the dielectric beams 1004 are bent and attracted to the substrate 1001 until they come into contact with the substrate 1001, as shown in FIG. 33(b). At this time, the difference in step between the surfaces of the upper reflective films 1007 and those of the lower reflective films 1008 becomes ¼ of a wavelength of the incident light, and the difference in optical path between the light reflected from the surfaces of the upper reflective films 1007 and the light reflected from the surfaces of the lower reflective films 1008 becomes a ½ wavelength in round travel, whereby the phases between these light beams are shifted by a half wavelength. Thus, the light reflected from the upper reflective film 1007 and the light reflected from the lower reflective film 1008 cancel each other to eliminate zero-th order diffracted light, and diffracted light other than the zero-th order diffracted light is output. For example, at this time, ±1st order diffracted light beams 1013a and 1013b are generated at a diffraction efficiency of 41%, respectively. As described above, the optical modulator is capable of modulating incident light by turning on/off a voltage applied to the reflective film 1006 and the substrate 1001.

However, the above-mentioned conventional optical modulator modulates incident light having a beam diameter at most with a size of the grating. Thus, in order to modulate incident light having a large diameter, it is required to increase the size of the grating. However, when the grating is increased in size, the grating is likely to adhere to the silicon substrate 1001 during the step of floating the grating by a half wavelength. Therefore, it was difficult to produce such a conventional optical modulator with a good yield.

The objective of the present invention is to provide an optical modulator which is capable of modulating the light amount of incident light having a large beam diameter and which has a high response speed, an output efficiency control device which is capable of obtaining a uniform diffraction effect, and a display apparatus, an infrared sensor and a non-contact thermometer which use the optical modulator and the output efficiency control device.

DISCLOSURE OF THE INVENTION

An optical modulator of the present invention comprises: output efficiency control means for modulating a light amount of light which is incident thereupon; first focusing means for focusing the light onto the output efficiency control means; and second focusing means for outputting the light whose light amount is modulated by the output efficiency control means, wherein the first and second focusing means are disposed so as to oppose the output efficiency control means, whereby the above-mentioned objective is achieved.

In an embodiment, the output efficiency control means is a reflection-type optical element.

In an embodiment, the first focusing means and the second focusing means are formed on an identical surface of a substrate.

In an embodiment, the optical modulator further has a transparent substrate having a first surface and a second surface opposing each other, and the first focusing means and the second focusing means are formed on the first surface of the transparent substrate, and the output efficiency control means is a reflection-type optical element formed on the second surface of the transparent substrate.

In an embodiment, the output efficiency control means includes: a transparent electrode which functions as a first electrode, formed on the second surface of the transparent substrate; a first grating formed on the transparent electrode; a spacer layer formed on the transparent electrode; and a second grating composed of a plurality of beams having portions which function as second electrodes, both ends of the beams being supported on the spacer layer, wherein a distance between the transparent electrode and the second grating is varied by adjusting a voltage applied between the first electrode and the second electrodes, thereby controlling an efficiency at which the light focused by the first focusing means is output to the second focusing means. The output control efficiency means may further have an insulating layer provided on the first grating.

In an embodiment, the first and second focusing means have an identical shape, and the output efficiency control means is disposed with a center thereof positioned at a point of intersection of a line vertical to a plane on which the first focusing means and the second focusing means are formed, extending from a center of a straight line connecting a center of the first focusing means and a center of the second focusing means, and a plane on which the output efficiency control means is; formed.

In an embodiment, the first focusing means and the second focusing means have a similar elliptical shape in which a cross-section in a thickness direction gradually decreases and are arranged in a major axis direction thereof. Preferably, assuming that an incident angle of an optical axis of the light incident on the first focusing means with respect to a vertical direction of a plane on which the first focusing means and the second focusing means are formed is θ, a size ratio of the major axis of the ellipsoid to a minor axis is 1/cos θ.

In an embodiment, the first focusing means and the second focusing means are diffraction-type microlenses having a binary/multi-level structure.

In an embodiment, the first focusing means and the second focusing means are square lenses each having a rectangular aperture, and an interval between the plurality of beams in the second grating of the output efficiency control means gradually increases in a longitudinal direction of the beams. A period of the grating may increase according to a linear function in a longitudinal direction of the grating. Preferably, the first grating and the second grating of the output efficiency control means are designed in such a manner that a portion of the grating having a smallest period becomes 7 times or more a wavelength of the incident light. More preferably, assuming that a length of one side of the lens is L, a focal length of the lens is f, and an angle formed by a normal to a principal plane of the plate of the output efficiency control device and the optical axis of the lens is θ, the first grating and the second grating are designed in such a manner that a portion of the grating having a largest period becomes 7(2f+L tan θ)/(2f−L tan θ) times or more the wavelength of the incident light. In the second grating, lengths of the plurality of beams may be equal.

In an embodiment, the output efficiency control means is a movable mirror.

According to another aspect of the present invention, a display apparatus is provided. The display apparatus includes: a light source; splitting means for splitting light emitted from the light source into a plurality of colored light beams having wavelength ranges different from each other; a plurality of optical modulators, provided in optical paths of the plurality of colored light beams, respectively, for modulating the plurality of colored light beams, respectively; and an imaging lens imaging the plurality of colored light beams modulated by the plurality of optical modulators, wherein each of the plurality of optical modulators includes: a plurality of output efficiency control means arranged in an array, for modulating a light amount of a corresponding colored light beam of the plurality of colored light beams; and focusing means having a plurality of focusing elements arranged in an array, the corresponding colored light beam is incident upon the focusing means in a direction oblique to an optical axis of the focusing means and is focused on the output efficiency control means, and the modulated corresponding colored light beam is output in an oblique direction through the focusing means.

In an embodiment, an incident angle at which the colored light beam is incident upon the focusing means is equal to an angle at which the colored light beam is output from the focusing means, an interval at which the plurality of output efficiency control means are arranged is equal to an interval at which the plurality of focusing elements are arranged in the focusing means, and the plurality of output efficiency control means are disposed so as to be shifted by a half of the arrangement interval with respect to the focusing means in a direction in which an incident direction of the colored light beam is tilted with respect to the optical axis of the focusing means.

In an embodiment, each of the plurality of output efficiency control means is disposed so as to oppose a pair of focusing elements adjacent to each other of the plurality of focusing elements of the focusing means, receives the corresponding colored light beam from one of the pair of focusing elements, and outputs the modulated corresponding colored light beam to the other one of the pair of focusing elements.

In an embodiment, the plurality of output efficiency control means are arranged in an m-row and n-column two-dimensional array, the plurality of focusing elements are arranged in an (m+1)-row and n-column two-dimensional array in the focusing means, and output efficiency control means on a k-th row is disposed so as to correspond to a focusing element on a k-th row and a focusing element on a (k+1)-th row.

In an embodiment, the plurality of optical modulators include a transparent substrate having a first surface on which the focusing means is formed and a second surface opposing the first surface, and the output efficiency control means is a reflection-type optical element formed on the second surface. Each of the plurality of output efficiency control means includes: a transparent electrode which functions as a first electrode, provided on the second surface of the transparent substrate; a first grating formed on the transparent electrode; a spacer layer formed on the transparent electrode; and a second grating composed of a plurality of beams having portions which function as second electrodes, both ends of the beams being supported on the spacer layer, wherein a distance between the transparent electrode and the second grating is varied by adjusting a voltage applied between the first electrode and the second electrodes, thereby an efficiency at which the corresponding colored light beam is output to the focusing means is controlled.

In an embodiment, the plurality of focusing elements have a similar elliptical shape in which a cross-section gradually decreases in a thickness direction thereof. Preferably, assuming that an angle of an optical axis of the corresponding colored light beam incident upon the focusing means with respect to a vertical direction of a plane on which the focusing means is formed is $\theta$, a size ratio of a major axis of the ellipsoid to a minor axis is $1/\cos \theta$.

In an embodiment, the splitting means has a first splitting element which reflects a blue light beam and transmits the other light beams, a second splitting element which reflects a green light beam and transmits the other light beams, and a third splitting element which reflects a red light beam and transmits the other light beams. A wavelength bandwidth of light reflected from the first splitting element is smaller than wavelength bandwidths of light reflected from the second splitting element and the third splitting element. Alternatively, a wavelength bandwidth of light reflected from the third splitting element is larger than wavelength bandwidths of light reflected from the first splitting element and the second splitting element. Alternatively, a wavelength bandwidth of reflected light decreases in the order of the third splitting element, the second splitting element, and the first splitting element. Preferably, the light emitted from the light source passes through the first splitting element, the second splitting element, and the third splitting element in this order.

In an embodiment, each of the plurality of optical modulators further has a control circuit of the output efficiency control means, and the second electrode of each of the output efficiency control means is connected to a connecting electrode of the control circuit via a solder bump.

In an embodiment, each of the plurality of optical modulators further has light absorbing means provided in a region of the transparent substrate other than a region thereof where the focusing means and the plurality of output efficiency control means are formed. The light absorbing means may also be provided on each periphery of the plurality of focusing elements.

In an embodiment, the output efficiency control means outputs zero-th order diffracted light of the corresponding colored light beam.

In an embodiment, the plurality of output efficiency control means are an array of movable mirrors.

In an embodiment, the focusing means is a diffraction-type microlens array having a binary/multi-level structure.

In an embodiment, in the second grating, an interval of the plurality of beams gradually increases in a longitudinal direction of the beams. A period of the grating increases according to a linear function in a longitudinal direction of the grating. In the second grating, lengths of the plurality of beams are equal.

According to another aspect of the present invention, an output efficiency control device is provided. The output efficiency control device is an output efficiency control device which modulates a light amount of incident light and outputs the modulated light, comprising: a plate having a portion which functions as a first electrode; a spacer layer formed on the plate; and a grating composed of a plurality of beams which are not parallel to each other, the beams having portions which function as second electrodes, both ends of the beams being supported on the spacer layer, wherein a distance between the grating and the plate is varied by adjusting a voltage applied between he first electrode and the second electrodes, whereby an output efficiency of the light is controlled.

In an embodiment, a period of the grating gradually increases in a longitudinal direction of the grating. A period of the grating increases according to a linear function in a longitudinal direction of the grating. Lengths of the plurality of beams are equal.

In an embodiment, the plurality of beams of the grating are aligned on an identical plane when a voltage is not applied between the first electrode and the second electrodes, and every other beam is attracted to the plate side when a voltage is applied, thereby the output efficiency is controlled. The plurality of beams are densely aligned and function as a mirror when a voltage is not applied between the first electrode and the second electrodes.

In an embodiment, assuming that a wavelength of the incident light is $\lambda$, and an angle formed by a normal of a principal plane of the plate of the output efficiency control device and an optical axis of the incident light is $\theta$, an operation distance of the grating is set to be $m\lambda/(4 \cos \theta)$, where m is an integer.

In an embodiment, assuming that a wavelength of the incident light is $\lambda$, and an angle formed by a normal to a principal plane of the plate of the output efficiency control device and an optical axis of the incident light is $\theta$, a thickness of the beams is set to be $m\lambda/(4 \cos \theta)$, where m is an integer.

In an embodiment, the output efficiency control device of the present invention further includes a reflective film formed on a surface of the plate and a surface of the grating.

In an embodiment, the output efficiency control device of the present invention further includes an insulating film formed between the plate and the grating. Furthermore, the output efficiency control device of the present invention further includes a reflective film formed on a surface of the insulating layer and a surface of the grating.

According to another aspect of the present invention, an infrared sensor is provided. The infrared sensor includes: a lens for focusing infrared light; a pyro-electric element; and the output efficiency control device having the above-described configuration, which receives the infrared light focused by the lens and outputs at least part of the infrared light to the pyro-electric element.

In an embodiment, the pyro-electric element has a rectangular surface.

In an embodiment, the lens has a rectangular aperture.

In an embodiment, the output efficiency control device is obliquely disposed in such a manner that a normal to a principal plane of the plate is disposed so as not to be parallel to an optical axis of the lens.

In an embodiment, the output efficiency control device is disposed in such a manner that only zero-th order diffracted light of diffracted light diffracted by the grating of the output efficiency control device is incident upon the pyro-electric element and diffracted light other than the zero-th order diffracted light is not incident upon the pyro-electric element.

In an embodiment, a change in a distance between the grating and the plate of the output efficiency control device changes a light amount of the zero-th order diffracted light.

In an embodiment, the infrared sensor further includes a sealing member having an opening, and the sealing member contains the output efficiency control device and the pyro-electric element. The lens may be provided in the opening of the sealing member.

In an embodiment, the lens is a diffraction-type lens.

In an embodiment, a smallest period of the grating of the output efficiency control device is 7 times or more a wavelength of the infrared light. Assuming that a length of one side of the lens is L, a focal length of the lens is f, and an angle formed by a normal to a principal plane of the plate of the output efficiency control device and an optical axis of the lens is θ, a largest period of the grating is 7(2f+L tan θ)/(2f−L tan θ) times or more a wavelength of the infrared light.

In an embodiment, the output efficiency control device is disposed in such a manner that a direction which is parallel to a principal plane of the plate and vertical to the grating is vertical to an optical axis of the lens.

According to another aspect of the present invention, an infrared sensor is provided. The infrared sensor includes: an output efficiency control device having a structure as described above, which outputs at least part of incident infrared light; a pyro-electric element; and a lens for focusing the infrared light output from the output efficiency control device onto the pyro-electric element, provided between the output efficiency control device and the pyro-electric element.

In an embodiment, the pyro-electric element has a rectangular surface.

In an embodiment, the lens has a rectangular aperture.

In an embodiment, the output efficiency control device is obliquely disposed in such a manner that a normal to a principal plane of the plate is not parallel to an optical axis of the lens.

In an embodiment, the output efficiency control device is disposed in such a manner that only zero-th order diffracted light of diffracted light diffracted by the grating of the output efficiency control device is incident upon the pyro-electric element, and diffracted light other than the zero-th order diffracted light is not incident upon the pyro-electric element.

In an embodiment, a change in a distance between the grating and the plate of the output efficiency control device changes a light amount of the zero-th order diffracted light.

In an embodiment, the infrared sensor further includes a sealing member having an opening, and the sealing member contains the output efficiency control device and the pyro-electric element.

In an embodiment, the lens has a surface relief structure in accordance with a modulated amount of a phase of the lens and is composed of a material selected from the group consisting of Si, Ge, GaAs, InP, GaP, ZnSe, and ZnS.

In an embodiment, the output efficiency control device is disposed in such a manner that a direction which is parallel to a principal plane of the plate and vertical to the grating is vertical to an optical axis of the lens.

According to another aspect of the present invention, an output efficiency control device array is provided, which modulates a light amount of incident light and outputs the modulated light, having a plurality of output efficiency control devices arranged in a two-dimensional array. Each of the plurality of output efficiency control devices includes: a plate having a portion which functions as a first electrode; a spacer layer formed on the plate; and a grating composed of beams which are not parallel to each other, the beams having portions which function as second electrodes, both ends of the beams being supported on the spacer layer, wherein a distance between the grating and the plate is varied by adjusting a voltage applied between the first electrode and the second electrodes, thereby an efficiency at which the light is output is controlled.

According to another aspect of the present invention, an infrared sensor is provided. The infrared sensor includes: a lens for focusing infrared light; a pyro-electric element; and an output efficiency control device array having the above-mentioned structure, which receives the infrared light focused by the lens and outputs at least part of the infrared light to the pyro-electric element.

According to still another aspect of the present invention, a method for driving an infrared sensor having the above-mentioned structure is provided. The method includes the steps of: successively operating the plurality of output efficiency control devices, and successively detecting output signals from the pyro-electric element thus obtained; and detecting a two-dimensional infrared light intensity distribution as information in time sequence, based on the detected output signals from the pyro-electric element.

According to still another aspect of the present invention, an infrared sensor is provided. The infrared sensor includes: an output efficiency control device array having the above-mentioned structure, which outputs at least part of incident infrared light; a pyro-electric element; and a lens for focusing the infrared light output from the output efficiency control device onto the pyro-electric element, provided between the output efficiency control device and the pyro-electric element.

According to still another aspect of the present invention, a method for driving an infrared sensor having the above-mentioned structure is provided. The method includes the steps of: successively operating the plurality of output efficiency control devices, and successively detecting output signals from the pyro-electric element thus obtained; and detecting a two-dimensional infrared light intensity distribution as information in time sequence, based on the detected output signals from the pyro-electric element.

According to still another aspect of the present invention, a non-contact thermometer is provided. The non-contact thermometer includes: a lens for focusing infrared light; a housing having an opening; a shield which closes and opens the opening; a pyro-electric element provided in the housing; contact-type temperature measuring means provided on a side wall of the housing; and an output efficiency control device having the above-mentioned structure, which is provided in the housing, receives the infrared light focused by the lens, and outputs at least part of the infrared light. Preferably, the contact-type temperature measuring means is a thermo-couple.

According to still another aspect of the present invention, a non-contact thermometer is provided. The non-contact thermometer includes: a housing having an opening; a shield which closes and opens the opening; a pyro-electric element provided in the housing; contact-type temperature measuring means provided on a side wall of the housing; an output efficiency control device having the above-mentioned structure, which is provided in the housing, receives infrared light through the opening, and outputs at least part of the infrared light; and a lens which outputs at least part of the infrared light output from the output efficiency control device to the pyro-electric element. Preferably, the contact-type temperature measuring means is a thermocouple.

According to still another aspect of the present invention, a non-contact thermometer is provided. The non-contact thermometer includes: a lens for focusing infrared light; a housing having an opening; a shield which closes and opens the opening; a pyro-electric element provided in the housing; contact-type temperature measuring means provided on a side wall of the housing; and an output efficiency control device array having the above-mentioned structure, which is provided in the housing, receives the infrared light focused by the lens, and outputs at least part of the infrared light. Preferably, the contact-type temperature measuring means is a thermo-couple.

According to still another aspect of the present invention, a non-contact thermometer is provided. The non-contact thermometer includes: a housing having an opening; a shield which closes and opens the opening; a pyro-electric element provided in the housing; contact-type temperature measuring means provided on a side wall of the housing; the output efficiency control device of claim 71, which is provided in the housing, receives infrared light incident through the opening, and outputs at least part of the infrared light; and a lens which outputs at least part of the infrared light output from the output efficiency control device to the pyro-electric element. Preferably, the contact-type temperature measuring means is a thermo-couple.

According to still another aspect of the present invention, a method for producing a display apparatus having the above-mentioned structure is provided. The production method includes the steps of: producing the plurality of optical modulators; and arranging and assembling the light source, the splitting means, the plurality of optical modulators, and the imaging lens, wherein the step of producing the plurality of optical modulators includes: forming the focusing means on a first surface of a transparent substrate; forming the plurality of output efficiency control means each having a connecting portion for driving on a second surface of the transparent substrate opposing the first surface; connecting the connecting portion for driving to a driving circuit for driving the plurality of output efficiency control means; in the case where there is a connection defect between the connecting portion for driving and the driving circuit, irradiating the connecting portion corresponding to the connection defect with laser light, thereby repairing the connection defect.

BRIEF DESCRIPTION OF THE DRAWINGS

FIGS. 2a–2b is a cross-sectional view taken along a line A–A' in FIG. 1.

FIG. 3 shows an example of diffraction-type elliptical microlenses: (a) is a plan view and (b) is a cross-sectional view of one of the microlenses in (a).

FIGS. 4a–4g illustrates the steps of producing an output efficiency control device in Embodiment 1.

FIGS. 11a–11c shows a relationship between the array of a plurality of arranged rectangular microlenses and the aperture ratio.

FIG. 15 is a view showing an example of a spot shape on a pyro-electric element: (a) shows the case where incident light is focused on the pyro-electric element using a conventional circular lens and (b) shows the case where a lens is in the form of a rectangle.

FIG. 16 shows a structure of an output efficiency control device in Embodiment 4: (a) is a plan view and (b) is a cross-sectional view taken along a line B–B' in (a).

FIGS. 18a–18b illustrates an operation of the output efficiency control device in FIG. 16.

FIG. 19 shows a structure of an optical modulator in a display apparatus in Embodiment 5 of the present invention: (a) is a top perspective view and (b) is a cross-sectional view.

FIG. 21 schematically shows a grating configuration of the output efficiency control device in Embodiment 5.

FIG. 22 is a view showing a structure of an output efficiency control device in Embodiment 6 of the present invention: (a) is a plan view and (b) is a cross-sectional view taken along a line E–E' in (a).

FIG. 23 shows a structure of an output efficiency control device in Embodiment 7 of the present invention: (a) is a plan view and (b) is a cross-sectional view taken along a line F–F' in (a).

FIGS. 24a–24c illustrates the steps of producing the output efficiency control device in FIG. 23.

FIGS. 25a–25b illustrates an operation of the output efficiency control device in FIG. 23.

FIG. 26 is a view showing a structure of an infrared sensor in Embodiment 8 of the present invention: (a) is a side view and (b) is a view seen in a −x direction from a plane which is parallel to a y–z plane and includes a line G–G'.

FIG. 28 is a view showing a structure of an output efficiency control device array in the infrared sensor in FIG. 27: (a) is a plan view, (b) is a cross-sectional view taken along a line H–H' in (a), and (c) is a cross-sectional view taken along a line I–I' in (a).

FIG. 30 is a view showing a structure of an infrared sensor in Embodiment 10 of the present invention: (a) is a side view and (b) is a view seen in a −x direction from a plane which is parallel to a y–z plane and includes a line J–J'.

FIGS. 31a–31b is a cross-sectional view showing a structure of a non-contact thermometer in Embodiment 11 of the present invention.

FIG. 32 is a view showing a structure of a conventional optical modulator: (a) is a plan view and (b) is a cross-sectional view taken along a line K–K' in (a).

FIGS. 33a–33b illustrates an optical modulation principle of a conventional optical modulator.

FIG. 35 is a view showing a structure of an optical modulator using an array of movable mirrors.

BEST MODE FOR CARRYING OUT THE INVENTION

Embodiment 1

Figure 1:
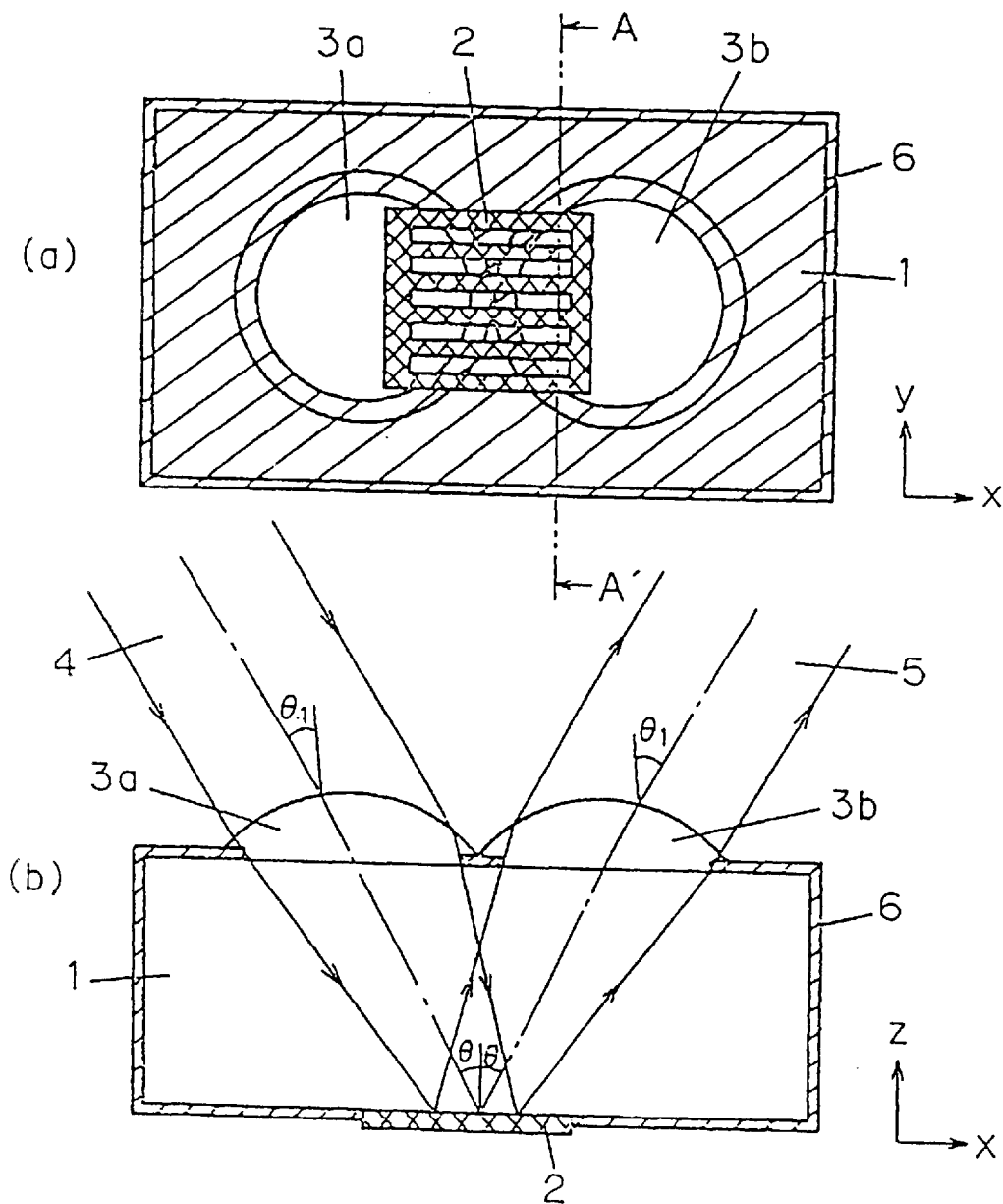
FIG. 1 is a view showing a structure of an optical modulator in Embodiment 1 of the present invention: (a) is a perspective view seen from a lower surface and (b) is a side view.

FIGS. 1(a) and (b) are a perspective view seen from a lower surface showing a structure of an optical modulator in Embodiment 1 of the present invention and a side view thereof, and FIG. 2 is a cross-sectional view taken along a line A–A' in FIG. 1.

In the optical modulator of the present embodiment, as shown in FIG. 1, a microlens 3a as first focusing means and a microlens 3b as second focusing means are formed on a first surface which is a surface of a transparent substrate 1 made of glass or the like having a thickness of, for example, 2 mm. The microlenses 3a and 3b are provided adjacent to each other, having the identical shape.

A reflection-type output efficiency control device 2 is formed on a second surface opposing the first surface of the transparent substrate 1. The output efficiency control device 2 is provided with its center disposed at a crossed point of a vertical line to the plane (first surface) on which the lenses are formed, extending from the center of a straight line connecting the center of the lens 3a to the center of the lens 3b, and the plane (second surface) on which the output efficiency control device 2 is formed. In other words, in the present embodiment, the output efficiency control device 2 is disposed right below the middle point between the microlenses 3a and 3b.

In the present embodiment, circular lenses having an aperture of 1 mm were used as the microlenses 3a and 3b. Such circular lenses may be produced by any method. In the present embodiment, a resist is coated on a substrate 1, the substrate 1 is baked at a softening temperature of the resist or higher so as to cause the resist to flow, and the resist is formed into a mountain shape by surface tension.

In the present embodiment, although circular microlenses are used, the shape of the microlens is not limited thereto. For example, rectangular or elliptical lenses can be used. Furthermore, a diffraction-type microlens or an aspheric lens may be produced by a semiconductor process such as photolithography, etching, and deposition. FIG. 3(a) is a plan view showing an example of diffraction-type elliptical microlenses. FIG. 3(b) is a cross-sectional view of one microlens in FIG. 3(a) taken along an x–z plane. A diffraction-type microlens having a binary/multi-level structure in the form of steps in cross-section as shown in FIG. 3(b) can be mass-produced by repeat photolithography, etching/deposition of thin films used in an ordinary semiconductor process. Therefore, microlenses having outstanding mass-productivity and production precision can be obtained.

For example, incident light 4 having a beam diameter of 0.9 mm is incident upon the microlens 3a so that an optical axis of the incident light 4 is at an angle of θ1 (e.g., 20.2°) with respect to in a z-axis direction shown in FIG. 1(b), travels through the substrate 1 while the optical axis thereof is at an incident angle of θ (e.g., 13.3°), and is focused onto the output efficiency control device 2. Here, the incident light 4 is reflected (reflection angle: θ, e.g., 13.3°), is collimated by the microlens 3b, and is output as outgoing light 5 with the optical axis being at an output angle of θ1 (e.g., 20.2°).

In the present embodiment, a light-absorbing member 6 is provided in a region of the surface of the transparent substrate 1 other than the regions where the microlenses 3a and 3b and the output efficiency control device 2 are formed. The light-absorbing member 6 was produced by coating a film which has a light-absorbing function with respect to a wavelength of incident light, e.g., a carbon or phthalocyanine compound mixed with a polymer such as polyimide and PMMA. However, the structure and method for production of the light-absorbing member 6 are not limited thereto. The light-absorbing member 6 may be formed by vapor-depositing an organic film of a pigment or the like having a light-absorbing effect with respect to a wavelength of incident light. Such a light-absorbing member 6 has the effect of removing stray light in the substrate 1 and from outside of the substrate 1 and improving an S/N ratio of the outgoing light 5.

In the present embodiment, the light-absorbing member 6 is also provided on the periphery of the microlenses 3a and 3b. Such a structure has the advantage of allowing only the regions with satisfactory lens characteristics to be used as first and second focusing means, without using the periphery of the microlenses where the lens characteristics are generally likely to degrade due to the surface tension with respect to the substrate 1.

The plane structure of the output efficiency control device 2 is shown as a perspective view in FIG. 1(a), and the output efficiency control device 2 has a size of, for example, 100 μm×100 μm. Hereinafter, referring to FIGS. 2 and 4, the structure and the production steps of the output efficiency control device 2 will be described. In the following description of the structure of the output efficiency control device 2, the structure is described, seen from the reverse surface (second surface) of the substrate 1, and therefore, the vertical relationship is opposite to that in FIG. 2.

First, as shown in FIG. 4(a), a transparent conductive film 7 which functions as a first electrode and a reflective film 8 are formed in this order on one surface of the transparent substrate 1. In the present embodiment, a glass substrate with a thickness of 2 mm is used as the substrate 1, an ITO film with a thickness of 500 Å is formed on the substrate 1 as the transparent conductive film 7, and an Al film with a thickness of, for example, 4000 Å is formed as the reflective film 8.

Then, a resist mask (not shown) is formed on the reflective film 8, and the reflective film 8 is patterned to an appropriate shape by etching, whereby a first grating 8a is formed as shown in FIG. 4(b). Thereafter, as shown in FIG. 4(c), an insulating layer 9 with a thickness of $L_2$ is formed so as to cover the grating 8a. In the present embodiment, a SiO$_2$ layer with a thickness of 0.086 μm was formed as the insulating layer 9. The insulating layer 9 is used for preventing a short circuit between the first grating 8a and a second grating 8b described later.

Furthermore, a sacrifice layer 10 and a reflective film 8' are formed as shown in FIGS. 4(d) and 4(e). In the present embodiment, a polyimide layer with a thickness of 0.3 μm was formed as the sacrifice layer 10 and an Al film with a thickness of, for example, 4000 Å was formed as the reflective film 8'. The sacrifice layer 10 functions as a spacer layer. Then, a resist mask (not shown) is formed on the reflective film 8', and the reflective film 8' is patterned to an appropriate shape by etching, whereby a second grating 8b which functions as a second electrode and an electrode 8c are formed as shown in FIG. 4(f). The second grating 8b is formed as a plurality of beams with both ends thereof supported on the sacrifice layer (spacer layer) 10 and electrically connected to the electrode 8c. Finally, the sacrifice layer 10 is removed. This allows a space with a distance of $L_3$ to be formed between the second grating 8b and the insulating layer 9.

When a voltage is applied between the first electrode 7 and the second electrode 8b, the second grating 8b comes into contact with the $SiO_2$ layer 9 by electrostatic force. As a result, the distance between the first and second gratings 8a and 8b changes. This enables even the output efficiency of incident light from the substrate 1 side to be controlled.

A thickness $L_2$ of the $SiO_2$ layer 9 and a distance $L_3$ in the space between the second grating 8b and the $SiO_2$ layer 9 are set so as to satisfy $L_2=\lambda/(4n \cos \theta)$, $L_3=\lambda/(4 \cos \theta 1)$, where the refractive index of the $SiO_2$ layer 9 is n (e.g., 1.5) and the wavelength of the incident light 4 is $\lambda$ (e.g., 0.5 $\mu$m). Thus, under a state where a voltage is not applied as shown in FIG. 2(a), the distance between the first grating 8a and the second grating 8b seen from the incident light 4 side becomes a ½ wavelength, and the phases of light are matched in round travel. That is, the output efficiency control device 2 functions in the same way as in a mirror under no application of voltage, and only the reflected light 5 which is zero-th order diffracted light is generated. On the other hand, the distance between the first grating 8a and the second grating 8b becomes a ¼ wavelength under the application of a voltage as shown in FIG. 2(b). Therefore, the phases become opposite in round travel, and reflected light beam disappears, whereby ±1st order diffracted light 11a and 11b are generated. That is, the intensity of the reflected light 5 or the intensities of ±1st order diffracted light 11a and 11b can be modulated; however, in the present embodiment, reflected light (zero-th order diffracted light) is paid attention to, and the reflected light is modulated.

The optical modulator of the present invention focuses the incident light 4 onto the microlens 3a, directs the incident light 4 onto the output efficiency control device 2, collimates reflected light which is zero-th order diffracted light by the microlens 3b, and outputs the collimated light as the outgoing light 5. This enables the efficiency of the outgoing light to be modulated by using the output efficiency control device 2 with an area much smaller than beam diameters of the incident light 4 and the outgoing light 5. In the output efficiency control device 2 with a size of 100 $\mu$m×100 $\mu$m produced as described above, the second grating 8b is not likely to adhere to the $SiO_2$ layer 9 during the step of floating the second grating 8b. Thus, an output efficiency control device 2 can be produced with a good yield.

Moreover, since the grating portion decreases in size, response speed can be improved.

Furthermore, in the optical modulator of the present embodiment, as described above, the microlenses 3a and 3b and the output efficiency control device 2 are monolithically integrated on the front and reverse surfaces of the transparent substrate 1. Thus, an optical modulator which is stable in terms of structure can be obtained.

In the case where incident light is focused onto the output efficiency control device 2 by using a microlens, it is required to dispose the output efficiency control device 2 exactly on the focal point of the microlens. However, in the optical modulator of the present embodiment, the distance between the microlens and the output efficiency control device 2 can be precisely set with ease only by prescribing the thickness of the transparent substrate 1 so as to correspond to the focal length of the microlens. Thus, assembly can be conducted with good precision.

An output efficiency control device and focusing means for focusing incident light onto the output efficiency control device may be provided on separate substrates and then combined. Furthermore, a conventional optical modulator and a microlens can be combined, although they cannot be integrated.

Furthermore, in place of the reflection-type output efficiency control device used in the present embodiment, a combination of an output efficiency control device which functions in the form of a transmission type and reflecting means such as a mirror, may be used with first and second focusing means such as microlenses.

A device with a grating structure utilizing diffraction is used as the output efficiency control device in the present embodiment. The output efficiency control device is not limited thereto. Any device which is capable of controlling an output efficiency of light can be used. For example, a movable mirror with a micro mirror structure capable of being controlled by electrostatic force may be used.

Figure 5:
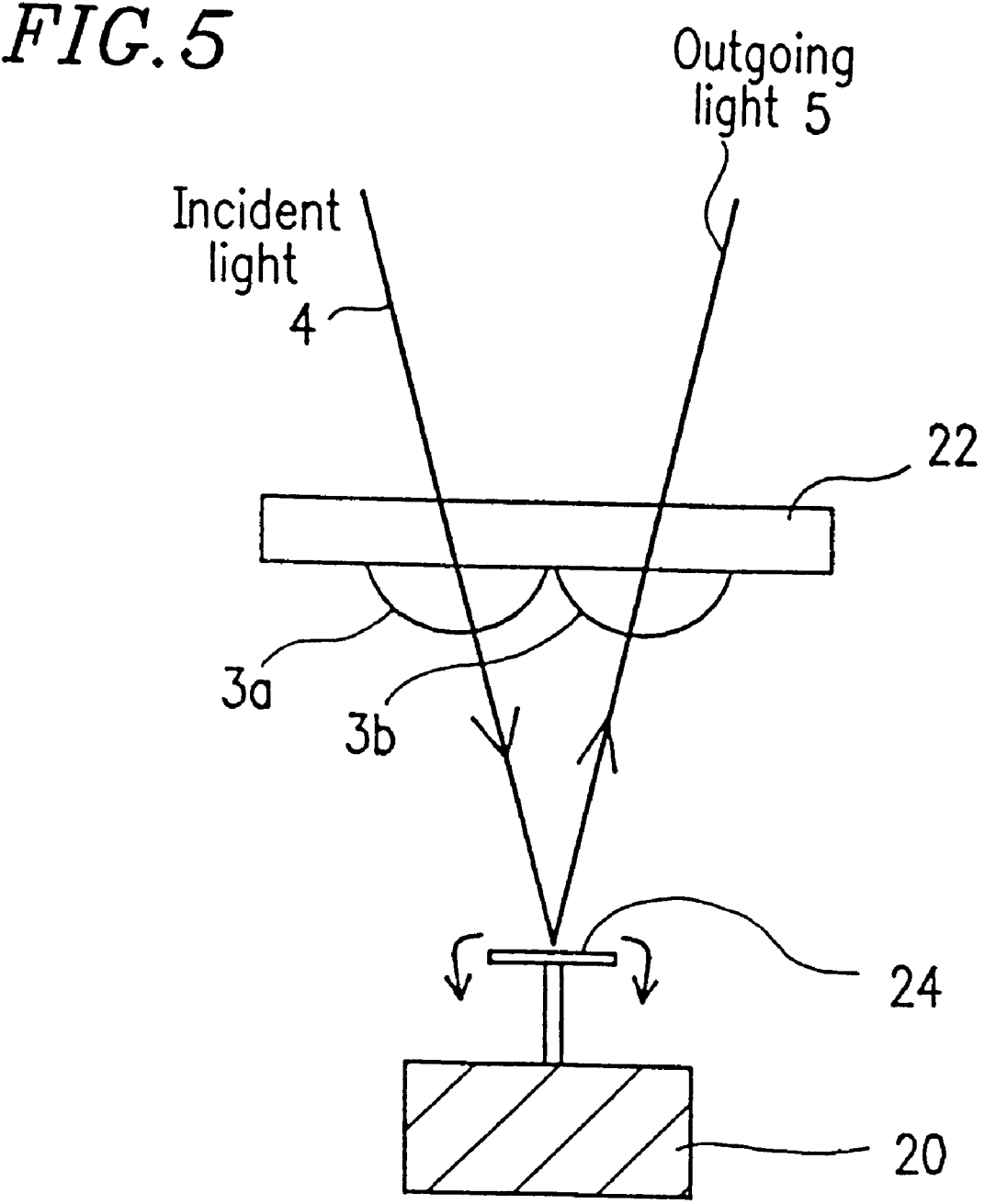
FIG. 5 is a view showing a structure of an optical modulator using a movable mirror as an output efficiency control device.

FIG. 5 shows a structure in cross-section of an optical modulator using a movable mirror as an output efficiency control device. In this optical modulator, a substrate 20 with a movable mirror 24 provided on one surface and a transparent substrate 22 with microlenses 3a and 3b as first and second focusing means provided on one surface are disposed in such a manner that the movable mirror 24 faces the microlenses 3a and 3b. Each movable mirror 24 is disposed right below a middle point between the adjacent microlenses 3a and 3b in the same way as in the above-mentioned output efficiency control device 2 with a grating structure, reflects light 4 which is incident through the microlens 3a, and outputs the light 4 as reflected light 5 through the microlens 3b. In the optical modulator with such a structure, light modulation is conducted utilizing only the reflection of light. Therefore, there is an advantage in that the output efficiency does not depend upon a wavelength of the incident light 4 and the device is easy to use.

Embodiment 2

Figure 6:
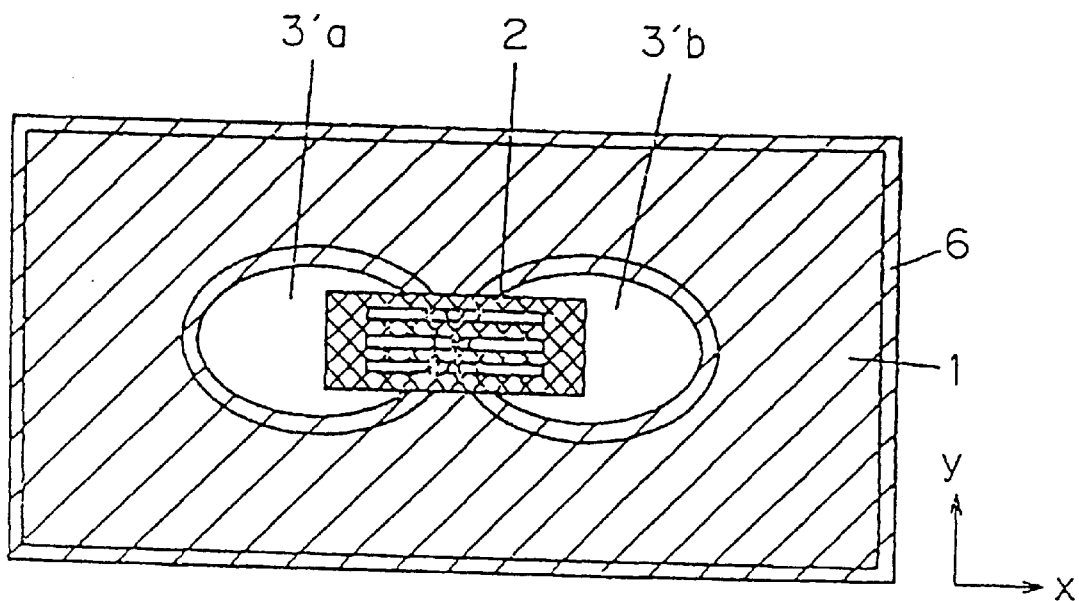
FIG. 6 is a perspective view seen from a lower surface showing a structure of the optical modulator in Embodiment 2 of the present invention.

FIG. 6 is a perspective view seen from a lower surface, showing a basic structure of an optical modulator of Embodiment 2 according to the present invention. In FIG. 6, the same components as those in FIG. 1 are denoted by the same reference numerals as those therein, and the description thereof will be omitted.

The optical modulator of the present embodiment is different from that in the above-mentioned Embodiment 1 only in the structures of the first focusing means for focusing light onto an output efficiency control device 2 and second focusing means for outputting light from the output efficiency control device 2. In Embodiment 1, the circular microlenses 3a and 3b are used as the first and second focusing means. However, in the present embodiment, elliptical microlenses 3'a and 3'b are provided in such a manner that their major axes are adjacent to each other.

Each of the elliptical microlenses 3'a and 3'b has a similar elliptical shape in which a cross-section in a thickness direction gradually becomes smaller. They are designed in such a manner that a size ratio of a major axis to a minor axis of an ellipsoid becomes 1/cos θ1, where θ1 is an incident angle of incident light.

As described above, the microlenses 3'a and 3'b are designed so as to have elliptical shapes in accordance with the incident angle, thereby aberration caused with respect to light which is obliquely incident upon the microlens is reduced and optical modulation can be conducted satisfactorily.

In the present embodiment, the size ratio of a major axis to a minor axis of an ellipsoid was prescribed to be, for example, 1.22 at, for example, θ1=35°. The device was able to function satisfactorily even at such a large incident angle. In particular, as the elliptical microlenses, diffraction-type elliptical microlenses with a binary/multi-level structure as shown in FIGS. 3(a) and (b) are suitable in terms of production.

Embodiment 3

Referring to FIGS. 7 through 10, a display apparatus of Embodiment 3 according to the present invention will be described. In these figures, the same components as those in FIGS. 1 through 6 are denoted by the same reference numerals as those therein, and the description thereof will be omitted.

Figure 7:
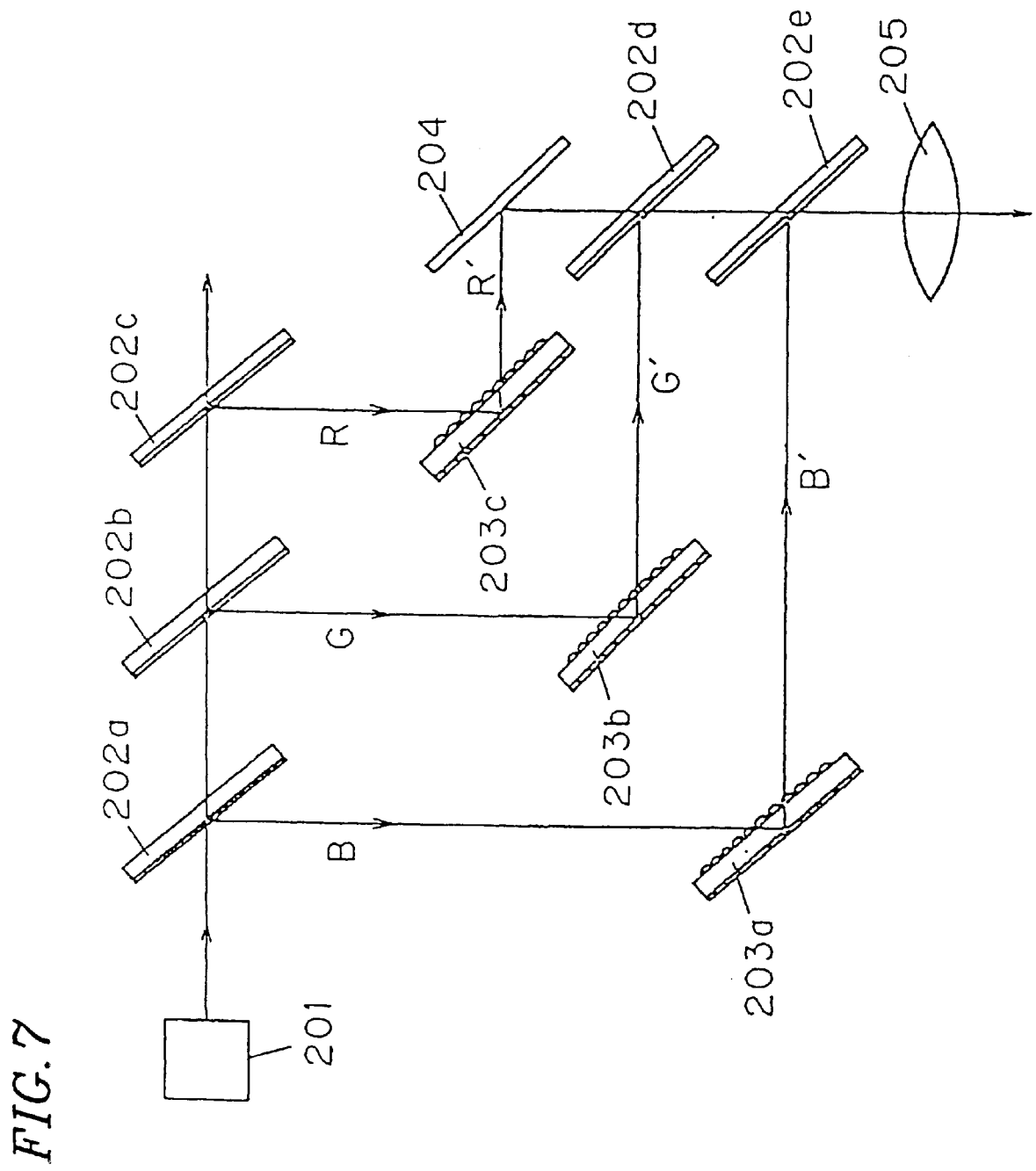
FIG. 7 schematically shows a structure of a display apparatus in Embodiment 3 of the present invention.
Figure 8:
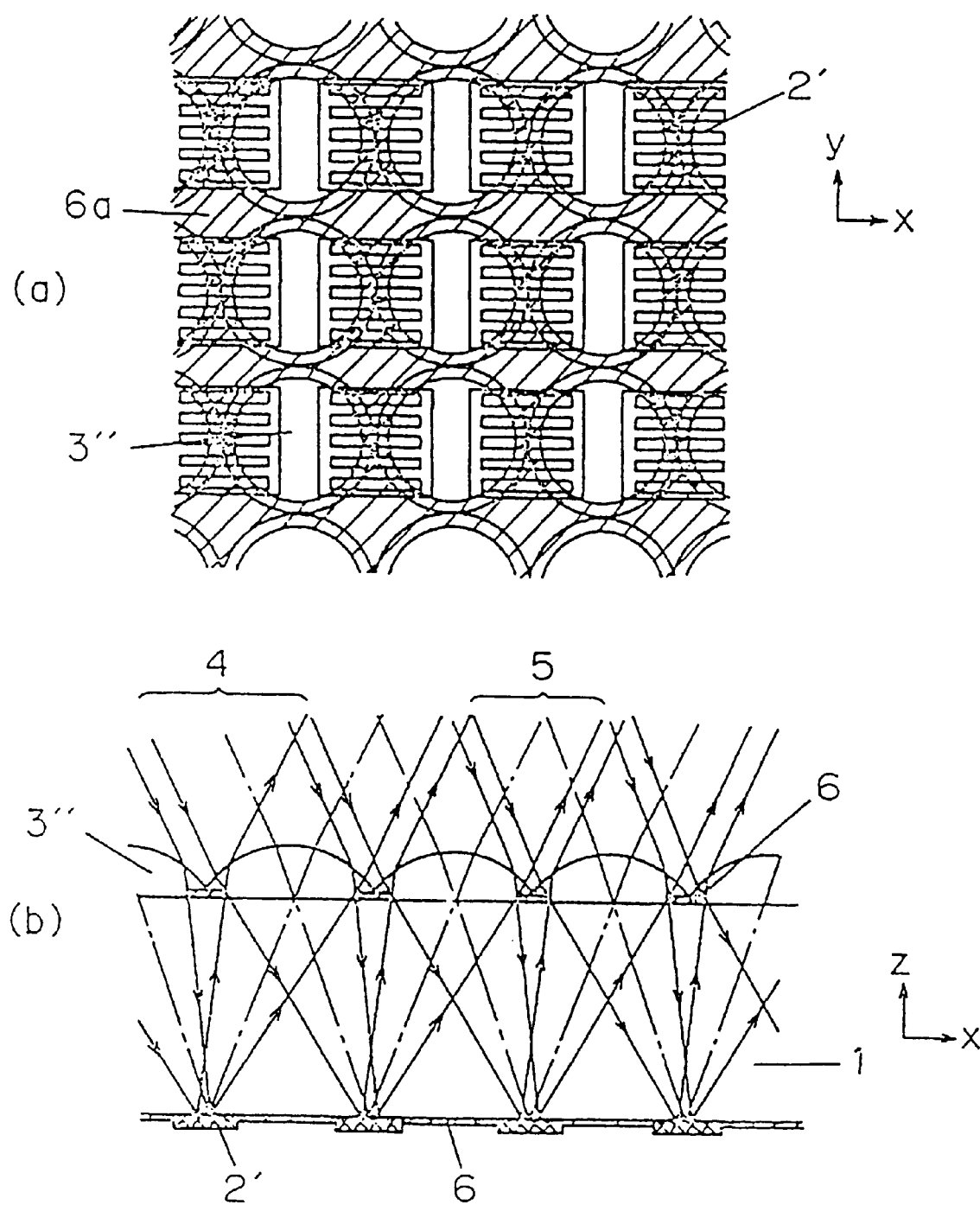
FIG. 8 is a view showing a structure of an optical modulator in the display apparatus in FIG. 7: (a) is a top perspective view and (b) is a cross-sectional view.
Figure 9:
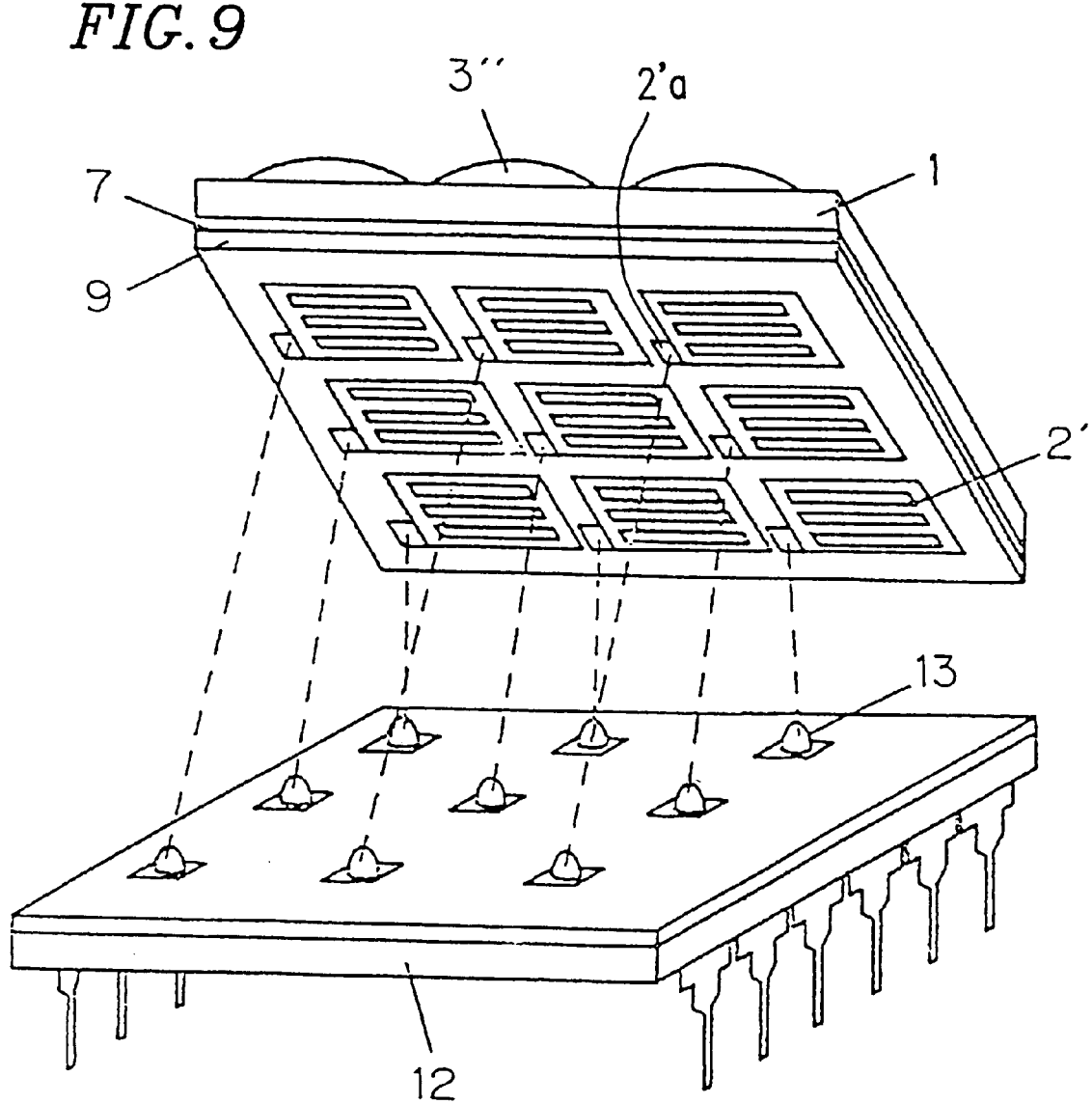
FIG. 9 shows a state where a driving circuit driving an output efficiency control device is connected to the optical modulator in the display apparatus in FIG. 7.
Figure 10:
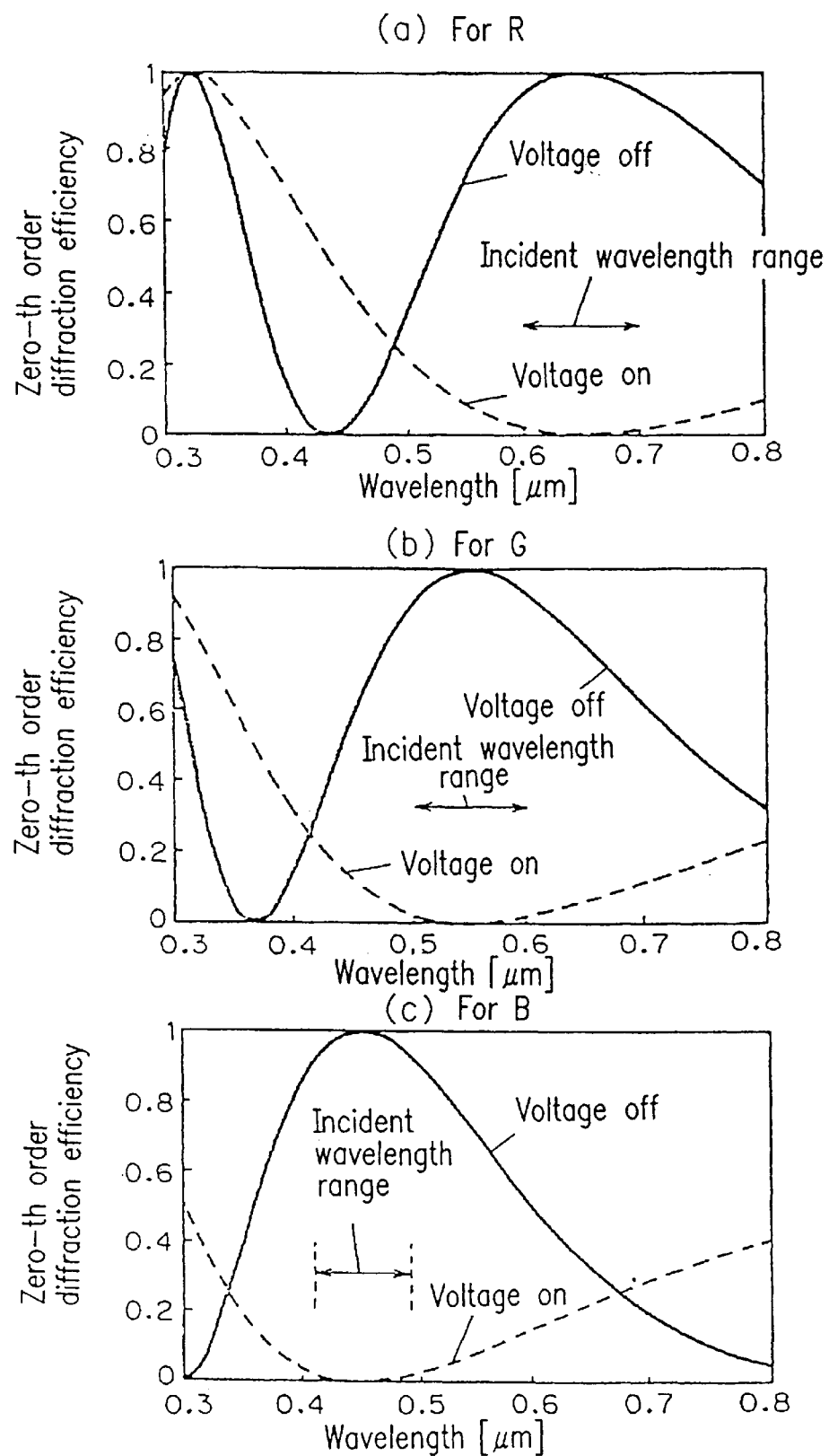
FIGS. 10a–10c shows wavelength dependence characteristics of a zero-th order diffraction efficiency (output efficiency of reflected light) of the output efficiency control device in Embodiment 3.

FIG. 7 schematically shows a structure of a display apparatus in the present embodiment. FIGS. 8(a) and (b) are a top perspective view and a cross-sectional view showing a basic structure of an optical modulator in the display apparatus in FIG. 7. FIG. 9 shows a state where a driving circuit for driving output efficiency control devices is connected to the optical modulator in the display apparatus in FIG. 7. FIG. 10 shows the wavelength dependence characteristics of zero-th order diffraction efficiency (output efficiency of reflected light) of the output efficiency control device in the present embodiment.

As shown in FIG. 7, the display apparatus of the present invention has a light source 201, dichroic mirrors 202a, 202b, 202c, 202d and 202e, three optical modulators 203a, 203b, and 203c, a mirror 204, and a projection lens 205 which forms an image onto a screen. The light source 201 is a white light source such as a metal halide lamp and a xenon lamp. White light emitted from the light source 201 is split into blue light, green light, and red light by the dichroic mirrors 202a, 202b, and 202c which selectively reflect only light in a particular wavelength range, and the split light beams are incident upon the optical modulators 203a, 203b, and 203c respectively provided for the colored light beams. Here, the respective colored light beams are modulated in accordance with an image to be displayed. Each modulated colored light beam is combined into one light beam by the dichroic mirrors 202d and 202e and projected onto a screen (not shown) by the projection lens 205.

Hereinafter, the operation of the display apparatus in the present embodiment will be described.

Light emitted from the light source 201 as collimated light is incident upon the dichroic mirror 202a which selectively reflects blue light (e.g., light in a wavelength range of 0.41 to 0.49 μm). Here, only blue light B is reflected, has its direction changed by 90° to be incident upon the optical modulator 203a. The optical modulator 203a is switched on a pixel basis by a control circuit (not shown) and modulates incident light on a pixel basis. Thus, pixels outputting reflected light which corresponds to zero-th order diffracted light and pixels not outputting reflected light exist. Modulated blue light B' is incident upon the dichroic mirror 202e which selectively reflects blue light in the same way as in the dichroic mirror 202a. The modulated blue light B' has its optical path bent at the dichroic mirror 202e and is combined with other light to be formed as an image on the screen (not shown) by the imaging lens 205.

Among green light and red light transmitted through the dichroic mirror 202a, the green light G is reflected by the dichroic mirror 202b which selectively reflects green light (e.g., light in a wavelength range of 0.5 to 0.6 μm), and has its direction changed by 90° to be incident upon the optical modulator 203b. Modulated green light B' has its direction changed by 90° by the dichroic mirror 202d which selectively reflects green light in the same way as in the dichroic mirror 202b and is combined with other colored light beam to be formed as an image by the projection lens 205.

The red light R transmitted through the dichroic mirror 202b has its optical path bent by 90° by the dichroic mirror 202c which selectively reflects red light (e.g., light in a wavelength range of 0.6 to 0.7 μm), is incident upon the optical modulator 203c, and spatially modulated. Modulated red light R' has its optical path bent by the mirror 204 and is formed as an image by the lens 205. As a result, a color image with three primary colors mixed therein is formed on the screen.

In each optical modulator, as shown in FIGS. 8(a) and (b), a plurality of focusing means, e.g., microlenses 3" with an aperture of 40 μm arranged in an array are formed on a first surface which is the surface of a transparent substrate 1, so as to be adjacent to each other at a period of, for example, 40 μm, and a plurality of output efficiency control devices 2' arranged in an array are formed on a second surface of the transparent substrate 1 opposing the first surface at a period of, for example, 40 μm. In the present embodiment, the size of each output efficiency control device 2' was prescribed to be 20 μm×20 μm.

In the present embodiment, light is also focused onto the output efficiency control device 2' by the microlens. Therefore, the size of the output efficiency control device 2' can be made smaller than the aperture of the microlens. As a result, wiring for driving the output efficiency control device 2' can be routed and a control circuit can be formed on the periphery of each output efficiency control device 2', whereby dead space can be reduced. Thus, the aperture ratio can be substantially increased to improve the light utilization efficiency.

In each optical modulator of the present embodiment, the thickness of the SiO$_2$ layer and the distance in the space (between the second grating and the SiO$_2$ layer) are optimized in accordance with a wavelength of incident light in the output efficiency control device described in Embodiment 1, and such output efficiency control devices are arranged in an array. More specifically, in the present embodiment, the design wavelength of the optical modulator 203a for blue light was prescribed to be 0.45 μm, the design wavelength of the optical modulator 203b for green light was prescribed to be 0.55 μm, and the design wavelength of the optical modulator 203c for red light was prescribed to be 0.65 μm.

As shown in FIG. 8(b), each optical modulator is disposed in such a manner that, light 4 which is incident from the corresponding dichroic mirror is incident obliquely with respect to the optical axis of the microlens 3" and output from an adjacent microlens obliquely with respect to the optical axis thereof at the same angle as the incident angle. Furthermore, in each optical modulator, the arrangement interval between the output efficiency control devices 2' arranged adjacent to each other is prescribed to be equal to the arrangement interval between the microlenses 3" arranged adjacent to each other, and an array of the output efficiency control devices 2' and an array of the microlenses 3" are arranged to be shifted from each other by a half of the arrangement interval in a direction in which incident light is tilted (x-direction in FIG. 8(b)).

According to the above-mentioned arrangement, in the optical modulator of the present invention, a microlens, which is first focusing means allowing the light 4 to be incident upon each output efficiency control device 2', also functions as second focusing means which outputs light 5 from the output efficiency control device 2' adjacent in the x-direction. Thus, as described in the above-mentioned Embodiment 1, the output efficiency control device of the present invention requires two microlenses adjacent to each other in the x-direction. In the case where microlenses are arranged in an array in the optical modulator of the display apparatus, the number of the microlenses is determined merely by adding the number of the output efficiency control devices in one column in a y-direction to the number of the output efficiency control devices contained in the array.

For example, 640 (x-direction)×480 (y-direction) output efficiency control devices 2' are required to be arranged in order to correspond to 640 (x-direction)×480 (y-direction) pixels. However, merely 641 (x-direction)×480 (y-direction) microlenses 3" are required to be arranged. The rate of increase in the number of the microlenses is only 0.16%. Thus, although the display apparatus of the present invention has a structure in which the adjacent microlenses are used in pairs, there is almost no increase in the number of microlenses. Therefore, the display apparatus is easily produced.

In the display apparatus of the present embodiment, the optical modulator is produced by integrally forming the microlenses 3" and the output efficiency control devices 2' arranged in an array on the front and reverse surfaces of the transparent substrate 1. Thus, an optical modulator with a stable structure can be obtained. In particular, the output efficiency control devices 2' can be easily positioned exactly on the focal points of the microlenses 3" by making the focal lengths of the microlenses 3" coincide with the thickness of the transparent substrate 1, whereby satisfactory modulation characteristics can be realized.

Furthermore, in each optical modulator, a light-absorbing member 6 is provided in a region on the surface of the transparent substrate 1 other than the regions where the microlenses 3" and the output efficiency control devices 2' are provided. In the present embodiment, the light-absorbing member 6 was produced by coating a film having a light-absorbing function with respect to a wavelength to be used, e.g., a carbon or phthalocyanine compound mixed with a polymer such as polyimide and PMMA. However, the structure and method for production of the light-absorbing member 6 are not limited thereto. The light-absorbing member 6 may be formed by vapor-depositing an organic film of a pigment or the like having a light-absorbing effect with respect to a wavelength to be used. Such a light-absorbing member 6 has the effect of removing stray light in the substrate 1 and from outside of the substrate 1 and improving an S/N ratio of the outgoing light 5.

In the present embodiment, the light-absorbing member 6 is also provided on the periphery of each lens 3" in a microlens array. Such a structure has the advantage of allowing only the regions with satisfactory lens characteristics to be used, without using the periphery of the microlenses where the lens characteristics are generally likely to degrade due to the surface tension with respect to the substrate 1.

Furthermore, the shape of the microlens 3" is not limited to a circle, and rectangular or elliptical lenses may be used. FIG. 11 shows an array of a plurality of arranged rectangular microlenses. As shown in FIGS. 11(a) to (c), it is understood that dead space is reduced to improve an aperture ratio by varying the shape and arrangement of the microlenses.

Figure 34:
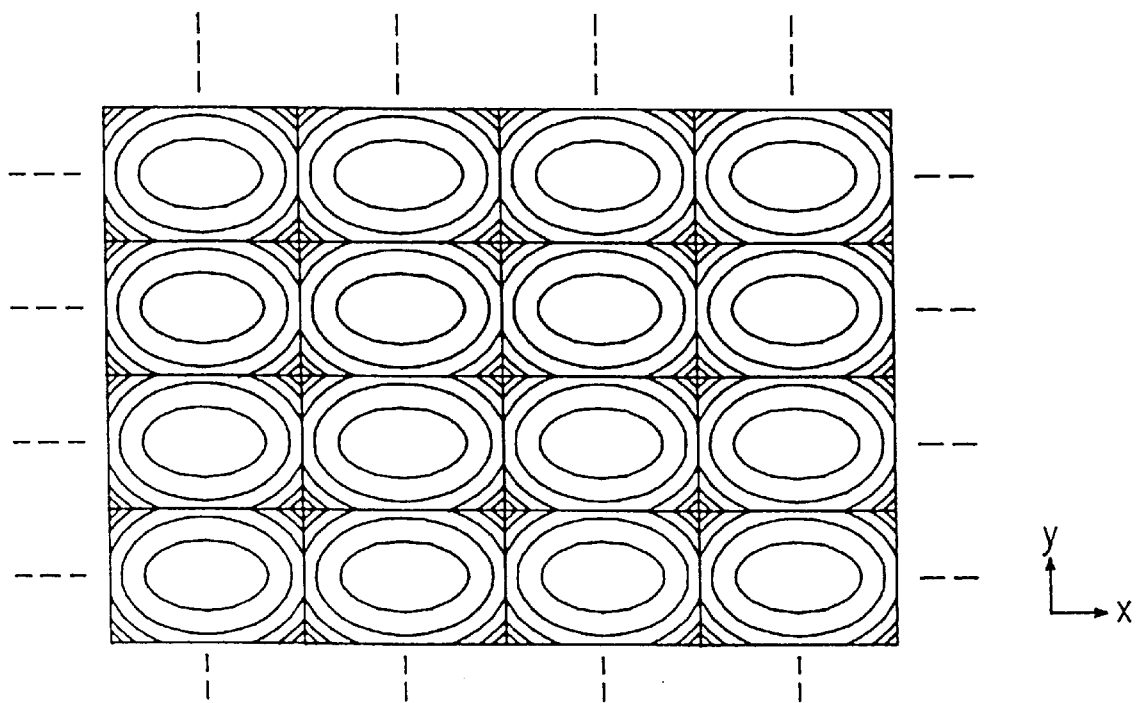
FIG. 34 is a plan view of an array of diffraction-type elliptical microlenses.

An array of elliptical microlenses is effective in the case where an incident angle and an output angle with respect to the optical modulator are large. An example of an array of elliptical microlenses is shown in FIG. 34. The use of elliptical microlenses reduces aberration caused with respect to light which is incident upon the microlenses obliquely to the optical axes thereof, whereby satisfactory optical modulation can be conducted. Furthermore, the elliptical microlens is preferably designed in such a manner that a size ratio of a major axis to a minor axis of an ellipsoid becomes 1/cos $\theta 1$, where $\theta 1$ is an incident angle of the incident light 4.

In the case where circular lenses are used as the microlenses 3", the microlenses 3" can be produced, for example, by coating a resist onto the substrate 1, baking the substrate 1 at a softening temperature of the resist or higher so as to cause the resist to flow, thereby forming the resist into a mountain shape by surface tension. However, the circular lenses may be produced by another method. Alternatively, diffraction-type lenses produced by an ordinary semiconductor process such as photolithography, etching, and deposition, or aspheric lenses may be used as the microlenses 3".

In the display apparatus of the present invention, a driving circuit for driving an array of the output efficiency control devices 2' of the optical modulator is composed of a specifically designed IC 12, and the IC 12 is electrically connected to electrode portions 2'a of each output efficiency control device 2' through solder bumps 13, as shown in FIG. 9. Such a structure enables a stable device of a compact size to be obtained. In particular, the circuit for driving an array of the output efficiency control devices 2' is composed of a specifically designed IC, so that the circuit is easily connected to an array of the output efficiency control devices 21.

Furthermore, in such a structure, even when some solder bumps 13 are not satisfactorily connected to the output efficiency control devices 2', they can be easily repaired. This is because the transparent substrate 1 and an array of the microlenses provided above the output efficiency control devices 2' transmit light. More specifically, laser light such as YAG laser light or $CO_2$ laser light is irradiated to unsatisfactorily connected electrode portions from the upper surface of the unsatisfactorily connected output efficiency control devices 2', whereby the electrode portions are annealed to be repaired.

Next, referring to FIGS. 7 and 10, the relationship between the modulation characteristics of each optical modulator and the order in which colored light beams is split from the light source 201 will be described.

The optical modulators 203a, 203b, and 203c of the present embodiment respectively have modulation characteristics as shown in FIGS. 10(c), (b), and (a), and the inventors of the present invention found that the extinction ratio to be modulated is likely to decrease as a wavelength becomes shorter. Therefore, although the wavelength band of light which is incident upon the optical modulator 203a for B corresponding to blue light is supposed to be in the range of 0.40 to 0.50 μm (bandwidth: 0.1 μm), it is limited to the range of, for example, 0.41 to 0.49 μm (bandwidth: 0.08 μm) by the first dichroic mirror 202a. By doing so, the modulation characteristics, in particular, the extinction ratio of the optical modulator 203a for B are improved.

However, when a wavelength band is limited, an optical power decreases. Therefore, the display apparatus of the present embodiment overcomes this problem by allowing light which exits from the light source 201 to be first incident upon the dichroic mirror 202a which selectively reflects blue light. This is because, when light passes through a dichroic mirror, even light with a wavelength in a transmitting range is more or less absorbed.

The incident wavelength bands of the optical modulators 203b and 203c for G and R were not particularly limited but set to be ordinary values (bandwidth: 0.1 $\mu$m). However, in order to improve the extinction ratio, it is desirable that the incident wavelength band of the optical modulator for G is slightly limited to a range of, for example, 0.505 to 0.595 $\mu$m (bandwidth: 0.09 $\mu$m). In this case, an optical power can be prevented from decreasing due to the band limit by disposing the dichroic mirror 202b corresponding to green light at the second position.

As described above, in the display apparatus of the present embodiment, considering the modulation characteristics of each optical modulator, the dichroic mirrors which selectively reflect each colored light beam and the optical modulators are disposed.

Furthermore, in the present embodiment, the display apparatus using the optical modulator having an output efficiency control device with a grating structure utilizing the diffraction of light has been described. However, the present invention is not limited thereto. For example, an optical modulator as shown in FIG. 35, in which movable mirrors 24 having a micro mirror structure capable of being controlled by electrostatic force are arranged in an array, may be used. In this case, each movable mirror 24 controls outgoing light by utilizing only the reflection of light, without utilizing the diffraction thereof. Thus, in the optical modulator using movable mirrors, the modulation characteristics do not depend upon the wavelength of incident light. As a result, three optical modulators are not required to be designed so as to correspond to a wavelength range of each colored light beam, and the optical modulators having the identical specification can be used.

As described above, in the optical modulator of the present invention, the output efficiency control device and the focusing means are used in combination, thereby an area of the output efficiency control device can be reduced. Therefore, an optical modulator can be realized, which has a high response speed, is capable of modulating incident light having a large beam diameter, and easily produced. Furthermore, the use of this optical modulator enables a projection-type display apparatus with a large light utilization efficiency to be realized.

Embodiment 4

Still another embodiment of the output efficiency control device of the present invention will be described by describing an infrared sensor to which the output efficiency control device is applied.

In Embodiments 1 to 3, the grating of the output efficiency control device is in the form of a rectangle. In Embodiment 4, a trapezoidal grating configuration is adopted. Hereinafter, Embodiment 4 will be described with reference to the drawings.

Figure 12:
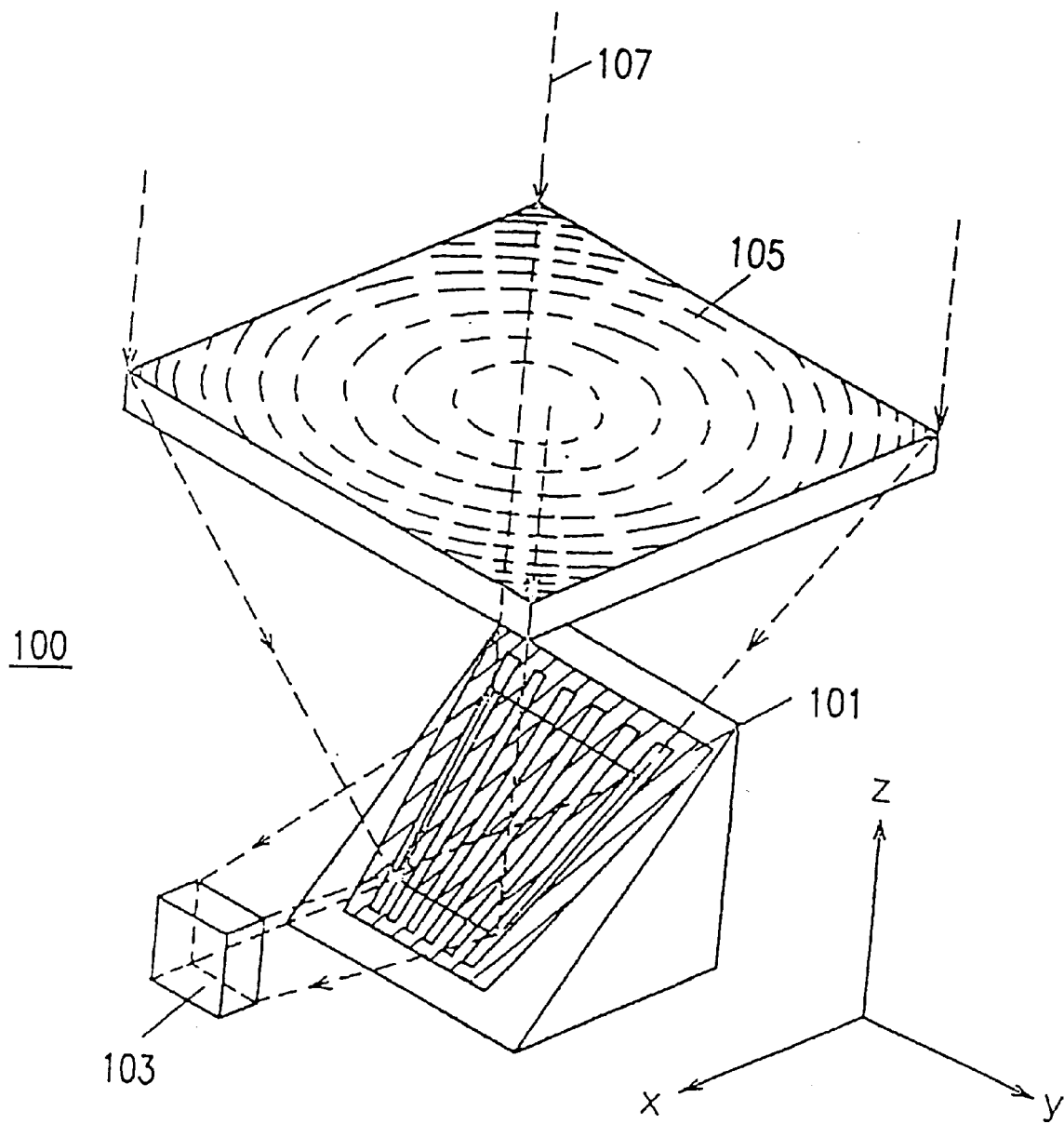
FIG. 12 is a perspective view showing a structure of an infrared sensor using the output efficiency control device in Embodiment 4 of the present invention.
Figure 13:
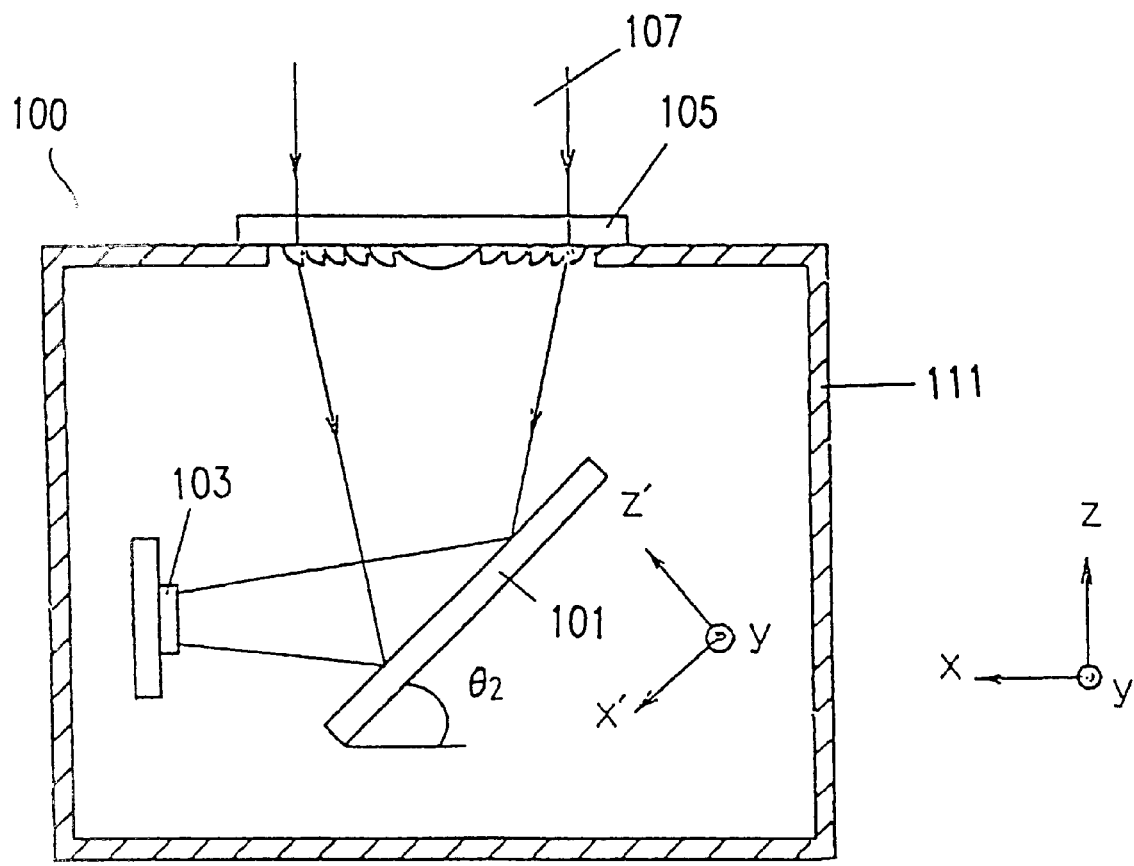
FIG. 13 is a side view of the infrared sensor in FIG. 12.

FIGS. 12 and 13 are a perspective view showing a basic structure of an infrared sensor using an output efficiency control device of Embodiment 4 according to the present invention and a cross-sectional view thereof. An infrared sensor 100 of the present embodiment has an output efficiency control device 101, a pyro-electric element 103, and a lens 105. The output efficiency control device 101 and the pyro-electric element 103 are accommodated in a housing 111, as shown in FIG. 13. The lens 105 is attached to an upper surface of the housing 111. The lens 105 is, for example, a diffraction-type lens with a square aperture made of silicon having a cross-section as shown in FIG. 13 and focuses light 107 which is incident upon the infrared sensor 100. The output efficiency control device 101 is disposed in the optical path of the light 107 focused by the lens 105 so as to be tilted by an angle of θ2 from a surface parallel to the surface to which the lens 105 is attached. The pyro-electric element 103 is disposed in such a manner that at least part of light output from the output efficiency control device 101 is incident upon the pyro-electric element 103.

Figure 14:
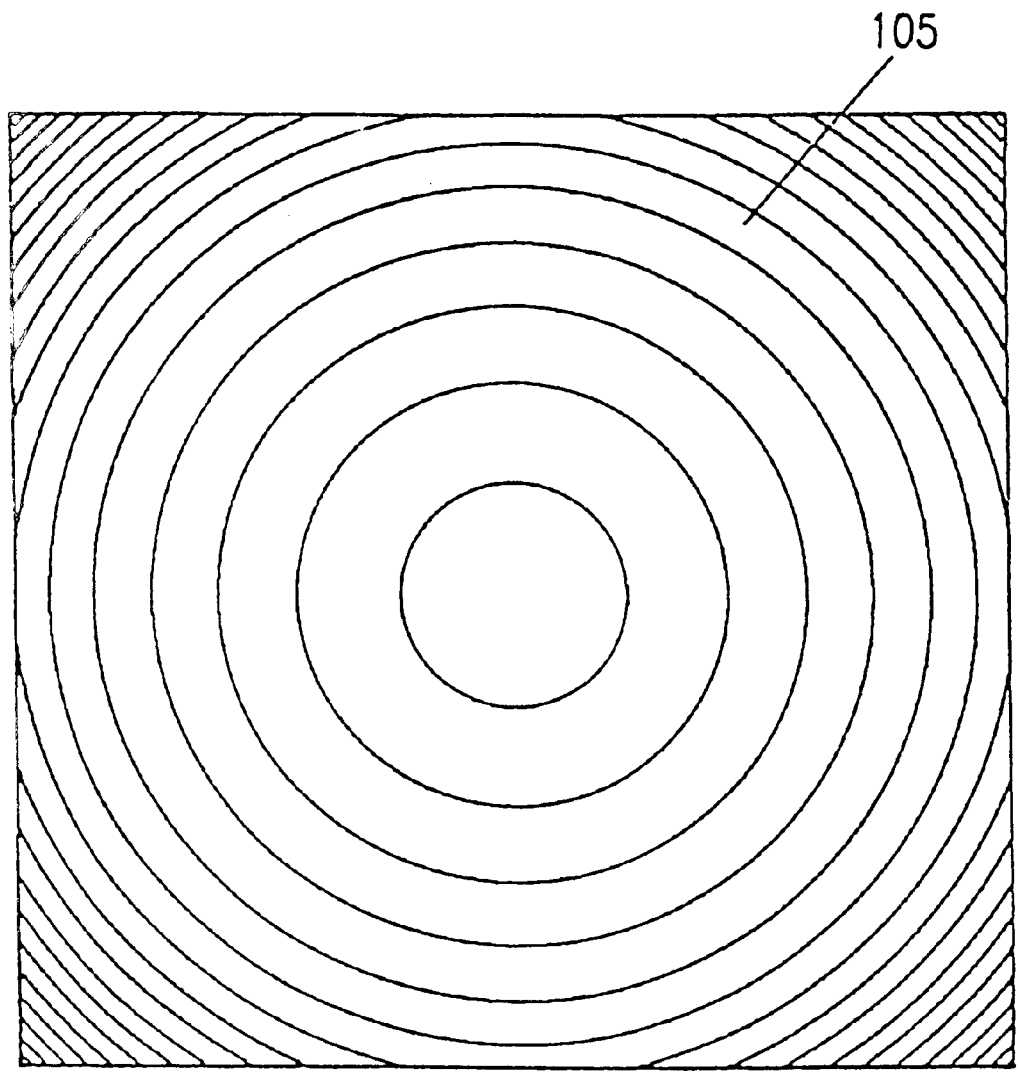
FIG. 14 is a plan view of a lens of the infrared sensor in FIG. 12.

FIG. 14 is a plan view of the lens 105 shown in FIGS. 12 and 13. As shown in FIG. 14, in the infrared sensor 100 of the present embodiment, the lens 105 is a diffraction-type lens which has an aperture in the form of, for example, a square and has, for example, a four-stepped cross-section. As shown in FIG. 14, in the present embodiment, diffraction gratings are formed into four corners of the square, whereby an area of the aperture of the lens is increased and light utilization efficiency is improved.

As shown in FIG. 12, the pyro-electric element 103 generally has a rectangular shape because of its readiness of production and cost efficiency. However, when incident light is focused, for example, by an ordinary circular lens, a spot shape on the pyro-electric element also has a circular shape. FIG. 15 shows an example of a spot shape on the pyro-electric element 103. FIG. 15(a) shows the case where incident light is focused onto the pyro-electric element using a conventional circular lens. As is apparent from FIG. 15(a), four corner portions of the pyro-electric element become a dead space where light is not incident, so that the entire pyro-electric element cannot be effectively utilized.

FIG. 15(b) shows a spot shape in the case where the lens 105 is in the form of a rectangle as in Embodiment 4. A spot formed on the pyro-electric element 103 becomes a rectangle whose size is smaller than that in the case of using a circular lens, as shown in FIG. 15(b), and a pyro-electric element having a smaller area can be used, resulting in a decrease in cost. More specifically, the pyro-electric element can be decreased in area by 25% by using a rectangular lens as a lens for focusing light onto the pyro-electric element. Simultaneously, it becomes possible to allow light to be incident upon the entire pyro-electric element, whereby the level of an output signal from the infrared sensor can be increased by 25% or more than a conventional value.

When a lens having a rectangular aperture is used as in Embodiment 4, a spot shape of light which is incident upon the output efficiency control device 101 becomes a trapezoid as shown in FIG. 12. In the present embodiment, for example, the size of the lens 105 is □3 mm, the focal length thereof is 6 mm, and the tilt angle θ2 is 45°, and the output efficiency control device 101 is disposed, for example, at a position in the middle between the lens 105 and the pyro-electric element 103. Thus, the spot shape is a trapezoid with a side (lower side) closer to the lens 105 of 2.0 mm, a side (upper side) farther from the lens 105 of 1.2 mm, and a height (z-direction) of 2.3 mm.

FIG. 16(a) is a plan view of the output efficiency control device 101 of Embodiment 4, and FIG. 16(b) is a cross-sectional view taken along a line B–B' in FIG. 16(a).

A substrate 121 of the output efficiency control device 101 is obtained, for example, by thermally oxidizing a Si wafer to form a thermal oxide film with a thickness of 0.1 μm, and depositing a silicon nitride film to a thickness of 0.2 μm by low-pressure chemical vapor deposition (hereinafter, referred to as LPCVD) to form an insulating layer. A spacer layer 123, for example, made of a silicon oxide film doped with a large amount of phosphorus is formed on the substrate 121. An elastic layer 125 is formed on the spacer layer 123. In Embodiment 4, the elastic layer 125 was formed of a silicon nitride film with its residual stress reduced. Beams 126 are formed by patterning the elastic layer 125 as shown in FIG. 16(b), and upper reflective films 127 are formed on the beams 126. Lower reflective films 128 are formed on the substrate 121. These reflective films 127 and 128 are composed of, for example, Au, having a thickness of 0.1 μm. When focused infrared light 115 is incident upon the output efficiency control device 101 with such a structure, a spot 129 of incident light in the form of a trapezoid is formed on the output efficiency control device 101 as shown in FIG. 16(a).

As shown in FIG. 16(a), in Embodiment 4, the output efficiency control device 101 has a trapezoidal shape. This corresponds to the use of a rectangular lens which forms the light spot 129 in the form of a trapezoid as shown in FIG. 16(a) on the output efficiency control device 101, as described above. In Embodiment 4, as described above, the shape of the spot 129 has an upper side of 1.2 mm and a lower side of 2.0 mm. Thus, the width in the y-direction varies. Therefore, with a grating composed of beams parallel to each other as in a conventional output efficiency control device, the number of the beams in a spot varies in the vicinity of the upper side and lower side of the spot. This results in nonuniformity of the diffraction at upper and lower positions. As a result, a modulation efficiency decreases. In contrast, with the output efficiency control device 101 of the present embodiment, the number of the beams in the spot 129 is made constant by changing the period of the beams 126 forming a grating in accordance with the shape of the spot 129, whereby a uniform diffraction phenomenon is allowed to occur, preventing the diffraction efficiency from decreasing.

Figure 17:
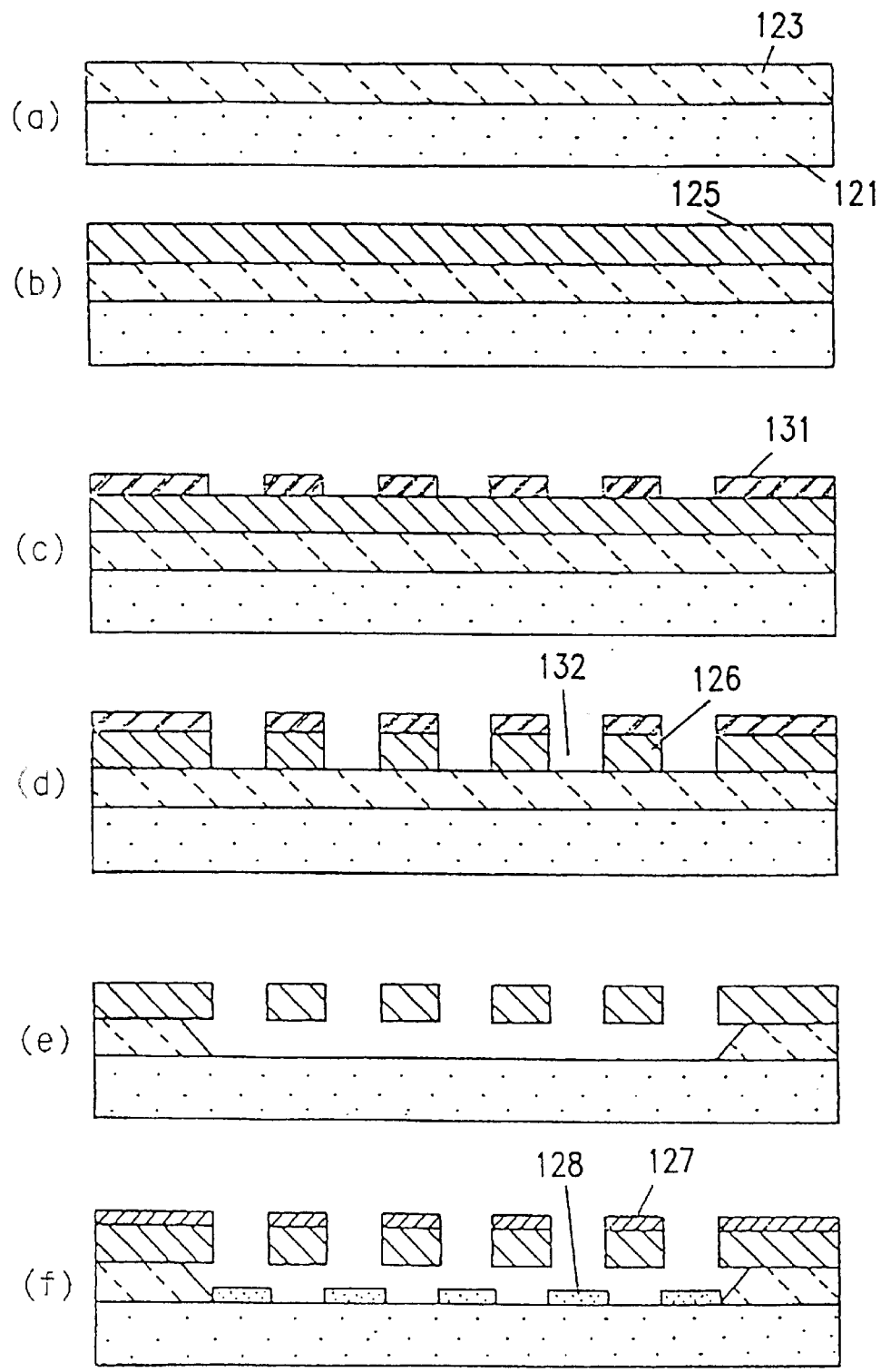
FIGS. 17a–17f illustrates the steps of producing the output efficiency control device in FIG. 16.

Next, referring to FIG. 17, an example of the steps of producing the output efficiency control device 101 will be described. In FIG. 17, the same components as those in FIG. 16 are denoted by the same reference numerals as those therein. The description thereof will be omitted.

First, a substrate 121 with an insulating film formed thereon is produced. As a substrate, for example, a silicon substrate or the like is used. In the present embodiment, a silicon substrate was used and was thermally oxidized to form an oxide film having a thickness of 0.1 μm, and thereafter a silicon nitride film having a thickness of 0.5 μm was deposited by LPCVD.

Then, as shown in FIG. 17(a), a spacer layer 123, for example, made of a silicon oxide film doped with a large amount of phosphorus is formed on the substrate 121, for example, by LPCVD. The thickness of the spacer layer 123 is given as $\lambda/(4 \cos \theta 2)$, where λ is a wavelength of light which is incident upon an output efficiency control device. In the present embodiment, the wavelength λ of incident light is prescribed to be 10 μm. θ2 denotes a tilt angle of the output efficiency control device 101 with respect to a surface parallel to a surface to which a lens is attached, i.e., an angle at which light is incident upon the output efficiency control device. In the present embodiment, θ2=45°, as described above. Thus, in the present embodiment, a silicon oxide film doped with a large amount of phosphorus was deposited to a thickness of 3.5 μm by LPCVD.

Next, as shown in FIG. 17(b), an elastic layer 125 having a thickness of $\lambda/(4 \cos \theta 2)$ is formed on the spacer layer 123. In the present embodiment, a silicon nitride layer whose tensile stress remaining in the layer is reduced to, for example, 200 MPa or less by increasing the ratio of the content of silicon was formed to a thickness of 3.5 μm by LPCVD.

Then, a resist is spin-coated onto the elastic layer 125, and the resist is exposed to light and developed, whereby a resist mask 131 is formed as shown in FIG. 17(c). Then, the elastic layer 125 is patterned by dry etching to form beams 126 and openings 132. Thereafter, the resist 131 is removed, and the spacer layer 123 positioned in the openings 132 and under the beams 126 is removed by isotropic wet etching using buffered hydrofluoric acid. Thus, as shown in FIG. 17(e), the beams 126 are floated. As a result, both ends of the beams 126 are supported on the spacer layer 123.

Finally, a reflective film, for example, made of Au having a thickness of 0.1 μm is vapor-deposited on the resultant substrate, whereby upper reflective films 127 and lower reflective films 128 are formed as shown in FIG. 17(f). A grating structure of the output efficiency control device is completed in the above-mentioned steps.

The operation of the output efficiency control device constructed as described above will be described with reference to FIG. 18. In FIG. 18, the same components as those in FIG. 17 are denoted by the same reference numerals as those therein. The description thereof will be omitted.

The output efficiency control device 101 of Embodiment 4 is operated by turning on/off a voltage applied between the upper reflective films 127 and the substrate 121. FIG. 18(a) shows a state where a voltage is not applied between the upper reflective films 127 and the substrate 121, and the beams 126 are floated and an air layer 137 is formed between the beams 126 and the substrate 121. At this time, the difference in step between the surfaces of the upper reflective films 127 and the surfaces of the lower reflective films 128 is set to be a value represented by $\lambda/(2 \cos \theta 2)$, for example, assuming that an incident angle at which light 135 to be modulated is incident upon the output efficiency control device 101 is θ2 (see FIG. 13) and a wavelength of the light 135 is λ.

For example, in Embodiment 4, θ2=45° and λ=10 μm, so that the value is 7.0 μm. At this time, the difference in phase between light reflected from the upper reflective films 127 and light reflected from the lower reflective films 128 becomes 2π in round travel, which corresponds to one wavelength, thereby the phases are matched. Thus, the output efficiency control device 101 functions as an ordinary mirror, and the incident light 135 becomes zero-th order diffracted light 136 and is reflected to an incident side.

Next, as shown in FIG. 18(b), when a voltage is applied between the upper reflective films 127 and the substrate 121, the upper reflective films 127 which are upper electrodes and the substrate 121 which is a lower electrode forms a capacitor interposing the air layer 137 and an insulating layer (not shown) formed on the surface of the substrate 121. The upper reflective films 127 are, for example, positively charged and the substrate 121 is, for example, negatively charged. Electrostatic attracting force is affected between the charges, so that the beams 126 are attracted to the substrate 121 side until it comes into contact with the surface of the substrate 121, as shown in FIG. 18(b). At this time, the difference in step between the surfaces of the upper reflective films 127 and the surfaces of the lower reflective films 128 is set to be a value given by $\lambda/(4 \cos \theta 2)$, e.g., 3.5 μm in Embodiment 4. Thus, the difference in phase between light reflected from the surfaces of the upper reflective films 127 and light reflected from the surfaces of the lower reflective films 128 becomes π in round travel which corresponds to a half of a wavelength. Therefore, these light beams disapear. As a result, zero-th order diffracted light is eliminated, and diffracted light other than zero-order diffracted light is output. For example, as shown in FIG. 18(*b*), when a voltage is applied between the upper reflective films 127 and the substrate 121, ±1st order diffracted light 138*a* and 138*b* are generated at a diffraction efficiency of 41%, respectively.

Actually, in the vicinity of portions (C portion and D portion in FIG. 16(*a*)) at both ends of each beam 126 supported on the spacer layer 123, the beams 126 are not completely attracted to the substrate 121. Therefore, as shown in FIG. 16(*a*), the beams 126 are made longer than the spot 129 of incident light in a longitudinal direction, thereby light is prevented from entering these incomplete operation portions so as to prevent the modulation ratio from decreasing.

According to the above-mentioned operation, in the output efficiency control device 101 of Embodiment 4, it is possible to modulate the intensity of zero-th order diffracted light by turning on/off an applied voltage.

Next, the configuration of a grating portion of the output efficiency control device 101 in Embodiment 4, in particular, the setting of a period of the grating will be described. In the infrared sensor 100 of Embodiment 4, focused light is incident upon the output efficiency control device 101, in place of collimated light. Therefore, the inventors of the present invention found the following: almost 100% zero-th order diffraction efficiency is obtained at the center in the y-direction in the grating portion of the output efficiency control device 101 (when a voltage is not applied); however, an incident angle is tilted as shown by an angle β in FIG. 16(*b*) on the periphery in the y-direction, so that the diffraction efficiency gradually decreases. For the same reason, when a voltage is applied, the zero-th order diffraction efficiency increases from 0% on the periphery of the grating, and the modulation effeciency of the light amount decreases as a whole. However, the inventors of the present invention found the following: when a period Λ of the grating is 7 times or more the wavelength λ of the incident light (Λ/λ≧7), the decrease in diffraction efficiency is small even in the case where light is obliquely incident, and the incident light as focused light causes no problem in the infrared sensor 100. Therefore, in Embodiment 4, the minimum period Λ in the C portion of FIG. 16(*a*) is set to be, for example, 70 μm.

Furthermore, as described above, in Embodiment 4, the period Λ of the grating is changed in accordance with the shape of the spot of incident light. More specifically, assuming that the focal length of the lens 105 is f and the length of one side of the square lens 105 is L, and the period Λ of the grating in the D portion in FIG. 16(*a*) is prescribed to be at least (2f+L tan θ2)/(2f–L tan θ2) times the period Λ in the C portion. For example, in Embodiment 4, since f=6 mm, L=3 mm, and θ2=45°, the period Λ of the grating in the D portion is prescribed to be 117 μm or more which is 1.67 times the period Λ in the C portion.

As described above, according to the structure of the output efficiency control device 101, diffraction was performed uniformly at any portion of the grating with respect to a light spot in the form of a trapezoid, and high modulation efficiency was able to be obtained.

In the conventional output efficiency control device shown in FIGS. 32 and 33, the difference in step between the surfaces of the upper reflective films and the surfaces of the lower reflective films is changed from ½ of a used wavelength to ¼ thereof, and the incident angle is prescribed to be 0°, i.e., light is made to be vertically incident, whereby incident light is modulated. However, in such a structure, since light was made to be vertically incident upon the output efficiency control device, it was difficult to separate zero-th order diffracted light from the incident light, and therefore diffracted light other than zero-th order diffracted light was utilized as outgoing light. Thus, the light utilization efficiency was extremely low. In the above-mentioned conventional output efficiency control device, the inventors of the present invention found the following: when light is made to be obliquely incident upon the output efficiency control device by tilting the output efficiency control device in order to utilize zero-th order diffracted light, the difference in phase at a time of driving does not become an appropriate value, so that the modulation efficiency decreases.

In contrast, in the output efficiency control device of Embodiment 4, the difference in step between the upper reflective films 127 and the lower reflective films 128 is set to be λ/(2 cos θ2) and λ/(4 cos θ2), respectively, in accordance with the value of incident angle θ2. Because of this, zero-th order diffracted light becomes capable of being easily separated without decreasing the modulation efficiency.

As described above, in the output efficiency control device of the present embodiment, a uniform diffraction effect can be obtained in the grating portion, and modulation characteristics do not degrade partially. The configuration of the grating (the difference in step between the upper reflective films and the lower reflective films, the period of beams, etc.) is designed in accordance with the conditions under which light is incident upon the output efficiency control device, i.e., an incident angle, the shape of a spot which the incident light forms on the grating, and the like, whereby light is allowed to be incident upon the output efficiency control device obliquely, not vertically. As a result, zero-th order diffracted light can be easily obtained as outgoing light without decreasing the modulation efficiency. Thus, a miniaturized infrared sensor with high light utilization efficiency and high sensitivity can be provided by using the output efficiency control device.

In Embodiment 4, in particular, the case where a lens for focusing incident light onto the output efficiency control device has a rectangular aperture, and the configuration of the grating is designed to be a trapezoid in accordance with the shape of a spot of light to be focused is described. However, the shape of the lens and the configuration of the grating are not limited thereto. Even when a lens has an aperture having another shape in which the number of beams in a spot of incident light on the output efficiency control device is different, no problem is caused by setting the configuration of the grating in accordance with the shape of the spot.

Furthermore, the period of the grating is not particularly required to change in its longitudinal direction according to a linear function. A function representing an appropriate configuration in accordance with the shape of a spot of incident light on the output efficiency control device should be appropriately selected.

Embodiment 5

Next, a display apparatus of Embodiment 5 according to the present invention will be described. The display apparatus of the present embodiment has a similar structure to that of the display apparatus described in Embodiment 3, except that the structure of an optical modulator is different. Therefore, the description of a schematic structure of the display apparatus will be omitted.

Figure 20:
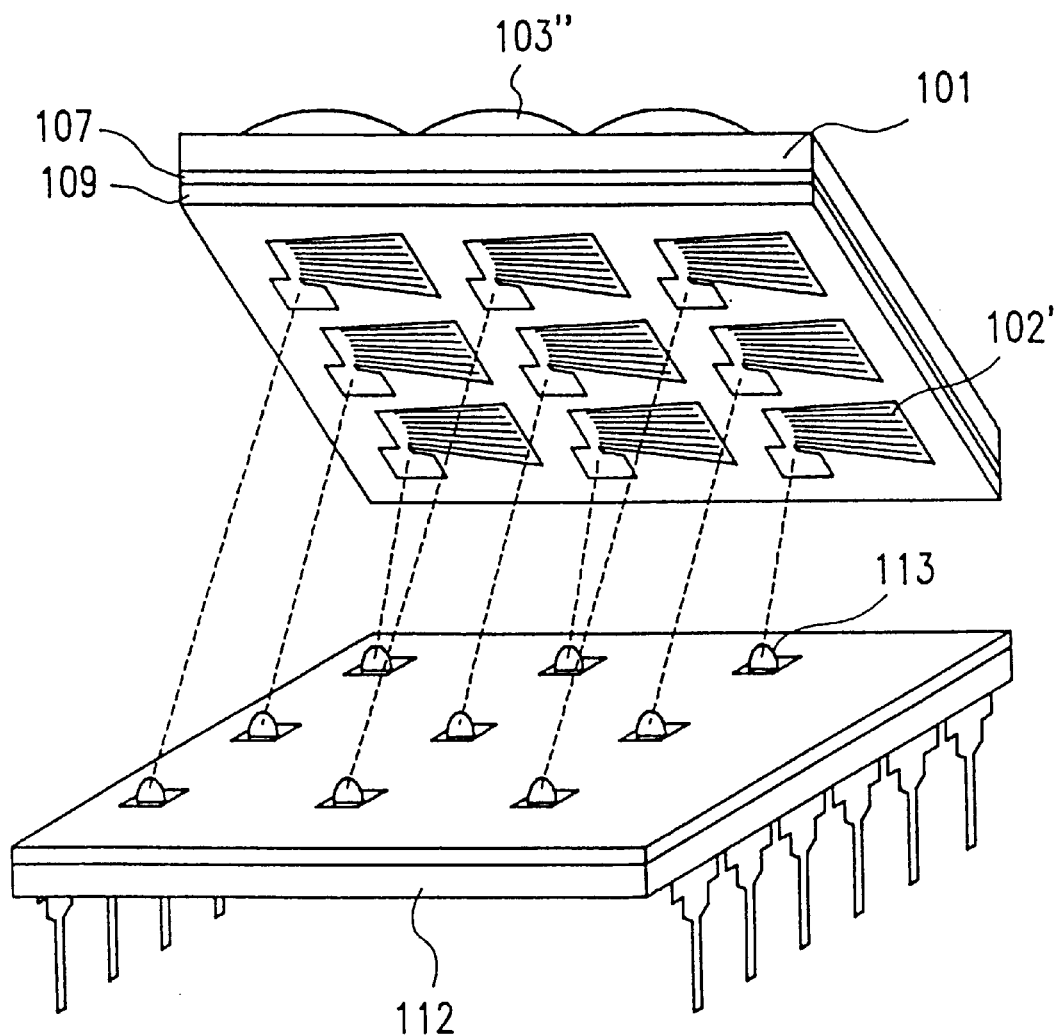
FIG. 20 shows a state where a driving circuit for driving an output efficiency control device is connected to the optical modulator in the display apparatus in FIG. 19.

FIGS. 19(a) and (b) are a top perspective view and a cross-sectional view of an optical modulator in the display apparatus of the present embodiment. FIG. 20 shows a state where a driving circuit for driving output efficiency control devices is connected to the optical modulator in the present embodiment, and FIG. 21 schematically shows the configuration of a grating of the output efficiency control device of the present embodiment.

As shown in FIGS. 19(a) and (b), the optical modulator includes rectangular diffraction-type lenses 105' as a plurality of focusing means arranged in an array and a plurality of output efficiency control devices 101' arranged in an array at the same arrangement interval (period) as that of the diffraction-type lenses 105'. The array of the diffraction-type lenses 105' is formed on the upper surface of a transparent substrate 121a, as shown in FIG. 19(b), and the array of the output efficiency control devices 101' is formed on the lower surface of the transparent substrate 121a, i.e., a surface opposing the surface where the diffraction-type lens array is formed. In the present embodiment, diffraction-type lenses (one side: 40 µm) each having a square aperture and a four-stepped cross-section are formed in an array at a period of 40 µm on the upper surface of a glass substrate having a thickness of 2 mm, and the output efficiency control devices 101' (size: 20 µm×20 µm) are formed on the lower surface at a period of 40 µm. Furthermore, in the present embodiment, diffraction gratings are formed into four corners of a square in the same way as in Embodiment 4, whereby an area of a lens aperture portion is increased and light utilization efficiency is improved.

Furthermore, the array of the diffraction-type lenses 105' and the array of the output efficiency control devices 101' are disposed so as to be shifted from each other by a half of the arrangement interval in a direction (x-direction in Embodiment 5) in which incident light is tilted with respect to optical axes of the diffraction-type lenses 105'. In other words, each of the output efficiency control devices 101' is disposed right below the middle point of a straight line connecting the centers of two diffraction-type lenses 105' adjacent to each other in the x-direction. Thus, in the present embodiment, in the same way as in Embodiment 3, the diffraction-type lens 105' for focusing incident light 135 onto one output efficiency control device 101' also functions as second focusing means for collimating outgoing light 136 from another output efficiency control device 101' adjacent in the x-direction and outputting it. The rectangular diffraction-type lenses 105' are mass-produced, for example, by repeat photolithography, and etching/deposition of thin films.

Unlike Embodiment 3, the use of the array of the rectangular lenses 105' makes it unnecessary to provide a light-absorbing member on the surface of the substrate 121a on which the lenses 105' are provided. For example, in the case where circular microlenses formed on the substrate are used as focusing means as in Embodiment 3, it is preferable that a light-absorbing member is provided on the periphery of the lenses so as not to allow light to be incident upon the periphery of the lenses where the characteristics are likely to degrade due to the surface tension with respect to the substrate. However, since the diffraction-type lenses are used in the present embodiment, it is not required to provide a light-absorbing member.

As described above, in the present embodiment, the rectangular diffraction-type lenses 105' are used as focusing means for focusing incident light onto the output efficiency control devices 101'. Therefore, the shape of a light spot formed on the output efficiency control device 101' becomes a trapezoid, and in the case of using the output efficiency control device whose grating period is constant as in the above-mentioned Embodiment 3, a uniform diffraction effect cannot be obtained. Thus, in the present embodiment, the grating period of the output efficiency control device 101' is changed in accordance with the spot shape of incident light, whereby the configuration of the grating is made a trapezoid as shown in FIG. 21.

A plane configuration of the grating is designed as described in the above-mentioned Embodiment 4. For example, the lengths of beams are prescribed in such a manner that light is not incident upon portions in the vicinity of both ends of the beams where the beams are not completely attracted to the substrate side. Because of this, the decrease in modulation ratio caused by light which is incident upon incomplete operation portions of the output efficiency control devices 101' can be prevented. A period $\Lambda$ of the grating is designed so as to be 7 times or more a wavelength $\lambda$ of incident light ($\Lambda/\lambda \geq 7$). Furthermore, assuming that the diffraction-type lens 105' is a square lens with one side length of L and its focal length is f, the grating period is set in such a manner that the grating period at a position corresponding to a lower side of a trapezoid of a spot of incident light becomes at least $(2f+L\tan\theta 2)/(2fL\tan\theta 2)$ times or more a period at a position corresponding to an upper side of the trapezoid. By designing the plane configuration of the grating as described above, diffraction is uniformly conducted at any portion of the grating and high modulation efficiency can be obtained even in the case of using a lens forming a trapezoidal spot as focusing means.

The output efficiency control device 101' used in the present embodiment has the same structure as that of the output efficiency control devices in Embodiments 1 and 3, except for the plane configuration of a grating. Thus, the output efficiency control device 101' is produced in almost the same production steps as those described in Embodiment 1.

In the present embodiment, a driving circuit for driving the output efficiency control devices 101' is also composed of a specifically designed IC 112. Therefore, the output efficiency control device array can be easily connected to the driving circuit. The driving circuit IC 112 is connected to electrode portions 101'a of the respective output efficiency control devices 101' through solder bumps 113 as shown in FIG. 20. Such a structure enables a stable device of a compact size to be obtained.

Furthermore, in such a structure, both the transparent substrate 1 and the diffraction-type lens array disposed on the upper surface side of the output efficiency control devices 101' transmit light. Therefore, even if some solder bumps 113 are not satisfactorily connected to the output efficiency control devices 101', they can be easily repaired. More specifically, laser light from YAG laser, $CO_2$ laser, etc. is irradiated to the unsatisfactorily connected electrode portions from the upper surface of the unsatisfactorily connected output efficiency control devices 101', whereby the electrode portions are annealed to be connected to the solder bumps 113.

In the display apparatus of the present embodiment, the rectangular diffraction-type lenses 105' focus light onto the output efficiency control devices 101'. Thus, the size of the output efficiency control devices 101' can be made smaller than those of a beam diameter and the diffraction-type lenses 105'. As a result, on the periphery of each output efficiency control device 101', wiring (including the electrode portions 101'a) required for driving the output efficiency control devices 101' can be routed and a control circuit can be formed, thereby dead space can be reduced. Thus, the aperture ratio and light utilization efficiency can be substantially improved.

Furthermore, in the present embodiment, the plane configuration of a grating portion of the output efficiency control devices 101' is a trapezoid. Therefore, compared with the case where a grating configuration in which beams are parallel to each other is adopted, dead space can be reduced and it is more effective to improve the aperture ratio and light utilization efficiency.

Embodiment 6

Referring to FIG. 22, an infrared sensor of Embodiment 6 according to the present invention will be described.

The infrared sensor of Embodiment 6 is different from that of Embodiment 4 only in the structure of an output efficiency control device. Therefore, in the following description, the description of a schematic structure of the infrared sensor will be omitted and only the output efficiency control device will be described.

FIG. 22 is a view showing a structure of an output efficiency control device of Embodiment 6: (a) is a plan view and (b) is a cross-sectional view taken along a line E–E' in (a).

As shown in FIG. 22(b), an output efficiency control device 190 of Embodiment 6 has a substrate 192, and a reflection-type grating is formed thereon. The substrate 192 is produced, for example, by thermally oxidizing a Si substrate to form a thermal oxide film with a thickness of 0.1 μm, depositing a silicon nitride film to a thickness of 0.2 μm by LPCVD, and forming an insulating layer. A spacer layer 193, for example, made of a silicon oxide film doped with a large amount of phosphorus is formed on the substrate 192. An elastic layer 194 and beams 195 formed by patterning the elastic layer 194 to a predetermined shape are provided on the spacer layer 193. The elastic layer 194 is, for example, made of a silicon nitride film with its residual force reduced. Upper reflective films 196 are formed on the beams 195. Furthermore, lower reflective films 197 are formed on the substrate 192 through openings 199 which are simultaneously formed with the beams 195. The reflective films 196 and 197 are, for example, made of Au having a thickness of 0.1 μm.

In the output efficiency control device 190 with such a structure, incident focused infrared light 191 forms a spot 198 having a shape as shown in FIG. 22(a).

As is understood from FIG. 22(a), the output efficiency control device 190 of Embodiment 6 is different from the output efficiency control device of Embodiment 4 shown in FIG. 16 in the plane configuration of a grating formed by the beams 195 and the openings 199. The output efficiency control device 190 of Embodiment 6 is characterized in that the period of the grating is made larger in the longitudinal direction of the beams and the lengths of all the beams 195 are made equal. FIG. 22 shows the case where both ends of the beams 195 are positioned on circumferences centered on the identical point, as an example of the output efficiency control device 190.

In the output efficiency control device of Embodiment 4, as is understood from FIG. 16(a), the lengths of the beams are not equal. Therefore, the beams are attracted in decreasing order of length under the application of a voltage, and the beams return to an original position in increasing order of length when a voltage is turned off. As a result, the transition times, i.e., the rise and fall times of on/off of light become longer, so that the driving frequency cannot be made high. For example, in the case where a high precision measurement is conducted within a short period of time by using an infrared sensor having an output efficiency control device, it is required to drive the output efficiency control device at a high speed. However, in the output efficiency control device of Embodiment 4, the limit of a high-speed operation limits the precision of the infrared sensor.

In contrast, in the output efficiency control device 190 of Embodiment 6, the lengths of all the beams 195 are equal, so that the beams completely simultaneously operate when a voltage is turned on/off. This allows an operation of on/off of light to be performed within a very short period of time. As a result, the output efficiency control device can be driven at a high frequency, and the infrared sensor using the output efficiency control device 190 of Embodiment 6 makes it possible to conduct a detection at a high precision.

In Embodiment 6, for example, the case where both ends of the beams 195 of the output efficiency control device 190 are positioned on circumferences centered on the identical point. However, both ends may be on any curve as long as the lengths of the beams 195 are equal. For example, by disposing the center in the width direction of the respective beams 195 on either end on one straight line, the size of the output efficiency control device capable of modulating a light spot of the same size can be decreased.

In Embodiment 6, as an example of the infrared sensor, the output efficiency control device in which the lengths of all the beams forming the grating are the same has been described. However, the present invention is not limited thereto. It is appreciated that, for example, even in the case where the lengths of all the beams forming the grating are the same in the output efficiency control device of the optical modulator of the display apparatus as described in the above-mentioned Embodiment 5, the same effect can be obtained.

Embodiment 7

An infrared sensor of Embodiment 7 of the present invention will be described with reference to FIGS. 23 through 25. The infrared sensor of Embodiment 7 is different from that of Embodiment 4 only in the structure of an output efficiency control device. Therefore, the description of a schematic structure of the infrared sensor will be omitted, and only the structure of the output efficiency control device will be described.

FIG. 23(a) is a view showing a structure of an output efficiency control device 200 of Embodiment 7: (a) is a plan view and (b) is a cross-sectional view taken along a line F–F' in (a). As shown in FIG. 23(b), the output efficiency control device 200 of Embodiment 7 has a substrate 221, and a reflection-type grating is formed thereon. The substrate 221 is produced, for example, by thermally oxidizing a Si substrate to form a thermal oxide film with a thickness of 0.1 μm and depositing a silicon nitride film to a thickness of 0.2 μm by LPCVD, thereby forming an insulating layer. First posts 222 are provided on the substrate 221. The first posts 222 are formed, for example, by depositing polycrystalline silicon by LPCVD and patterning it. A spacer layer 223, for example, made of a silicon oxide film doped with a large amount of phosphorus is provided on the periphery of the substrate 221.

Furthermore, the output efficiency control device 200 has an elastic layer 224, and second posts 225 and beams 226 formed by patterning the elastic layer 224 to a predetermined shape. The second posts 225 are provided on the first posts 222. In Embodiment 7, the elastic layer 224 is composed of a silicon nitride film with its residual force reduced. Reflective films 227 are formed on the second posts 225, and reflective films 228 are formed on the beams 226. These reflective films 227 and 228 are, for example, made of Au, having a thickness of 0.1 μm.

Next, referring to FIG. 24, an example of the steps of producing the output efficiency control device 200 of Embodiment 7 will be described. In FIG. 24, the same components as those in FIG. 23 are denoted by the same reference numerals as those therein. The description thereof will be omitted. Hereinafter, referring to FIG. 24, the production steps will be described in an orderly fashion.

First, a silicon substrate is, for example, thermally oxidized to form an oxide film having a thickness of 0.1 μm, a silicon nitride film is deposited to a thickness of 0.5 μm, for example, by LPCVD to form an insulating layer, whereby a substrate 221 is produced. Then, for example, polycrystalline silicon is deposited, for example, by LPCVD, on the substrate 221 and patterned, for example, by dry etching, whereby first posts 222 are formed as shown in FIG. 24(*a*).

For example, a silicon oxide film doped with a large amount of phosphorus is deposited on the resultant substrate 221, for example, by LPCVD, and a spacer layer 223 is formed as shown in FIG. 24(*b*). Thereafter, the spacer layer 223 is etched over the entire surface of the substrate 221 by dry etching, whereby the surface is made flat as shown in FIG. 24(*c*). The thickness of the first posts 222 and that of the spacer layer 223 are prescribed to be $\lambda/(4 \cos \theta 2)$, e.g., 3.5 μm in Embodiment 7.

Then, a silicon nitride film in which tensile stress remaining in the film is reduced to, for example, 200 MPa or less by increasing the content ratio of silicon is formed, for example, by LPCVD, whereby an elastic layer 224 is formed. Although the thickness of the elastic layer 224 is arbitrary, it is prescribed to be 2 μm in Embodiment 7. Furthermore, as shown in FIG. 24(*d*), the elastic layer 224 is patterned to form second posts 225 and beams 226.

Next, the spacer layer 223 is wet-etched from gaps between the second posts 225 and the beams 226, for example, with buffered hydrofluoric acid, and the spacer layer 223 under the beams 226 is removed, whereby the beams supported at both ends are formed. Thereafter, a reflective film made of Au, having a thickness of 0.1 μm is formed by vapor deposition, whereby reflective films 227 and 228 are formed. An output efficiency control device 200 having a structure as shown in FIG. 23 is completed in the above-mentioned steps.

The operation of the output efficiency control device 200 constructed as described above will be described with reference to FIG. 25. In FIG. 25, the same components as those in FIGS. 23 and 24 are denoted by the same reference numerals as those therein. The description thereof will be omitted.

The output efficiency control device 200 of Embodiment 7 is operated in accordance with the same principle as that of the output efficiency control device of Embodiment 4 by turning on/off a voltage applied between the reflective films 228 as upper electrodes and the substrate 221 as a lower electrode. FIG. 25(*a*) shows a state where a voltage is not applied. At this time, the beams 226 are floated, and the reflective films 227 and 228 are on the identical plane. Therefore, the output efficiency control device 200 functions as an ordinary mirror, and incident light 231 becomes reflected light 232 and is reflected to an incident side.

Next, when a voltage is applied between the upper electrodes 228 and the lower electrode 221, the beams 226 are attracted to the surface of the substrate 221 by electrostatic attracting force until it comes into contact with the surface of the substrate 221, as shown in FIG. 25(*b*), in accordance with the principle described in Embodiment 4. At this time, the difference in step between the surfaces of the reflective films 227 and the surfaces of the reflective films 228 is set to be a value given by $\lambda/(4 \cos \theta 2)$. In Embodiment 7, it is prescribed to be 3.5 μm. λ is a wavelength of the incident light 231, and θ2 is an incident angle of the incident light 231 incident upon the output efficiency control device 200. At this time, the difference in phase between light reflected from the surfaces of the reflective films 227 and light reflected from the surfaces of the reflective films 228 becomes π in round travel which corresponds to a half of a wavelength. As a result, reflected light is eliminated, and diffracted light other than zero-th order diffracted light is output. For example, at this time, ±1st order diffracted light 233*a* and 233*b* as shown in FIG. 25(*b*) is generated at diffraction efficiency of 41%, respectively.

According to the above operation, in the output efficiency control device 200 of Embodiment 7, the intensity of reflected light can be modulated by turning on/off an applied voltage.

In the output efficiency control device of the above-mentioned Embodiment 4, light is modulated by a diffraction phenomenon both under the application of a voltage and under no application of a voltage. Therefore, diffraction efficiency decreases, for example, in the case where a wavelength band of light to be modulated is large. However, in the output efficiency control device 200 of Embodiment 7, modulation is conducted by a diffraction phenomenon in the same way as in Embodiment 4 under the application of a voltage; however, almost 100% light reflected from a mirror surface is output under no application of a voltage. Therefore, the modulation ratio can be increased as a whole. Furthermore, according to the structure of Embodiment 7, the thickness of the elastic layer 224 can be arbitrarily selected, so that this thickness can be prescribed to be thin. As a result, the distance between the reflective films 228 which function as upper electrodes and the substrate 221 which functions as a lower electrode can be decreased, and energy required for deforming the beams 226 becomes smaller, so that a driving voltage can be decreased.

As described above, in the output efficiency control device of Embodiment 7, light is output as reflected light from a mirror surface, not zero-th order diffracted light under no application of a voltage, whereby a high modulation ratio can be obtained even for incident light having a large wavelength band. Furthermore, the thickness of the elastic layer can be made thin, so that the device can be driven at a low voltage.

Herein, the output efficiency control device of the present embodiment is described by exemplifying an infrared sensor. However, the output efficiency control device of the present embodiment is not limited to an infrared sensor. For example, as described in Embodiments 3 and 5, the output efficiency control device of the present embodiment is applicable to an optical modulator of a display apparatus.

Embodiment 8

Referring to FIG. 26, an infrared sensor of Embodiment 8 will be described. According to Embodiment 8, an infrared sensor is provided, in which an output efficiency control device can be decreased in size, a pyro-electric element is not influenced even when an electromagnetic noise generated from the output efficiency control device becomes substantially large, and which hardly varies even when the distance between the sensor and a light source (heat source) is relatively short and is capable of obtaining a high signal level in the case where a light source is relatively small.

FIG. 26 is a view showing a structure of an infrared sensor 300 of Embodiment 8: (a) is a side view of the infrared sensor 300 and (b) is a view seen in a −x direction from a plane which is parallel to a y–z plane and includes a line G–G'.

As shown in FIGS. 26(a) and (b), the infrared sensor 300 has an output efficiency control device 342, a pyro-electric element 343, a lens 344, and a spacer 345 which are accommodated in a housing 346. As shown in FIG. 26(a), the spacer 345 determines an incident angle θ2 when light from a point heat source (light source) 341 is incident upon the output efficiency control device 342. The housing 346 has an entrance window 347 on its upper surface. The entrance window 347 is obtained, for example, by forming a band-pass wavelength filter on a silicon substrate.

The difference between the infrared sensor 300 of Embodiment 8 and that of Embodiment 4 lies in that the output efficiency control device 342 is disposed between the light source 341 and the lens 344. In this arrangement, the lens 344 can be provided with an effect as an electromagnetic shield, for example, by forming the lens 344 of a conductive material. Therefore, particularly in the case where beams become shorter with the miniaturization of the output efficiency control device 342 and a driving voltage for deforming the beams becomes high, resulting in generation of an electromagnetic noise or the like, the pyro-electric element 343 can be prevented from being influenced by the electromagnetic noise. In this case, the lens 344 can be composed of Si, Ge, GaAs, InP, GaP, ZnSe, ZnS, or the like. Furthermore, the lens 344 may have a surface relief structure in accordance with the phase modulation amount of the lens.

The lens 344 is designed so that the light source 341 is positioned at a distance d from the entrance window 347, as shown in FIG. 26(a), not at an infinite distance therefrom. According to this design of the lens 344, the ratio of light which is focused onto the pyro-electric element 343 among light radiated from the light source 341, the light utilization efficiency, and the level of a signal output from the pyro-electric element 343 are increased. The pyro-electric element 343 is disposed at a position which is shifted in an x-axis direction by Δf from the position on which incident light is focused by the lens 344 as shown in FIG. 26(a). Thus, light is made to be uniformly incident upon the pyro-electric element 343, thereby preventing light from being excessively focused in order not to irradiate only a partial region of the pyro-electric element 343 with strong light energy density. Also, the output of a signal from the pyro-electric element 343 can be prevented from decreasing.

Furthermore, in Embodiment 8, the lens 344 has a rectangular shape so that light is incident upon the entire surface of the pyro-electric element 343 for the same reason as that of Embodiment 4. Therefore, the shape of a spot of light on the output efficiency control device 342 has a direction opposite to that of the spot shape formed on the output efficiency control device of Embodiment 4, i.e., the shape of a spot becomes a trapezoid which is narrow on a +z side. Therefore, the grating configuration of the output efficiency control device 342 has a trapezoidal shape which is narrow on a +z side as shown in FIG. 26(b) for the same reason as that of Embodiment 4. Thus, light irradiated onto the output efficiency control device 342 can be uniformly diffracted.

The infrared sensor 300 in which each component is arranged as described above is operated in almost the same way as in the infrared sensor of Embodiment 4. More specifically, the output efficiency control device 342 is driven by turning on/off a voltage applied to the upper and lower electrodes of the output efficiency control device 342, whereby the incidence or non-incidence of light to the pyro-electric element 343 is switched. This allows chopping of light to be achieved, and a signal is output from the pyro-electric element 343, thereby it becomes possible to know the presence of the light source 341, the intensity of light therefrom, and the like.

In Embodiment 8, in the case where electromagnetic noise generated from the output efficiency control device 300 is substantially large and in the case where the position of the light source with respect to the infrared sensor 300 is relatively constant and in particular, the size of the light source is small, the light utilization efficiency is high. Therefore, an infrared sensor with a very high sensitivity can be provided.

Embodiment 9

Figure 27:
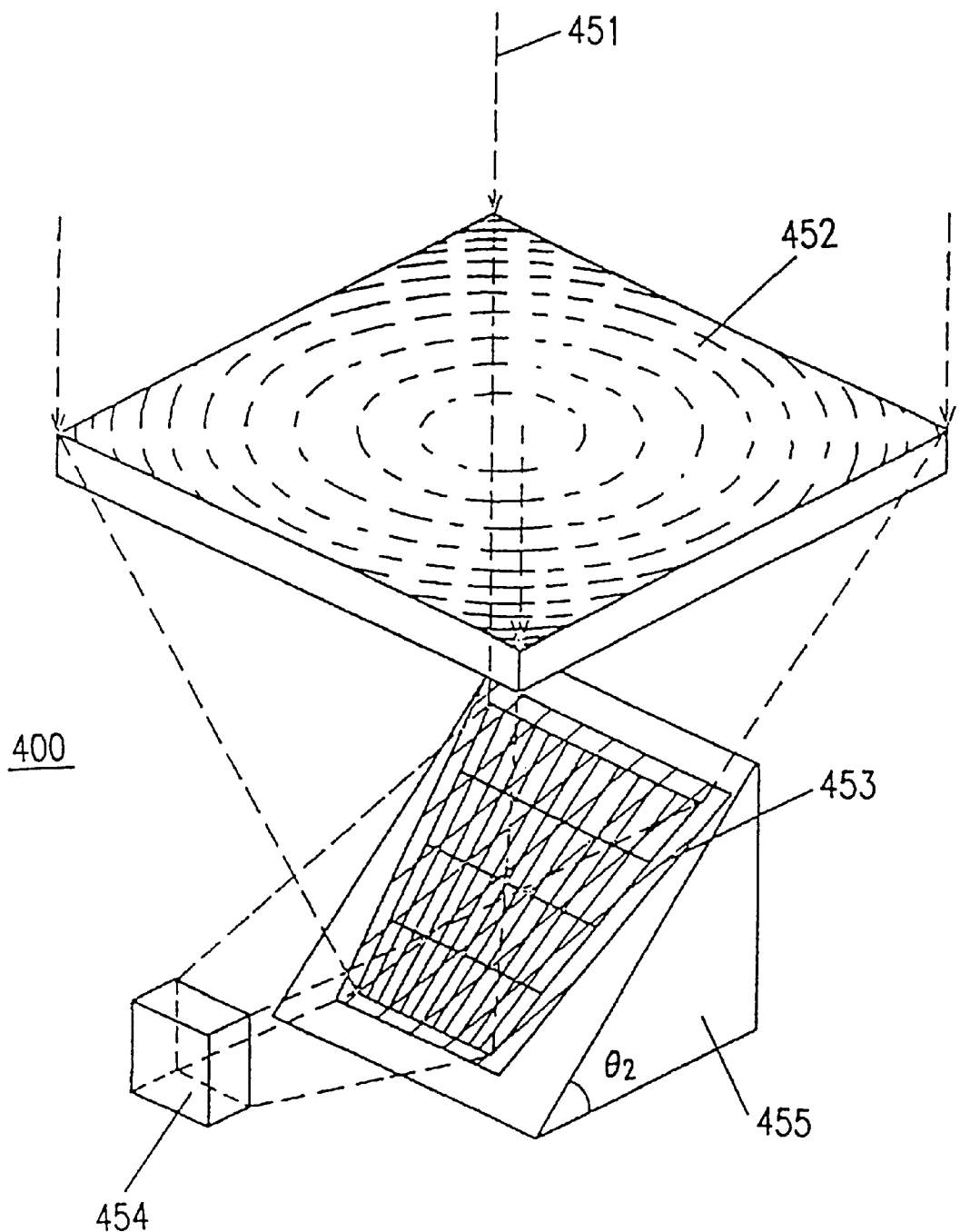
FIG. 27 is a view showing a structure of an infrared sensor in Embodiment 9 of the present invention.
Figure 29:
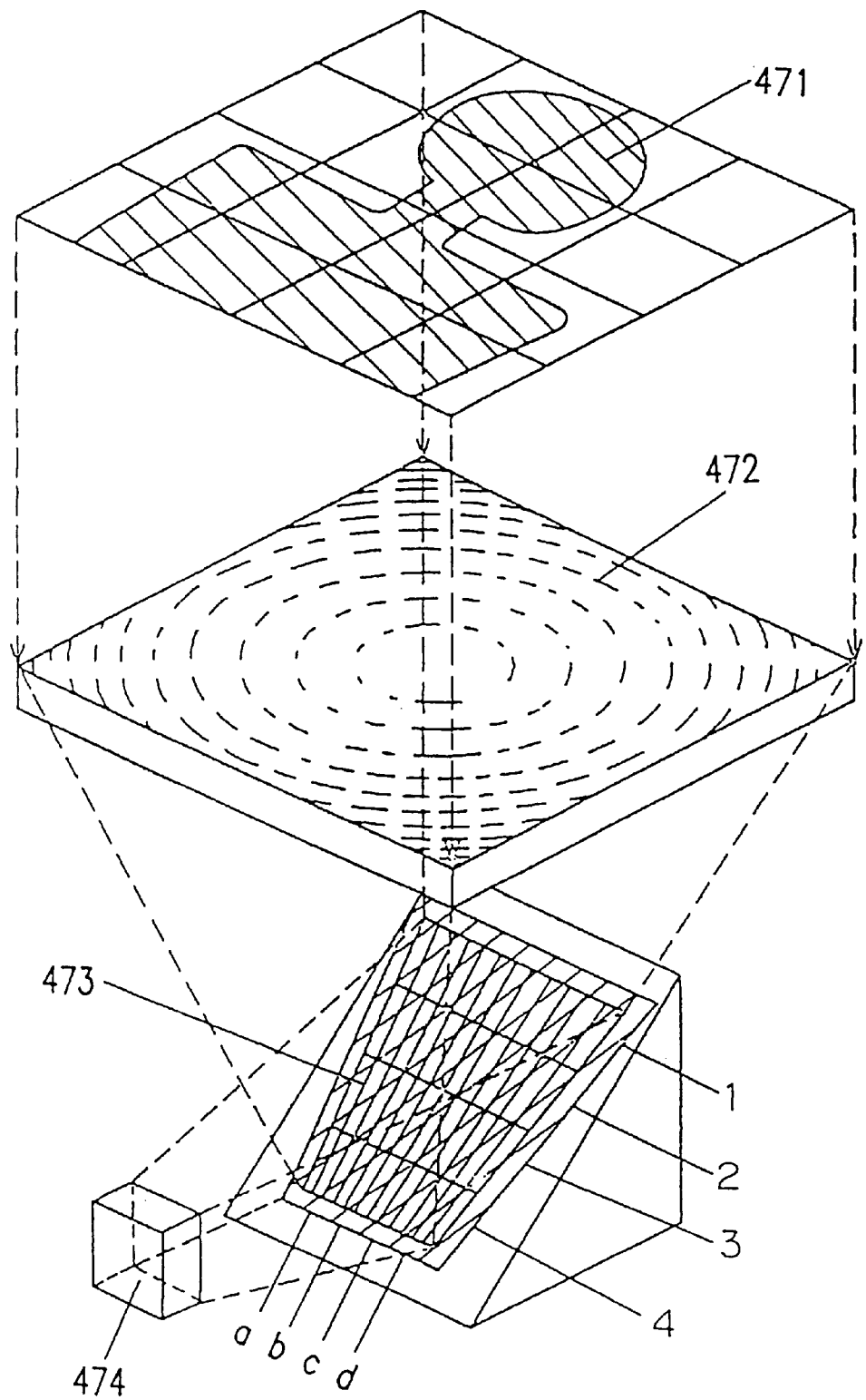
FIG. 29 is a view showing a structure of means for measuring a two-dimensional intensity distribution of a light source (heat source) using the output efficiency control device array in Embodiment 9.

Referring to FIGS. 27 through 29, the case where the output efficiency control device of Embodiment 9 of the present invention is used as an infrared sensor will be exemplified. The output efficiency control device of Embodiment 9 becomes capable of two-dimensionally measuring the intensity of infrared light, for example, in the case where it is used as an infrared sensor. In the past, in order to two-dimensionally measure the intensity of infrared light, for example, pyro-electric bodies are arranged in a two-dimensional array, and a two-dimensional intensity distribution is obtained from the output information of the respective pyro-electric bodies. However, according to such a method, a number of pyro-electric bodies are required, greatly increasing the price.

FIG. 27 is a view showing a structure of an infrared sensor 400 of Embodiment 9. As shown in FIG. 27, the infrared sensor 400 includes an output efficiency control device array 453, a lens 452 for focusing incident light 451 onto the output efficiency control device array 453, and a pyro-electric element 454 receiving light from the output efficiency control device array 453, and a spacer 455 determining an angle θ2 at which the incident light 451 is incident upon the output efficiency control device array 453. The infrared sensor 400 of Embodiment 9 is different from that of Embodiment 4 only in that the output efficiency control device array 453 is used in place of one output efficiency control device. Therefore, only this point will be described.

FIG. 28 is a view showing a structure of the output efficiency control device array 453: (a) is a plan view, (b) is a cross-sectional view taken along a line H–H' in (a), and (c) is a cross-sectional view taken along a line I–I' in (a). As is understood from FIGS. 28(a) through (c), the output efficiency control device array 453 of Embodiment 9 basically has a structure in which the output efficiency control devices of Embodiment 4 are arranged in an array.

As shown in FIGS. 28(b) and (c), the output efficiency control device array 453 has a substrate 461 on which an array of gratings is provided. In Embodiment 9, a silicon substrate on which wiring (not shown) or the like for applying a voltage is formed is used as the substrate 461. A spacer layer 463, for example, made of a silicon oxide film doped with a large amount of phosphorus is formed on the periphery of the substrate 461. Furthermore, an elastic layer 464, for example, made of a silicon nitride film with its residual stress reduced to, for example, 200 MPa or less of tensile stress is provided on the spacer layer 463.

Upper reflective films 466 and lower reflective films 467 are formed, for example, by vapor-depositing Au to a thickness of 0.1 μm. Lower electrodes 468 are formed on the substrate 461, as shown in FIGS. 28(b) and (c). The lower electrodes 468 are obtained, for example, by depositing a polysilicon film, whose sheet resistance is reduced to, for example, 20 Ω·cm, by being doped with a large amount of phosphorus, to a thickness of 0.5 μm on the substrate 461 by LPCVD, followed by patterning. The lower electrodes 468 are connected to the above-mentioned wiring (not shown) for a voltage application on the substrate 461 so that a voltage is applied to the lower electrodes individually. The upper reflective films 466 which also function as upper electrodes are at a bias potential having a constant potential difference with respect to a voltage applied to these lower electrodes 468; for example, the upper reflective films 466 are grounded. In the output efficiency control device array 453 having a structure as described above, a varying voltage, e.g., 0 [V], +30 [V] is applied to the individual lower electrodes 468, whereby the individual output efficiency control devices can be driven.

Next, an example of means for measuring the two-dimensional intensity distribution of a light source (heat source) using the output efficiency control device array 453 will be described with reference to FIG. 29. Here, as an example of the output efficiency control device array, an array 473 in which 4×4 output efficiency control devices are arranged is considered. For the purpose of clear description, as shown in FIG. 29, a, b, c, and d columns from the left side and 1, 2, 3, and 4 rows from above are used. Hereinafter, the two-dimensional intensity distribution of the heat source 471 having a two-dimensional intensity distribution, for example, as in a human body will be successively described.

(1) Only the output efficiency control device in an a1 portion of the output efficiency control device array 473 is driven to conduct optical modulation, whereby the intensity of, for example, infrared light which is incident upon the a1 portion is detected by the pyro-electric element 474.

(2) Next, only the output efficiency control device in an a2 portion is similarly driven to conduct optical modulation, whereby the intensity of infrared light in the a2 portion is detected.

(3) Thereafter, the output efficiency control devices in a3 through d4 portions are successively driven in the same way.

According to the above procedure, the distribution of two-dimensional infrared light intensity can be detected as signal information in time sequence, not as instant information. For example, in Embodiment 9, the pyro-electric element 474 which takes 5 msec for detecting a signal was used. Therefore, for example, it was required to take about 1.3 seconds for obtaining a screenful of information in an array composed of a 16×16 device group.

In the output efficiency control device array of Embodiment 9, a rectangular lens is used so as to obtain a two-dimensional intensity distribution in a rectangular region. At this time, the shape of a spot of light which is incident upon the output efficiency control device array becomes a trapezoid for the same reason as that in Embodiment 4. Therefore, as shown in FIGS. 27 through 29, the plane configuration of the output efficiency control device array is also prescribed to be a trapezoid. In this manner, the energy amount of light which is incident upon the individual output efficiency control device can be made constant by matching the array shape with the spot shape. Therefore, an intensity distribution can be precisely measured.

As described above, the infrared sensor of Embodiment 9 is a two-dimensional infrared sensor which is less expensive and very useful. In the case where it is desirable to increase the number of output efficiency control devices so as to detect a large region or conduct detection with precision, or in the case where a long measurement time is shortened, it is considered that another plurality of infrared sensors described in Embodiment 9 are arranged and simultaneously driven.

Embodiment 10

Hereinafter, an infrared sensor of Embodiment 10 will be described with reference to FIG. 30.

FIG. 30 is a view showing a structure of an infrared sensor 500 of Embodiment 10: (a) is a cross-sectional view and (b) is a view seen in a −x direction from a plane which is parallel to a y–z plane and includes a line J–J'.

As shown in FIG. 30, the infrared sensor 500 has an array 582 of a plurality of arranged output efficiency control devices, a pyro-electric element 583, a lens 584, and a spacer 585, which are accommodated in a housing 586 provided with an entrance window 587 on its upper surface. The spacer 585 determines an incident angle θ2 at which light from a light source 581 is incident upon an output efficiency control device array 582. The light source 581 has a two-dimensional intensity distribution with a relatively small area. In Embodiment 10, a diffraction-type lens formed on a square silicon substrate is used as the lens 584. As the entrance window 587, for example, a silicon substrate with a band-pass wavelength filter formed thereon can be used. As is understood from FIG. 30, the infrared sensor 500 of Embodiment 10 uses a plurality of output efficiency control devices arranged in an array in the same way as in Embodiment 9, in place of one output efficiency control device in the infrared sensor of Embodiment 8.

In the infrared sensor 500 of Embodiment 10, in the same way as in the infrared sensor of Embodiment 4, the lens 584 is disposed between the output efficiency control device array 582 and the pyro-electric element 583, and the lens 584 is made of, for example, conductive silicon, thereby an electromagnetic noise generated from the output efficiency control device array 582 can be blocked. Furthermore, light utilization efficiency is high when a light intensity distribution in a relatively small region is measured, so that a two-dimensional intensity distribution can be measured at high sensitivity.

Embodiment 11

Hereinafter, referring to FIG. 31, a non-contact thermometer of Embodiment 11 will be described. FIG. 31 is a view showing a structure in cross-section of a non-contact thermometer 600 of Embodiment 11. As shown in FIG. 31, the non-contact thermometer 600 has an output efficiency control device 641, a pyro-electric element 643, a lens 645, and a contact-type temperature measuring means 649 such as a thermo-couple. These are accommodated in a housing 646. As the output efficiency control device 641, any of the output efficiency control devices described in the above-mentioned Embodiments 4, 6, and 7 may be used, or an array of a plurality of arranged output efficiency control devices as described in the above-mentioned Embodiment 9 may be used. Here, the non-contact thermometer 600 will be described, exemplifying the case where the output efficiency control device of the above-mentioned Embodiment 4 is used. In Embodiment 11, a diffraction-type lens having a square aperture made of silicon is used as the lens 645. The non-contact thermometer 600 further has a shield 647. The shield 647 is attached to a surface of the housing 646 to which the lens 645 is attached in a mechanically movable manner and blocks infrared light 650 which is incident upon the lens 645 from an object (not shown) whose temperature is to be measured.

Hereinafter, a measurement principle of the non-contact thermometer 600 will be described with reference to FIG. 31. FIG. 31(a) shows a state where the lens 645 is shielded with the shield 647 and the incident infrared light 650 does not enter the non-contact thermometer 600. At this time, a signal generated in the pyro-electric element 643 by operating the output efficiency control device 641 corresponds to the temperature of the shield 647. In Embodiment 11, the contact-type temperature measuring means (thermo-couple) 649 is disposed, for example, on an inner wall of the housing 646 and measures the temperature of the housing 646 in a contact manner.

In terms of principle, the contact-type temperature measuring means 649 is desirably disposed on the shield 647. However, as described later, in Embodiment 11, the shield 647 is mechanically moved; therefore, when the contact-type temperature measuring means 649 is disposed on the shield 647, they become complicated in terms of mechanism and its durability is degraded. Therefore, in Embodiment 11, the temperature of the housing 646 is measured as the temperature of the shield 647. According to the measurement by the inventors of the present invention, the difference in temperature between the shield 647 and the housing 646 is sufficiently smaller than 0.1° C. which is a precision of the non-contact thermometer 600 of Embodiment 11. Thus, the difference in temperature has no practical problem.

FIG. 31(b) shows a state where the lens 645 is not shielded with the shield 647. Such a state can be realized, for example, by manually sliding the shield 647. At this time, the incident infrared light 650 enters the non-contact thermometer 600 through the lens 645, and the intensity of the incident infrared light 650 can be detected as a signal from the pyro-electric element 643 by driving the output efficiency control device 641 in accordance with the principle described in Embodiment 4. In general, in the case where the radiation ratio of an object is constant, the intensity of infrared light output from the object is proportional to the fourth power of the object temperature. Therefore, the temperature of an object (not shown) whose temperature is to be measured can be calculated based on the measured signal intensity, the intensity of a signal output from the pyro-electric element 643 in the state shown in FIG. 31(a), and the signal detected by the contact-type temperature measuring means 649.

As described above, in the non-contact thermometer 600 of Embodiment 11, the incident infrared light 650 is modulated by the output efficiency control device 641, whereby the non-contact thermometer 600 can be miniaturized and the power consumption can be decreased. Furthermore, in the output efficiency control device 641, the output efficiency is modulated by a minute operation of the beams as described in Embodiment 4, so that noise is not caused at a time of driving. In recent years, an eardrum thermometer, which measures a body temperature by measuring the temperature of an eardrum of a human body in a non-contact manner, has been developed. The non-contact thermometer 600 of Embodiment 11 does not generate noise at a time of driving even when used for such a purpose. Therefore, the non-contact thermometer 600 has a great advantage that it does not involve any unpleasantness when in use.

In Embodiment 11, the case where the output efficiency control device of the above-mentioned Embodiment 4 is used as the output efficiency control device has been described. However, it is appreciated that the output efficiency control device described in Embodiment 6 or 7 or the output efficiency control device array of Embodiment 9 may be used in accordance with the application. For example, the use of the output efficiency control device array described in Embodiment 9 enables the two-dimensional temperature distribution to be measured in a non-contact manner. It is also appreciated that the arrangement of the lens and the output efficiency control device is applicable in accordance with an object to be measured, as described in Embodiment 8 or 10.

INDUSTRIAL APPLICABILITY

As described above, in the optical modulator of the present invention, the output efficiency control device and the focusing means are used in combination, thereby a light irradiation area on the output efficiency control device is decreased and the output efficiency control device is miniaturized. Because of this, an optical modulator can be realized, which has a high response speed, is easily produced and capable of modulating incident light having a large beam diameter. When such an optical modulator is applied to a projection-type display apparatus, a projection-type display apparatus having large light utilization efficiency can be realized.

Furthermore, in the output efficiency control device of the present invention, the plane configuration of a grating portion is designed in accordance with the shape of a spot of incident light formed on the output efficiency control device. For example, even when the spot shape of incident infrared light on the output efficiency control device becomes a trapezoid, the number of the beams included in the trapezoidal spot can be made constant in the upper and lower portions of the trapezoidal spot and a uniform diffraction effect can be obtained by prescribing the period of the beams forming the grating so as to vary according to a linear function in their longitudinal direction. Thus, the degradation of the modulation characteristics caused by non-uniform diffraction of light can be prevented.

Furthermore, in the output efficiency control device of the present invention, the lengths of all the beams are prescribed to be equal. Because of this, all the beams can be completely, simultaneously operated when a voltage is applied or removed. Therefore, driving of on/off of light can be performed at a high speed, and driving at a high frequency becomes possible. Thus, in the case where such an output efficiency control device is applied to, for example, an infrared sensor, detection with high precision can be conducted within a short period of time.

The output efficiency control device having a grating whose plane configuration is designed as described above can also be applied to the display apparatus of the present invention. For example, when a lens with a rectangular aperture is used as the focusing means, the plane configuration of the grating of the output efficiency control device in the optical modulator is designed to be a trapezoid in which the interval between the beams varies according to a linear function in their longitudinal direction.

Furthermore, in the case where the output efficiency control device of the present invention is applied to an infrared sensor, for example, even when the spot shape on the output efficiency control device becomes a trapezoid, using a lens having a rectangular aperture, the modulation characteristics can be prevented from degrading by disposing the output efficiency control device between the lens and the pyro-electric element. In this case, a spot formed on the pyro-electric element has a rectangular shape with a size smaller than that in the case of using a lens having a circular aperture. Thus, light is enabled to be incident upon the entire pyro-electric element and a pyro-electric element with a small area will suffice, so that a cost can be reduced. Simultaneously, a signal level higher than the level conventionally obtained can be obtained. Therefore, an infrared sensor with an ultra-small size and high sensitivity can be realized as a whole.

Alternatively, in an infrared sensor using the output efficiency control device of the present invention, light output from the output efficiency control device is focused onto the pyro-electric element by using a lens, thereby outgoing light from a point light source at almost a constant distance from the sensor can be utilized at a high efficiency. Furthermore, by designing the lens so as to have a rectangular aperture and using an output efficiency control device having a grating with a plane configuration in accordance with a spot shape formed by the lens in such a structure, the area utilization efficiency of the lens is enhanced. Therefore, a miniaturized infrared sensor with high sensitivity for short distances can be realized.

Furthermore, in the case where the output efficiency control devices of the present invention are arranged in a two-dimensional array, when the light intensity distribution is different in a spot, for example, due to the trapezoidal shape of the spot, the total amount of energy of light which is incident upon the individual output efficiency control device is made equal by prescribing the entire output efficiency control device array to be a trapezoid. In the case where a plurality of output efficiency control devices are arranged in a two-dimensional array and incorporated into an infrared sensor as described above, a two-dimensional infrared light intensity distribution can be detected as information in time sequence by successively operating the output efficiency control devices and successively detecting signals output from a pyro-electric element at that time, and a much less expensive two-dimensional infrared sensor can be provided.

Furthermore, the output efficiency control device of the present invention can also be applied to a non-contact thermometer. In this case, first, the output efficiency control device is driven in a state where infrared light is prevented from entering a housing of the non-contact thermometer by using a shield and a signal generated from a pyro-electric element is detected, while the temperature is measured by contact-type temperature measuring means provided in the housing. Thereafter, the output efficiency control device is driven and a signal generated from the pyro-electric element is detected, in a state where the shield is opened so as to allow infrared light to entering the housing of the non-contact thermometer. Based on the signals generated from the pyro-electric element in the above-mentioned two states and the temperature measured by the contact-type temperature measuring means, the temperature of an object to be measured can be measured with remarkable precision in a non-contact manner.

What is claimed is:

1. An optical modulator comprising:
   a device which is electrically controllable to modulate light which is incident thereupon;
   first focusing means for focusing the light onto the device without separating the light with respect to wavelength; and
   second focusing means for outputting the light modulated by the device without separating the light with respect to the wavelength,
   wherein the first and second focusing means are disposed adjacent each other opposite the device;
   wherein the light incident upon the device is incident onto the first focusing means in a direction oblique to an optical axis of the first focusing means.

2. An optical modulator according to claim 1, wherein the device is a reflection-type optical element.

3. An optical modulator according to claim 1, wherein the first focusing means and the second focusing means are formed on an identical surface of a substrate.

4. An optical modulator according to claim 1, further comprising a transparent substrate having a first surface and a second surface opposing each other,
   wherein the first focusing means and the second focusing means are formed on the first surface of the transparent substrate, and the device is a reflection-type optical element formed on the second surface of the transparent substrate.

5. An optical modulator comprising:
   a device which modulates light which is incident thereupon;
   first focusing means for focusing light onto the device without separating the light with respect to wavelength;
   second focusing means for outputting the light modulated by the device without separating the light with respect to the wavelength; and
   a transparent substrate having a first surface and a second surface opposing each other;
   wherein the first and second focusing means are disposed adjacent each other opposite the device;
   wherein the first focusing means and the second focusing means are formed on the first surface of the transparent substrate, and the device is a reflection-type optical element formed on the second surface of the transparent substrate;
   wherein the device comprises:
      a transparent electrode which functions as a first electrode, formed on the second surface of the transparent substrate;
      a first grating formed on the transparent electrode;
      a spacer layer formed on the transparent electrode; and
      a second grating composed of a plurality of beams having a portion which functions as a second electrode, both ends of the beams being supported on the spacer layer,
   wherein a distance between the transparent electrode and the second grating is varied by adjusting a voltage applied between the first electrode and the second electrode, thereby controlling an efficiency at which the light focused by the first focusing means is output to the second focusing means.

6. An optical modulator according to claim 5, wherein the device further includes an insulating layer provided on the first grating.

7. An optical modulator comprising:
   a device which modulates light which is incident thereupon;
   first focusing means for focusing light onto the device without separating the light with respect to wavelength; and second focusing means for outputting the light modulated by the device without separating the light with respect to the wavelength;

wherein the first and second focusing means are disposed adjacent each other opposite the device;

wherein the light incident upon the device is incident onto the first focusing means in a direction oblique to an optical axis of the first focusing means;

wherein the first focusing means and the second focusing means are formed on an identical surface of a substrate;

wherein the first and second focusing means have an identical shape, and wherein the device is disposed with a center thereof positioned at a point of intersection of a line vertical to a plane on which the first focusing means and the second focusing means are formed, extending from a center of a straight line connecting a center of the first focusing means and a center of the second focusing means, and a plane on which the device is formed.

8. An optical modulator comprising:

a device which modulates light which is incident thereupon;

first focusing means for focusing light onto the device without separating the light with respect to wavelength; and second focusing means for outputting the light modulated by the device without separating the light with respect to the wavelength;

wherein the first and second focusing means are disposed adjacent each other opposite the device;

wherein the light incident upon the device is incident onto the first focusing means in a direction oblique to an optical axis of the first focusing means;

wherein the first focusing means and the second focusing means formed on an identical surface of a substrate; and wherein the first focusing means and the second focusing means have a similar elliptical shape in which a cross-section in a thickness direction gradually decreases and are arranged in a major axis direction thereof.

9. An optical modulator according to claim 8, wherein, assuming that an incident angle of an optical axis of the light incident on the first focusing means with respect to a vertical direction of a plane on which the first focusing means and the second focusing means are formed is θ, a size ratio of the major axis of the ellipsoid to a minor axis is 1/cos θ.

10. An optical modulator comprising:

a device which modulates light which is incident thereupon;

first focusing means for focusing light onto the device without separating the light with respect to wavelength; and second focusing means for outputting the light modulated by the device without separating the light with respect to the wavelength;

wherein the first and second focusing means are disposed adjacent each other opposite the device;

wherein the light incident upon the device is incident onto the first focusing means in a direction oblique to an optical axis of the first focusing means;

wherein the device is a movable mirror.

11. An optical modulator, comprising:

output efficiency control means for modulating light which is incident thereupon;

first focusing means for focusing the light onto the output efficiency control means; and second focusing means for outputting the light modulated by the output efficiency control means, wherein the first focusing means and the second focusing means are formed on an identical surface of a substrate, are disposed so as to oppose the output efficiency control means, and are diffraction-type microlenses having a binary/multi-level structure.

12. An optical modulator, comprising:

output efficiency control means for modulating light which is incident thereupon;

first focusing means for focusing the light onto the output efficiency control means;

second focusing means for outputting the light modulated by the output efficiency control means, and a transparent substrate having a first surface and a second surface opposing each other, wherein the first focusing means and the second focusing means are disposed so as to oppose the output efficiency control means, are formed on the first surface of the transparent substrate, and are square lenses each having a rectangular aperture, the output efficiency control means is a reflection-type optical element formed on the second surface of the transparent substrate and comprises:

a transparent electrode which functions as a first electrode, formed on the second surface of the transparent substrate;

a first grating formed on the transparent electrode;

a spacer layer formed on the transparent electrode; and a second grating composed of a plurality of beams having a portion which functions as a second electrode, both ends of the beams being supported on the spacer layer, wherein a distance between the transparent electrode and the second grating is varied by adjusting a voltage applied between the first electrode and the second electrode, thereby controlling an efficiency at which the light focused by the first focusing means is output to the second focusing means; and wherein an interval between the plurality of beams in the second grating of the output efficiency control means gradually increases in a longitudinal direction of the beams.

13. An optical modulator according to claim 12, wherein a period of the grating increases according to a linear function in a longitudinal direction of the grating.

14. An optical modulator according to claim 12, wherein lengths of the plurality of beams are equal in the second grating.

15. An optical modulator according to claim 12, wherein the first grating and the second grating of the output efficiency control means are designed in such a manner that a portion of the grating having a smallest period is 7 times or more a wavelength of the incident light.

16. An optical modulator according to claim 15, wherein, assuming that a length of one side of the lens is L, a focal length of the lens is f, and an angle formed by a normal to a principal plane of the plate of the output efficiency control device and the optical axis of the lens is θ, the first grating and the second grating are designed in such a manner that a portion of the grating having a largest period becomes $7(2f+L \tan \theta)/(2f-L \tan \theta)$ times or more the wavelength of the incident light.

17. A display apparatus comprising:

a light source;

splitting means for splitting light emitted from the light source into a plurality of colored light beams having wavelength ranges different from each other;

a plurality of optical modulators, provided in, optical paths of the plurality of colored light beams, respectively, for modulating the plurality of colored light beams, respectively; and an imaging lens for imaging the plurality of colored light beams modulated by the plurality of optical modulators, wherein each of the plurality of optical modulators includes:

a plurality of output efficiency control means arranged in an array, for modulating a corresponding colored light beam of the plurality of colored light beams; and focusing means having a plurality of focusing elements arranged in an array, the corresponding colored light beam is incident upon the focusing means in a direction oblique to an optical axis of the focusing means and is focused on the output efficiency control means, and the modulated corresponding colored light beam is output in an oblique direction through the focusing means.

18. A display apparatus according to claim 17, wherein an incident angle at which the colored light beam is incident upon the focusing means is equal to an angle at which the colored light beam is output from the focusing means, an interval at which the plurality of output efficiency control means are arranged is equal to an interval at which the plurality of focusing elements are arranged in the focusing means, and the plurality of output efficiency control means are disposed so as to be shifted by a half of the arrangement interval with respect to the focusing means in a direction in which an incident direction of the colored light beam is tilted with respect to the optical axis of the focusing means.

19. A display apparatus according to claim 17, wherein each of the plurality of output efficiency control means is disposed so as to oppose a pair of focusing elements adjacent to each other of the plurality of focusing elements of the focusing means, receives the corresponding colored light beam from one of the pair of focusing elements, and outputs the modulated corresponding colored light beam to the other one of the pair of focusing elements.

20. A display apparatus according to claim 17, wherein the plurality of output efficiency control means are arranged in an m-row and n-column two-dimensional array, the plurality of focusing elements are arranged in an (m+1)-row and n-column two-dimensional array in the focusing means, and output efficiency control means on a k-th row is disposed so as to correspond to a focusing element on a k-th row and a focusing element on a (k+1)th row.

21. A display apparatus according to claim 17, wherein the plurality of optical modulators include a transparent substrate having a first surface on which the focusing means is formed and a second surface opposing the first surface, and the output efficiency control means is a reflection-type optical element formed on the second surface.

22. A display apparatus according to claim 21, wherein each of the plurality of output efficiency control means includes:

a transparent electrode which functions as a first electrode, provided on the second surface of the transparent substrate;

a first grating formed on the transparent electrode;

a spacer layer formed on the transparent electrode; and a second grating composed of a plurality of beams having a portion which functions as a second electrode, both ends of the beams being supported on the spacer layer, wherein a distance between the transparent electrode and the second grating is varied by adjusting a voltage applied between the first electrode and the second electrode, thereby an efficiency at which the corresponding colored light beam is output to the focusing means is controlled.

23. A display apparatus according to claim 17, wherein the plurality of focusing elements have a similar elliptical shape in which a cross-section gradually decreases in a thickness direction thereof.

24. A display apparatus according to claim 23, wherein assuming that an angle of an optical axis of the corresponding colored light beam incident upon the focusing means with respect to a vertical direction of a plane on which the focusing means is formed is θ, a size ratio of a major axis of the ellipsoid to a minor axis is 1/cos θ.

25. A display apparatus according to claim 17, wherein the splitting means has a first splitting element which reflects a blue light beam and transmits the other light beams, a second splitting element which reflects a green light beam and transmits the other light beams, and a third splitting element which reflects a red light beam and transmits the other light beams.

26. A display apparatus according to claim 25, wherein a wavelength bandwidth of light reflected from the first splitting element is smaller than wavelength bandwidths of light reflected from the second splitting element and the third splitting element.

27. A display apparatus according to claim 25, wherein a wavelength bandwidth of light reflected from the third splitting element is larger than wavelength bandwidths of light reflected from the first splitting element and the second splitting element.

28. A display apparatus according to claim 25, wherein a wavelength bandwidth of reflected light decreases in the order of the third splitting element, the second splitting element, and the first splitting element.

29. A display apparatus according to claim 25, wherein the light emitted from the light source passes through the first splitting element, the second splitting element, and the third splitting element in this order.

30. A display apparatus according to claim 22, wherein each of the plurality of optical modulators further has a control circuit of the output efficiency control means, and the second electrode of each of the output efficiency control means is connected to a connecting electrode of the control circuit via a solder bump.

31. A display apparatus according to claim 21, wherein each of the plurality of optical modulators further has light absorbing means provided in a region of the transparent substrate other than a region thereof where the focusing means and the plurality of output efficiency control means are formed.

32. A display apparatus according to claim 31, wherein the light absorbing means is also provided on each periphery of the plurality of focusing elements.

33. A display apparatus according to claim 22, wherein the output efficiency control means outputs zero-th order diffracted light of the corresponding colored light beam.

34. A display apparatus according to claim 17, wherein the plurality of output efficiency control means are a movable mirror array.

35. A display apparatus according to claim 22, wherein the focusing means is a diffraction-type microlens array having a binary/multi-level structure.

36. A display apparatus according to claim 22, wherein, in the second grating, an interval of the plurality of beams gradually increases in a longitudinal direction of the beams.

37. A display apparatus according to claim 36, wherein a period of the grating increases according to a linear function in a longitudinal direction of the grating.

38. A display apparatus according to claim 36, wherein, in the second grating, lengths of the plurality of beams are equal.

39. An output efficiency control device which modulates incident light and outputs the modulated light, comprising:
   a plate having a portion which functions as a first electrode;
   a spacer layer formed on the plate; and
   a grating composed of a plurality of beams which are not parallel to each other, the beams having portions which function as second electrodes, both ends of the beams being supported on the spacer layer,
   wherein a distance between the grating and the plate is varied by adjusting a voltage applied between the first electrode and the second electrodes, thereby an output efficiency of the light is controlled.

40. An output efficiency control device according to claim 39, wherein a period of the grating gradually increases in a longitudinal direction of the grating.

41. An output efficiency control device according to claim 40, wherein the period of the grating increases according to a linear function in a longitudinal direction of the grating.

42. An output efficiency control device according to claim 40, wherein lengths of the plurality of beams are equal.

43. An output efficiency control device according to claim 39, wherein the plurality of beams of the grating are aligned on an identical plane when a voltage is not applied between the first electrode and the second electrodes, and every other beam is attracted to this plate when a voltage is applied, thereby the output efficiency is controlled.

44. An output efficiency control device according to claim 43, wherein the plurality of beams are densely aligned and function as a mirror when a voltage is not applied between the first electrode and the second electrodes.

45. An output efficiency control device according to claim 39, wherein, assuming that a wavelength of the incident light is $\lambda$, and an angle formed by a normal of a principal plane of the plate of the output efficiency control device and an optical axis of the incident light is $\theta$, an operation distance of the grating is set to be $m\lambda/(4 \cos \theta)$, where m is an integer.

46. An output efficiency control device according to claim 39, wherein, assuming that a wavelength of the incident light is $\lambda$, and an angle formed by a normal to a principal plane of the plate of the output efficiency control device and an optical axis of the incident light is $\theta$, a thickness of the beams is set to be $m\lambda/(4 \cos \theta)$, where m is an integer.

47. An output efficiency control device according to claim 39, further comprising a reflective film formed on a surface of the plate and a surface of the grating.

48. An output efficiency control device according to claim 39, further comprising an insulating film formed between the plate and the grating.

49. An output efficiency control device according to claim 48, further comprising a reflective film formed on a surface of the insulating layer and a surface of the grating.

50. An infrared sensor comprising:
   a lens for focusing infrared light;
   a pyro-electric element; and
   the output efficiency control device of claim 39, which receives the infrared light focused by the lens and outputs at least part of the infrared light to the pyro-electric element.

51. An infrared sensor according to claim 50, wherein the pyro-electric element has a rectangular surface.

52. An infrared sensor according to claim 51, wherein the lens has a rectangular aperture.

53. An infrared sensor according to claim 50, wherein the output efficiency control device is obliquely disposed in such a manner that a normal to a principal plane of the plate is disposed so as not to be parallel to an optical axis of the lens.

54. An infrared sensor according to claim 50, wherein the output efficiency control device is disposed in such a manner that only zero-th order diffracted light of diffracted light diffracted by the grating of the output efficiency control device is incident upon the pyro-electric element and diffracted light other than the zero-th order diffracted light is not incident upon the pyro-electric element.

55. An infrared sensor according to claim 50, wherein a change in a distance between the grating and the plate of the output efficiency control device changes a light amount of the zero-th order diffracted light.

56. An infrared sensor according to claim 50, wherein the infrared sensor further includes a sealing member having an opening, and the sealing member contains the output efficiency control device and the pyro-electric element.

57. An infrared sensor according to claim 56, wherein the lens is provided in the opening of the sealing member.

58. An infrared sensor according to claim 50, wherein the lens is a diffraction-type lens.

59. An infrared sensor according to claim 52, wherein a smallest period of the grating of the output efficiency control device is 7 times or more a wavelength of the infrared light.

60. An infrared sensor according to claim 52, wherein, assuming that a length of one side of the lens is L, a focal length of the lens is f, and an angle formed by a normal to a principal plane of the plate of the output efficiency control device and an optical axis of the lens is $\theta$, a largest period of the grating is $7(2f+L \tan \theta)/(2f-L \tan \theta)$ times or more a wavelength of the infrared light.

61. An infrared sensor according to claim 50, wherein the output efficiency control device is disposed in such a manner that a direction which is parallel to a principal plane of the plate and vertical to the grating is vertical to an optical axis of the lens.

62. An infrared sensor comprising:
   the output efficiency control device of claim 39, which outputs at least part of incident infrared light;
   a pyro-electric element; and
   a lens, provided between the output efficiency control device and the pyro-electric element, for focusing the infrared light output from the output efficiency control device onto the pyro-electric element.

63. An infrared sensor according to claim 62, wherein the pyro-electric element has a rectangular surface.

64. An infrared sensor according to claim 63, wherein the lens has a rectangular aperture.

65. An infrared sensor according to claim 62, wherein the output efficiency control device is obliquely disposed in such a manner that a normal to a principal plane of the plate is not parallel to an optical axis of the lens.

66. An infrared sensor according to claim 62, wherein the output efficiency control device is disposed in such a manner that only zero-th order diffracted light of diffracted light diffracted by the grating of the output efficiency control device is incident upon the pyro-electric element, and diffracted light other than the zero-th order diffracted light is not incident upon the pyro-electric element.

67. An infrared sensor according to claim 62, wherein a change in a distance between the grating and the plate of the output efficiency control device changes a light amount of the zero-th order diffracted light.

68. An infrared sensor according to claim 62, wherein the infrared sensor further includes a sealing member having an opening, and the sealing member contains the output efficiency control device and the pyro-electric element.

69. An infrared sensor according to claim 62, wherein the lens has a surface relief structure in accordance with a modulated amount of a phase of the lens and is composed of a material selected from a group consisting of Si, Ge, GaAs, InP, GaP, ZnSe, and ZnS.

70. An infrared sensor according to claim 62, wherein the output efficiency control device is disposed in such a manner that a direction which is parallel to a principal plane of the plate and vertical to the grating is vertical to an optical axis of the lens.

71. An output efficiency control device array which modulates incident light and outputs the modulated light, having a plurality of output efficiency control devices arranged in a two-dimensional array, each of the plurality of output efficiency control devices comprising:

a plate having a portion which functions as a first electrode;

a spacer layer formed on the plate; and a grating composed of beams which are not parallel to each other, the beams having portions which function as second electrodes, both ends of the beams being supported on the spacer layer, wherein a distance between the grating and the plate is varied by adjusting a voltage applied between the first electrode and the second electrodes, thereby an efficiency at which the light is output is controlled.

72. An infrared sensor comprising:

a lens for focusing infrared light;

a pyro-electric element; and the output efficiency control device array of claim 71, which receives the infrared light focused by the lens and outputs at least part of the infrared light to the pyro-electric element.

73. An infrared sensor, comprising:

the output efficiency control device array of claim 71, which outputs at least part of incident infrared light;

a pyro-electric element; and a lens, provided between the output efficiency control device and the pyro-electric element, for focusing the infrared light output from the output efficiency control device onto the pyro-electric element.

74. A method for driving the infrared sensor of claim 72, comprising the steps of:

successively operating the plurality of output efficiency control devices, and successively detecting output signals from the pyro-electric element thus obtained; and detecting a two-dimensional infrared light intensity distribution as information in time sequence, based on the detected output signals from the pyro-electric element.

75. A method for driving the infrared sensor of claim 73, comprising the steps of:

successively operating the plurality of output efficiency control devices, and successively detecting output signals from the pyro-electric element thus obtained; and detecting a two-dimensional infrared light intensity distribution as information in time sequence, based on the detected output signals from the pyro-electric element.

76. A non-contact thermometer comprising:

a lens for focusing infrared light;

a housing having an opening;

a shield which closes and opens the opening;

a pyro-electric element provided in the housing;

contact-type temperature measuring means provided on a side wall of the housing; and the output efficiency control device of claim 39, which is provided in the housing, receives the infrared light focused by the lens, and outputs at least part of the infrared light.

77. A non-contact thermometer according to claim 76, wherein the contact-type temperature measuring means is a thermocouple.

78. A non-contact thermometer comprising:

a housing having an opening;

a shield which closes and opens the opening;

a pyro-electric element provided in the housing;

contact-type temperature measuring means provided on a side wall of the housing;

the output efficiency control device of claim 39, which is provided in the housing, receives infrared light through the opening, and outputs at least part of the infrared light; and a lens which outputs at least part of the infrared light output from the output efficiency control device to the pyro-electric element.

79. A non-contact thermometer according to claim 78, wherein the contact-type temperature measuring means is a thermo-couple.

80. A non-contact thermometer comprising:

a lens for focusing infrared light;

a housing having an opening;

a shield which closes and opens the opening;

a pyro-electric element provided in the housing;

contact-type temperature measuring means provided on a side wall of the housing; and the output efficiency control device array of claim 71, which is provided in the housing, receives the infrared light focused by the lens, and outputs at least part of the infrared light.

81. A non-contact thermometer according to claim 80, wherein the contact-type temperature measuring means is a thermo-couple.

82. A non-contact thermometer comprising:

a housing having an opening;

a shield which closes and opens the opening;

a pyro-electric element provided in the housing;

contact-type temperature measuring means provided on a side wall of the housing;

the output efficiency control device of claim 71, which is provided in the housing, receives infrared light incident through the opening, and outputs at least part of the infrared light; and a lens which outputs at least part of the infrared light output from the output efficiency control device to the pyro-electric element.

83. A non-contact thermometer according to claim 82, wherein the contact-type temperature measuring means is a thermo-couple.

84. A method for producing the display apparatus of claim 17, comprising the steps of:

producing the plurality of optical modulators; and arranging and assembling the light source, the splitting means, the plurality of optical modulators, and the imaging lens, wherein the step of producing the plurality of optical modulators includes:

forming the focusing means on a first surface of a transparent substrate;

forming the plurality of output efficiency control means each having a connecting portion for driving on a second surface of the transparent substrate opposing the first surface;

connecting the connecting portion for driving to a driving circuit for driving the plurality of output efficiency control means;

in the case where there is a connection defect between the connecting portion for driving and the driving circuit, irradiating the connecting portion corresponding to the connection defect with laser light, thereby repairing the connection defect.

85. An optical modulator comprising:

a device which modulates light which is incident thereupon;

first focusing means for focusing light onto the device without separating the light with respect to wavelength; and second focusing means for outputting the light modulated by the device without separating the light with respect to the wavelength;

wherein the first and second focusing means are disposed adjacent each other opposite the device;

wherein the light incident upon the device is incident onto the first focusing means in a direction oblique to an optical axis of the first focusing means, and the output light is output from the second focusing means in a direction oblique to an optical axis of the second focusing means.

* * * * *